(12) United States Patent
Gold, Jr. et al.

(10) Patent No.: US 10,146,901 B1
(45) Date of Patent: Dec. 4, 2018

(54) PSEUDO-RANDOM CIRCUIT RE-ARRANGER SYSTEM, METHOD AND COMPUTER PROGRAM PRODUCT

(71) Applicant: LOCKHEED MARTIN CORPORATION, Bethesda, MD (US)

(72) Inventors: V. Edward Gold, Jr., Belle Isle, FL (US); Robert William Brown, Celebration, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 9 days.

(21) Appl. No.: 15/390,703

(22) Filed: Dec. 26, 2016

Related U.S. Application Data

(63) Continuation-in-part of application No. 14/553,483, filed on Nov. 25, 2014, now Pat. No. 9,529,949.

(51) Int. Cl.
  *G06F 17/50* (2006.01)
(52) U.S. Cl.
  CPC .............................. *G06F 17/5077* (2013.01)
(58) Field of Classification Search
  CPC .................. G06F 17/5045; G06F 17/5077
  USPC .............................. 716/100, 104, 126, 130
  See application file for complete search history.

(56) References Cited

U.S. PATENT DOCUMENTS 9,449,135 B1 * 9/2016 Gold, Jr. ............. G06F 17/5045
9,529,949 B1 * 12/2016 Gold, Jr. et al. .... G06F 17/5045

* cited by examiner

*Primary Examiner* — Sun Lin
(74) *Attorney, Agent, or Firm* — Terry M. Sanks, Esq.; Beusse Wolter Sanks & Maire, PLLC

(57) ABSTRACT

A method comprises forming a grid provided with a plurality of macro nodes. The grid comprises a plurality of meandering electrically conductive circuit paths through the plurality of macro nodes. The method comprises identifying a candidate macro node in the grid which includes only parallel micro node segments and selecting the candidate macro node. The method includes re-arranging the parallel micro node segments of the plurality of micro node meandering electrically conductive circuit paths in the candidate macro node of the grid such that at least one micro node segment is changed electrically to a non-parallel micro node segment in relation to other micro node segments in the candidate macro node to generate data representative of re-arranged meandering electrically conductive circuit paths for the grid. The method includes forming the re-arranged meandering electrically conductive circuit paths for the grid. A computing device and a computer program product for performing the method are also provided.

20 Claims, 37 Drawing Sheets

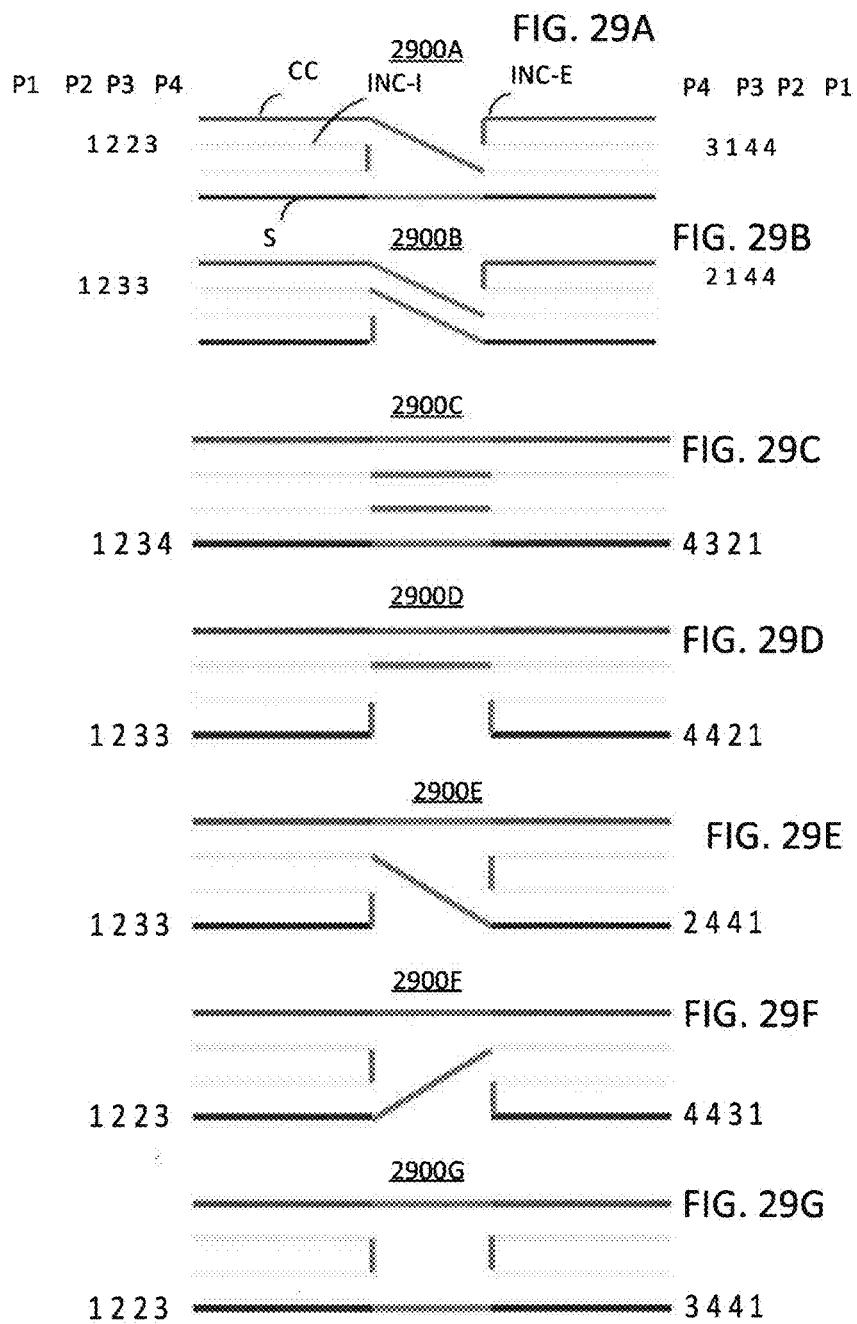

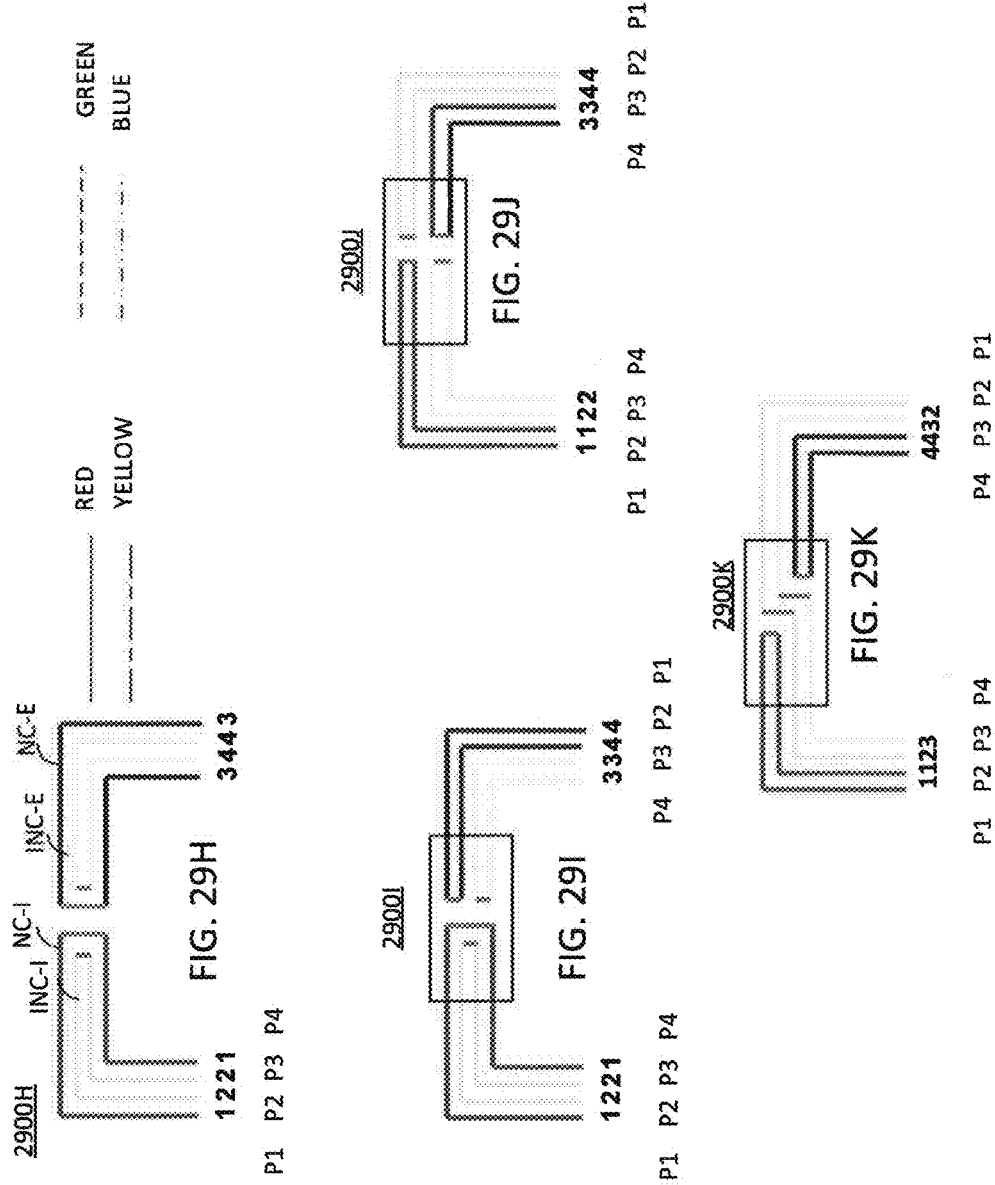

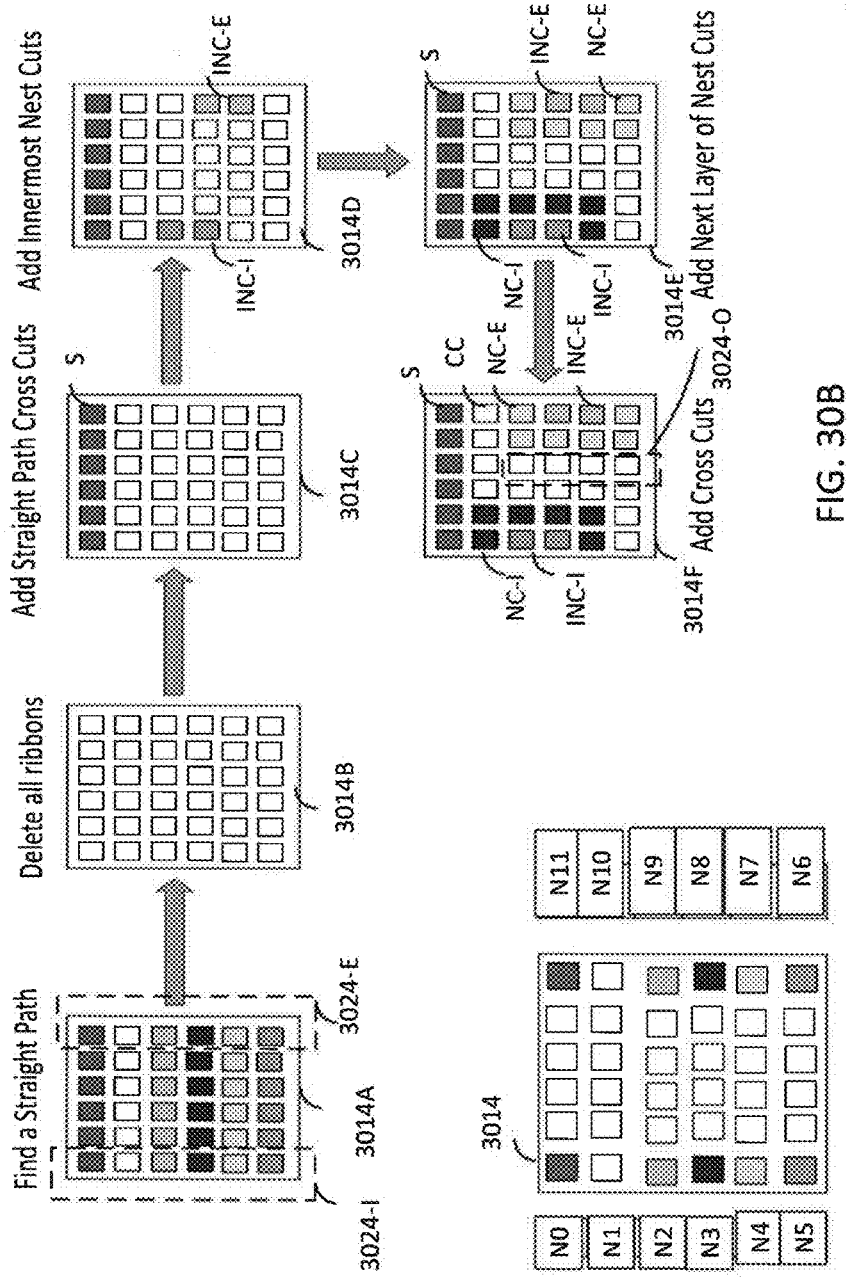

3214A

——————— RED         — — — — GREEN
— — — — — YELLOW    ·····—··· BLUE
— — — — Orange      ——— — Mustard

PSEUDO-RANDOM CIRCUIT RE-ARRANGER SYSTEM, METHOD AND COMPUTER PROGRAM PRODUCT

CROSS-REFERENCE TO RELATED APPLICATIONS

This application is a continuation-in-part of U.S. patent application Ser. No. 14/553,483, filed Nov. 25, 2014, titled "GENERATING INTERTWINED PSEUDO-RANDOM CIRCUIT PATHS REFERENCED TO AN AREA," assigned to Lockheed Martin Corporation, incorporated herein by reference as if set forth in full below.

TECHNICAL FIELD

The embodiments relate generally to circuits, and in particular to generating multiple closely spaced pseudo-random or random circuits.

BACKGROUND

Pseudo-random or random conductive circuits that cover a predetermined area of a surface of an item are useful in a variety of applications, such as protecting one or more components mounted on a printed circuit board from being analyzed, studied, or hacked, or reducing electromagnetic interference. If the properties of a circuit can be ascertained, then the circuit could be circumvented in order to obtain access to the protected underlying component or components. Thus, in many situations, it may be desirable to utilize multiple, intertwined pseudo-random circuits to increase the likelihood that any attempt to circumvent the protective circuit layer will be detected. However, intertwining multiple circuits is generally difficult, impractical, or impossible. Accordingly, there is a need for mechanisms, including systems, apparatuses, and methods, for quickly and efficiently generating multiple intertwined pseudo-random or random circuits that cover a predetermined area of a surface of an item.

SUMMARY

The embodiments relate to the generation of a circuit design of multiple intertwined pseudo-random or random circuits that cover a predetermined area of an item, such as a printed circuit board. In operation, the circuits cover the item, and a short or breach of any of the circuits can be detected. Upon detection, actions can be taken with respect to the item. For example, upon detection of a short or breach of any such circuit, electrical power to the item may be halted. The embodiments re-arrange the pseudo-random or random circuits to further vary the circuit paths to detect a short or breach of any re-arranged circuit. An aspect of the embodiments includes a method comprising: forming a grid with a plurality of macro nodes, each macro node including a plurality of micro nodes, a first macro node being a start macro node and a second macro node being an end macro node, wherein the grid comprising a plurality of meandering electrically conductive circuit paths through the macro nodes such that each circuit path comprising circuit path micro node segments in each macro node having an ingress micro node and an egress micro node continuously electrically linked through a set of micro nodes of the plurality of micro nodes beginning from a start micro node in the start macro node through the grid to end at an end micro node in the end macro node; identifying a candidate macro node in the grid which includes only parallel circuit path micro node segments, wherein each parallel circuit path micro node segment extends parallel from the ingress micro nodes to the egress micro node of the candidate macro node; selecting the candidate macro node; re-arranging the parallel circuit path micro node segments of the plurality of micro node electrically conductive circuit paths in the candidate macro node of the grid such that at least one circuit path micro node segment is changed electrically to a non-parallel micro node segment in relation to other circuit path micro node segments in the candidate macro node to generate data representative of re-arranged electrically conductive circuit paths for the grid. The method includes forming the re-arranged electrically conductive circuit paths for the grid.

Another aspect of the embodiments includes a system comprising: a memory device and a computing device comprising at least one processor and coupled to the memory device. The at least one processor configured to: form a grid with a plurality of macro nodes, each macro node including a plurality of micro nodes, a first macro node being a start macro node and a second macro node being an end macro node, wherein the grid comprising a plurality of meandering electrically conductive circuit paths through the macro nodes such that each circuit path comprising circuit path micro node segments in each macro node having an ingress micro node and an egress micro node continuously electrically linked through a set of micro nodes of the plurality of micro nodes beginning from a start micro node in the start macro node through the grid to end at an end micro node in the end macro node; identify a candidate macro node in the grid which includes only parallel circuit path micro node segments, wherein each parallel circuit path micro node segment extends parallel from the ingress micro nodes to the egress micro node of the candidate macro node; receive selection of the candidate macro node; re-arrange the parallel circuit path micro node segments of the plurality of micro node electrically conductive circuit paths in the candidate macro node of the grid such that at least one circuit path micro node segment is changed electrically to a non-parallel circuit path micro node segment in relation to other circuit path micro node segments in the candidate macro node to generate data representative of re-arranged electrically conductive circuit paths for the grid.

An aspect of the embodiments includes a tangible, non-transitory computer readable medium having program instructions executed by at least one processor to perform a method comprising: forming a grid with a plurality of macro nodes, each macro node including a plurality of micro nodes, a first macro node being a start macro node and a second macro node being an end macro node, wherein the grid comprising a plurality of meandering electrically conductive circuit paths through the macro nodes such that each circuit path comprising circuit path micro node segments in each macro node having an ingress micro node and an egress micro node continuously electrically linked through a set of micro nodes of the plurality of micro nodes beginning from a start micro node in the start macro node through the grid to end at an end micro node in the end macro node; identifying a candidate macro node in the grid which includes only parallel circuit path micro node segments, wherein each parallel circuit path micro node segment extends parallel from the ingress micro nodes to the egress micro node of the candidate macro node; selecting the candidate macro node; and re-arranging, by a processor, the parallel circuit path micro node segments of the plurality of micro node electrically conductive circuit paths in the candidate macro node of the grid such that at least one circuit path micro node segment is changed electrically to a non-parallel circuit path micro node segment in relation to other circuit path micro node segments in the candidate macro node to generate data representative of re-arranged electrically conductive circuit paths for the grid.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 29A-29K illustrate re-arrangement configuration profiles for a 4×4 candidate macro node;

FIG. 30A is a macro node layout for a 6×6 micro node configuration;

FIG. 30B is a flow diagram of the reconnection algorithm;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first node" and "second node," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to the generation of a circuit design of a pseudo-random or random circuit that covers a predetermined area of an item, such as a printed circuit board. In some embodiments, the circuit contains openings, sometimes referred to as node-free zones, that accommodate one or more surface conditions of the item. In operation the circuit covers the item, and a short or breach of the circuit can be detected. Upon detection, actions can be taken with respect to the item. For example, upon detection of a short or breach of the circuit, electrical power to the item may be halted.

Figure 1:
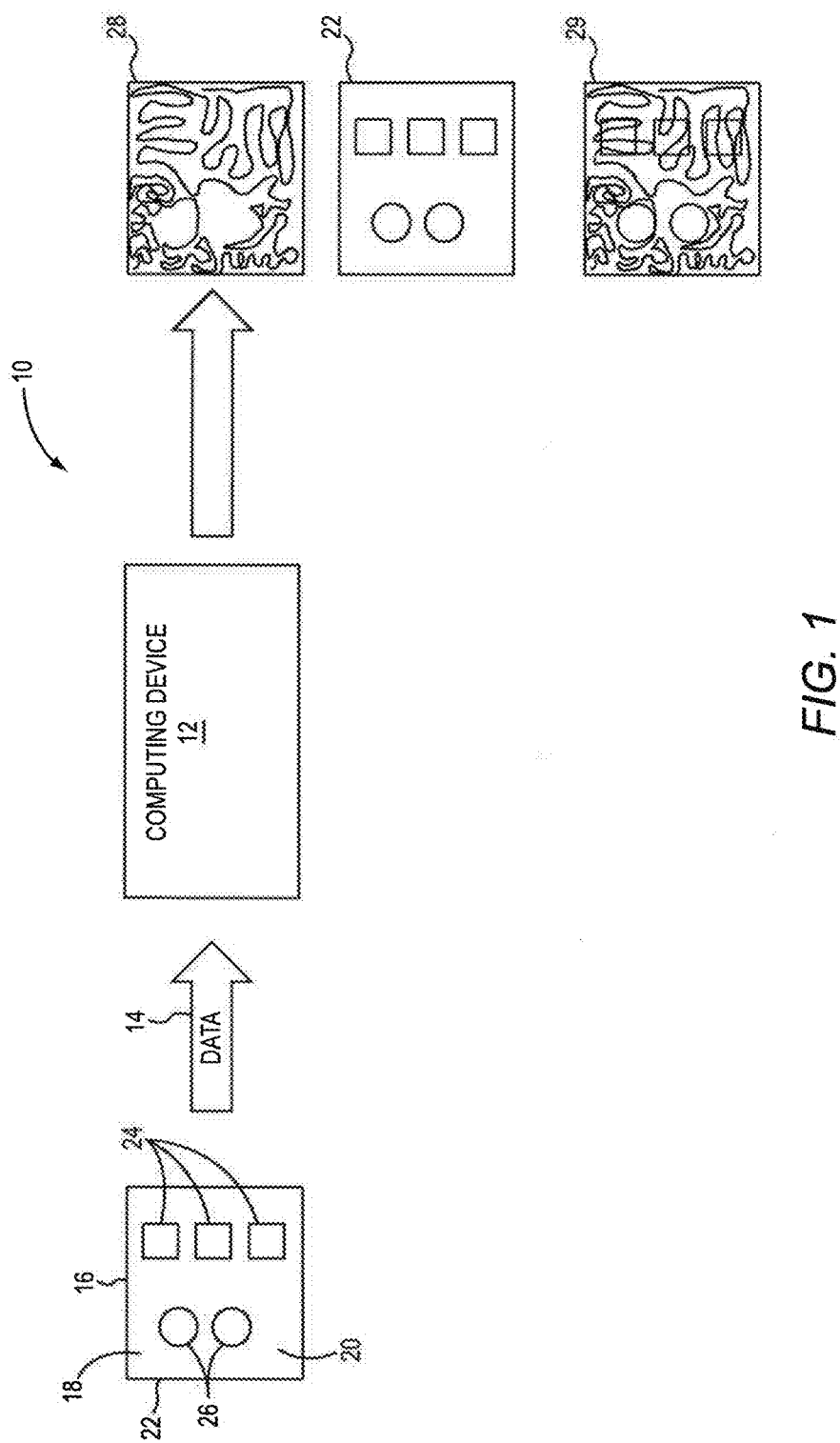
FIG. 1 is a block diagram of a system in which embodiments can be practiced according to one embodiment.

FIG. 1 is a block diagram of a system 10 in which embodiments can be practiced according to one embodiment. The system 10 includes a computing device 12. The computing device 12 receives data 14 that identifies a perimeter 16 of an area 18 of a surface 20 of an item 22. The item 22 may comprise any desired thing, but in one embodiment the item 22 comprises a printed circuit board upon which one or more electronic components 24 are mounted. The data 14 may comprise any suitable form, and can include, by way of non-limiting example, an image of the surface area, a data file that describes the surface area, such as a Drawing Interchange Format (DXF) file, or a vector file, or, in some embodiments, the data 14 may at least in part be entered by a user. In some embodiments, one or more sub-areas 26 that are within the area 18 may be identified in the data 14. The sub-areas 26 may identify surface conditions of the item 22 that contain certain features, such as a particularly tall component, a component that receives or transmits electromagnetic radiation, or a thermal hotspot of the item 22.

The computing device 12 receives the data 14 and generates, as described in greater detail below, a nodal list of a grid of nodes that is referenced to the area 18. The computing device 12 then, utilizing the nodal list, defines a pseudo-random circuit path through the grid of nodes. The nodal list can be utilized to generate a conductive circuit 28. The conductive circuit 28 has a random or pseudo-random pattern. The conductive circuit 28 can be adhered or otherwise fixed with respect to the item 22 to form an assembly 29 that comprises the conductive circuit 28 and the item 22. The assembly 29 may include circuitry that is coupled to the conductive circuit 28 and that can detect a short or a breach of the conductive circuit 28. Upon detection, the circuitry may take one or more desired actions, including, for example, halting power to the item 22.

Figure 2:
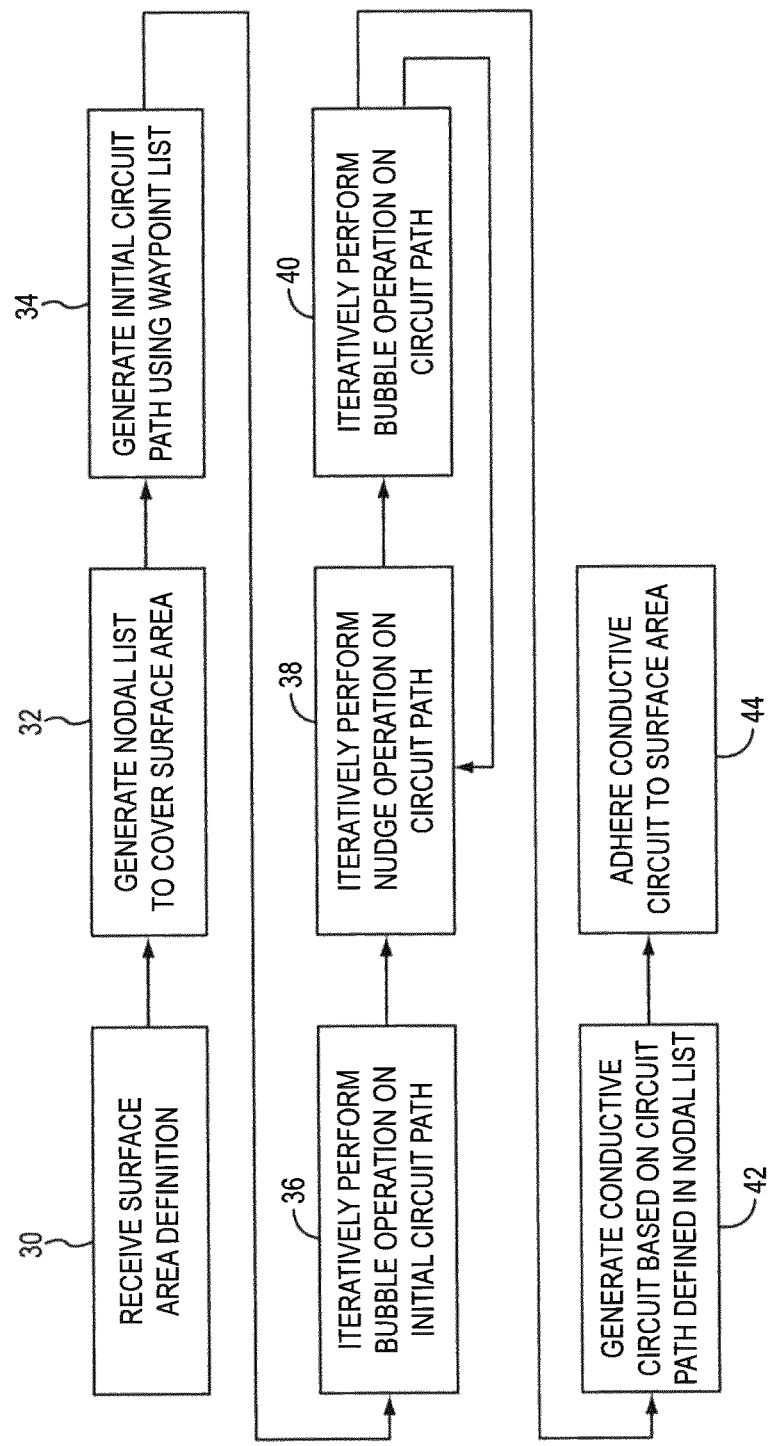
FIG. 2 is a flowchart of a method for generating a circuit.

FIG. 2 is a flowchart of a method for generating a circuit in greater detail than that discussed above with regard to FIG. 1, FIG. 2 will be discussed in conjunction with FIG. 1. Initially, the computing device 12 receives a surface area definition, in the form of the data 14, that identifies the surface area 18 of the item 22 (FIG. 2, block 30). The computing device 12 generates a nodal list that defines a grid of nodes that covers the surface area 18 (FIG. 2, block 32). A detailed discussion of the generation of an example nodal list is discussed below. An initial circuit path is generated through the nodal list using a waypoint list (FIG. 2, block 34). A detailed discussion of the generation of an example initial circuit path is also presented below. A bubble operation is iteratively performed on the circuit path (FIG. 2, block 36). As will be discussed in greater detail below, the bubble operation randomly alters the circuit path based on certain conditions of the nodes in the nodal list. In some embodiments, the bubble operation is iteratively performed until no nodes in the nodal list meet the conditions necessary for a bubble operation to be performed.

After bubble operation processing is finished, one or more orphan nodes that are not connected to the circuit path may exist. The computing device 12 iteratively performs a nudge operation to bring at least some of the orphan nodes into the circuit path (FIG. 2, block 38). After completion of nudge operation processing, at least some nodes in the nodal list may again meet the conditions necessary for a bubble operation. The computing device 12 may again perform the bubble operation iteratively until no nodes in the nodal list meet the conditions necessary for a bubble operation (FIG. 2, block 40). Blocks 38 (nudge operation processing) and 40 (bubble operation processing) may be successively performed one or more times. After completion, a circuit path is defined in the nodal list. The computing device 12, or another device, may generate the conductive circuit 28 based on the circuit path defined in the nodal list (FIG. 2, block 42). The conductive circuit 28 may then be adhered to the surface area 18 (FIG. 2, block 44).

Figure 3:
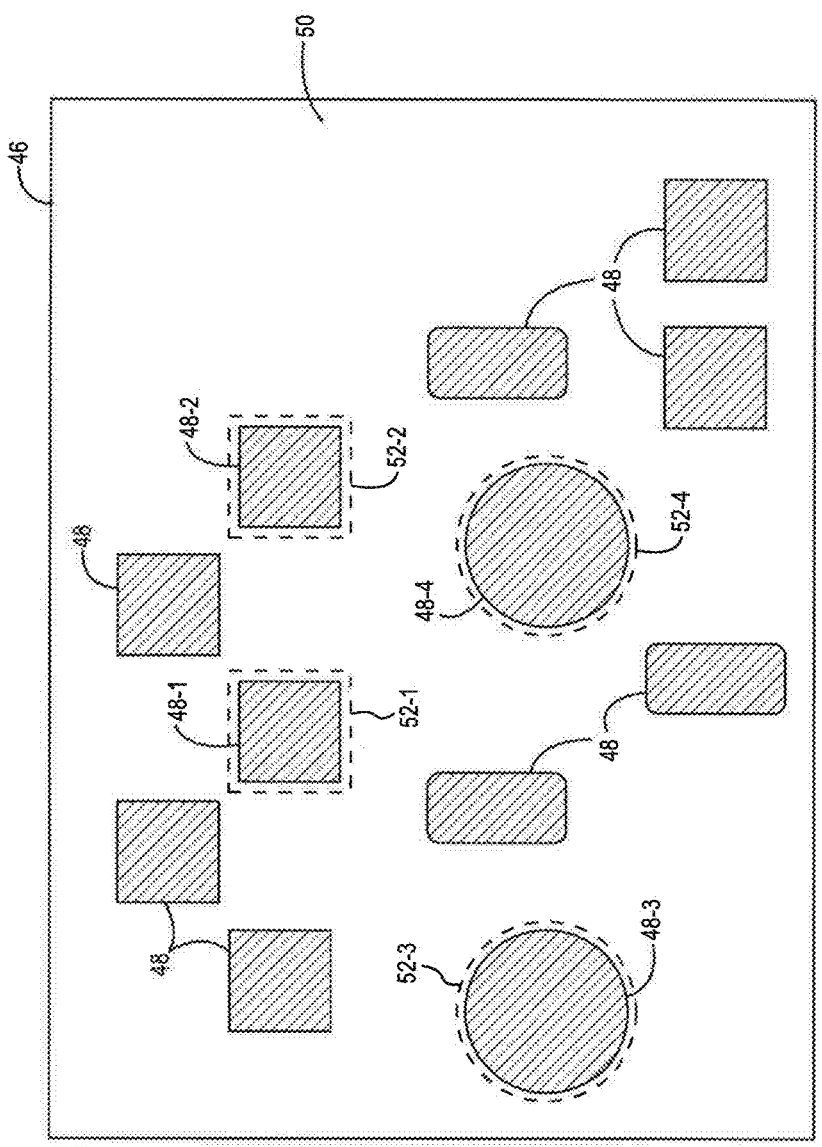
FIG. 3 is a block diagram of an example item.

FIG. 3 is a block diagram of an example item 46 and will be discussed in conjunction with FIGS. 4 and 5 to illustrate the generation of a nodal list according to one embodiment. The item 46 is a printed circuit board that includes a plurality of components 48, and components 48-1-48-4 (generally, components 48) mounted with respect to a surface 50 of the item 46. The components 48-1 and 48-2 comprise a receiver and a transmitter, respectively, and accordingly, it is undesirable to place an electronic circuit over the components 48-1 and 48-2. Accordingly, sub-areas 52-1 and 52-2 identify surface conditions of the surface 50 over which it is not desired to place an electronic circuit. The components 48-3 and 48-4 have a relatively substantial height and extend relatively far above the other components 48. Adhering an electronic circuit on top of the components 48-3, 48-4, which also covers the remainder of the components 48 may be difficult, and thus sub-areas 52-3 and 52-4 also identify surface conditions of the surface 50 over which it is not desired to place an electronic circuit. While not illustrated, other such surface conditions may comprise, for example, thermal hotspots that exist on the surface 50, and over which it may be undesirable to place an electronic circuit. The perimeter of an area of the surface 50 of the item 46, and information that identifies the sub-areas 52-1-52-4, are provided to the computing device 12 (FIG. 1). The information may be provided via user input, or may be contained in a file or other electronic medium accessible by the computing device 12.

The computing device 12 uses the information to generate a nodal list that identifies a grid of nodes that is referenced to the area of the surface 50 and that uniformly covers the area of the surface 50 outside of the sub-areas 52-1-52-4 at a predetermined resolution, or density. Any desired density may be used, but higher density may make it more difficult to circumvent the resultant electronic circuit. By way of non-limiting example, the nodes may be placed 6 microns apart from one another, to facilitate 3 micron wide electronic traces.

Figure 4:
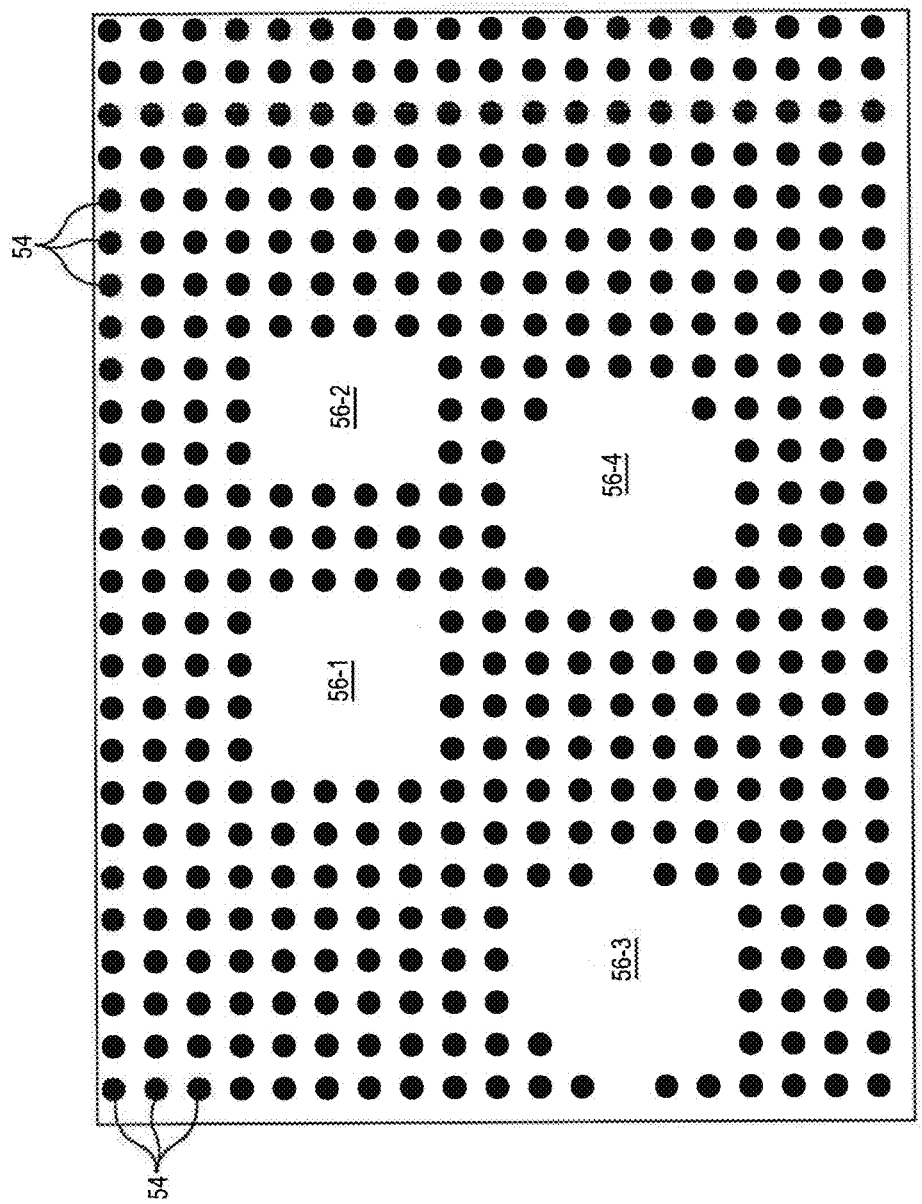
FIG. 4 is a block diagram of a representation of a grid of nodes identified in a nodal list.

FIG. 4 is a block diagram of a representation of a grid of nodes 54 identified in a nodal list that is generated based on the information discussed above with regard to the item 46. Note that for purposes of illustration the grid of nodes 54 is not substantially dense, and in practice, the density would likely be substantially higher. Note also that the grid of nodes 54 includes node-free zones 56-1-56-4 which correspond, respectively, to sub-areas 52-1-52-4. The node-free zones 56-1-56-4 ensure that the circuit path, as discussed in greater detail herein, does not extend into the node-free zones 56-1-56-4.

Figure 5:
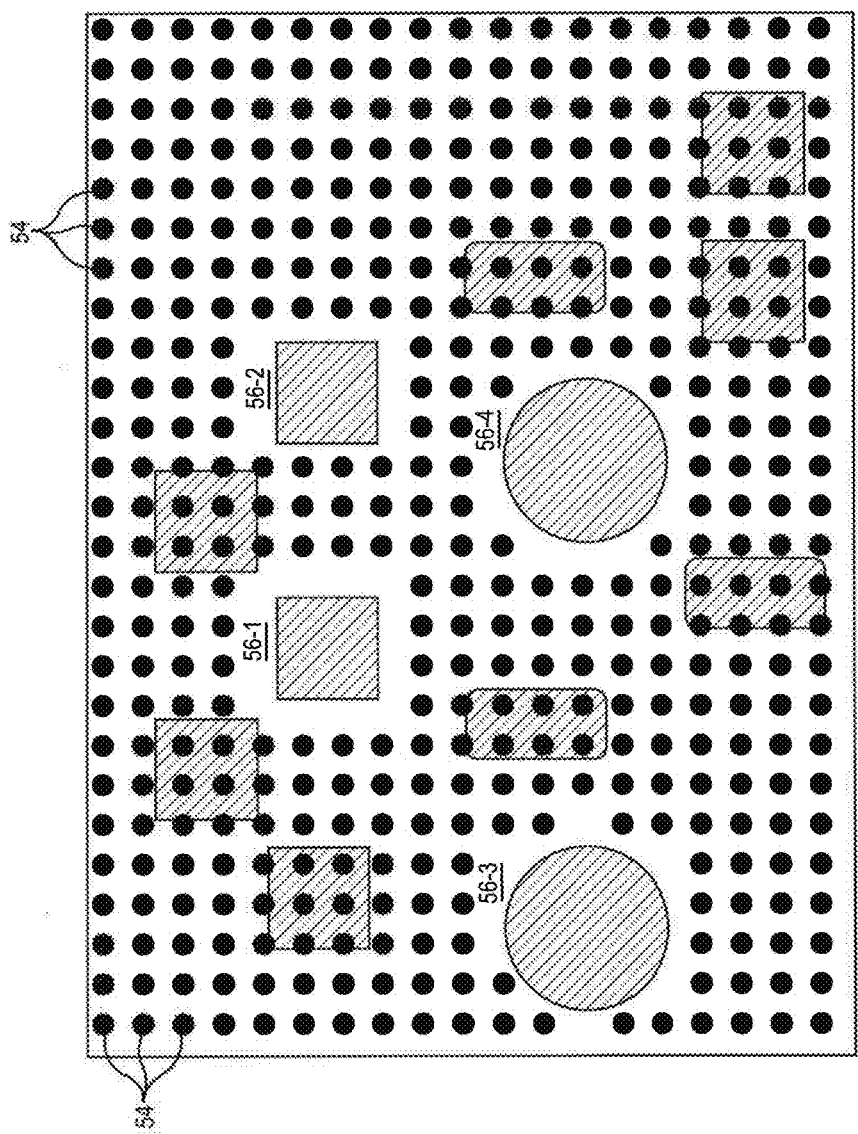
FIG. 5 is a block diagram illustrating the grid of nodes illustrated in FIG. 4 overlaid on top of the item illustrated in FIG. 3.

FIG. 5 is a block diagram illustrating the grid of nodes 54 illustrated in FIG. 4 overlaid on top of the item 46 illustrated in FIG. 3. Note that the node-free zones 56-1-56-4 of the grid of nodes 54 align with the sub-areas 52-1-52-4 of the surface 50.

Figure 6:
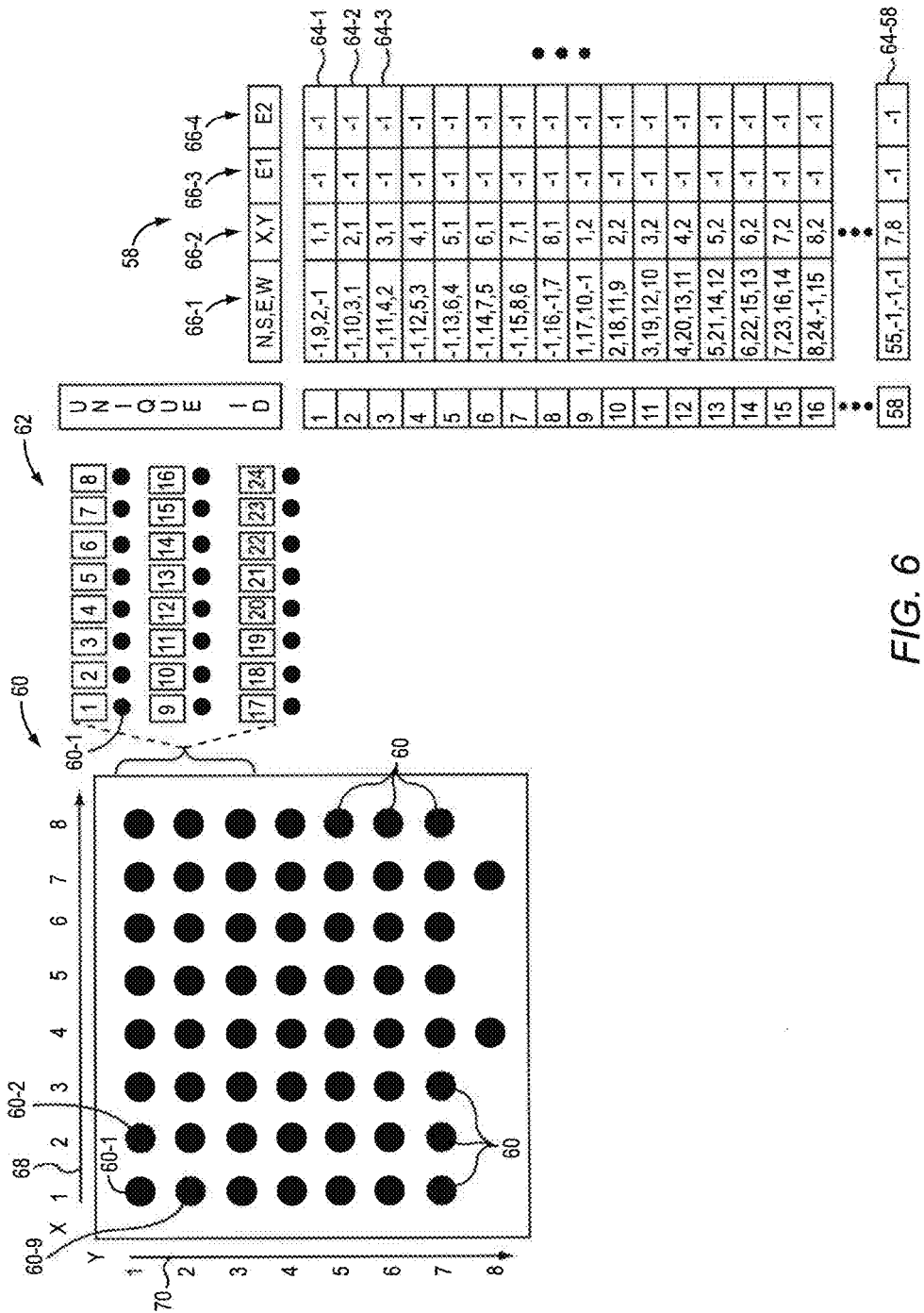
FIG. 6 is a block diagram illustrating a nodal list that identifies a grid of nodes according to one embodiment.

FIG. 6 is a block diagram illustrating a nodal list 58 that identifies a grid of nodes 60 according to one embodiment. Each node 60 identified in the nodal list 58 may have a unique identifier (UID) 62. For purposes of illustration, the first three rows of the grid of nodes 60 are illustrated with corresponding UIDs 62 placed in proximity of the corresponding node 60. In this embodiment, UIDs 62 have been provided based on a right to left, top to bottom sequence of the nodes 60, but the embodiments are not limited to any particular mechanism for providing unique identifiers.

The nodal list 58 maintains information about each node 60 identified in the nodal list 58. The information, for purposes of illustration, is illustrated as rows 64-1-64-58 (generally, rows 64) of the nodal list 58. The grid of nodes 60 contains fifty-eight nodes, and thus, the nodal list 58 comprises fifty-eight rows 64. Each row 64 contains one or more data fields 66-1-66-4 of information that identify information about the corresponding node. In particular, the data field 66-1 of the nodal list 58 identifies the UID 62 of each neighbor node 60 of the respective node 60. A neighbor node 60 is an immediately adjacent node 60 in the grid of nodes 60. For example, with reference to the UIDs 62, node 60-1 having the MD 62 value 1 has two neighbor nodes 60, a node 60-2 having the UID 62 value 2 and a node 60-9 having the UID 62 value 9. For purposes of illustration, the direction of one node with respect to another may be referred to herein as north (up), south (down), east (right) and west (left). Thus, the node 60-1 is west of the node 60-2 and north of the node 60-9. This is illustrated in the data field 66-1 of the row 64-1 that identifies the node 60-1. Data field 66-1 identifies the neighbor node 60 that is north of the node 60-1 as "−1," which is a predetermined value utilized to indicate the absence of a node 60. Thus, the node 60-1 has no north neighbor. The neighbor node 60 that is south of the node 60-1 is identified by the UID 62 value 9 (node 60-9), the neighbor node 60 that is east of the node 60-1 is identified by the UID 62 value 2 (node 60-2), and the neighbor node 60 that is west of the node 60-1 is identified by the value "−1" because the node 60-1 has no west neighbor.

In one embodiment, the location of each node 60 with respect to an X-axis 68 and Y-axis 70 may be maintained in a data field 66-2 of each row 64. Data fields 66-3, 66-4 identify neighbor nodes 60 to which the node 60 has an "edge," sometimes referred to herein as a connection. Edges are utilized to define a circuit path through the grid of nodes 60, which comprises a succession of nodes 60 that are connected to one another. When the nodal list 58 is initially generated, the data fields 66-3, 66-4 may be initialized to a value of "−1," or some other predetermined value, to indicate that the nodes 60 are unconnected to one another.

The UIDs 62 of each node 60 may also be maintained in the row 64 of the corresponding node 60, or, the UIDs 62 may be maintained through an inherent position of the respective row 64 in the nodal list 58. For example, the node 60 having the UID 62 value 1 may be the first entry in the nodal list 58, and the node 60 having the UID 62 value 2 may be the second entry in the nodal list 58, etc.

Figure 7:
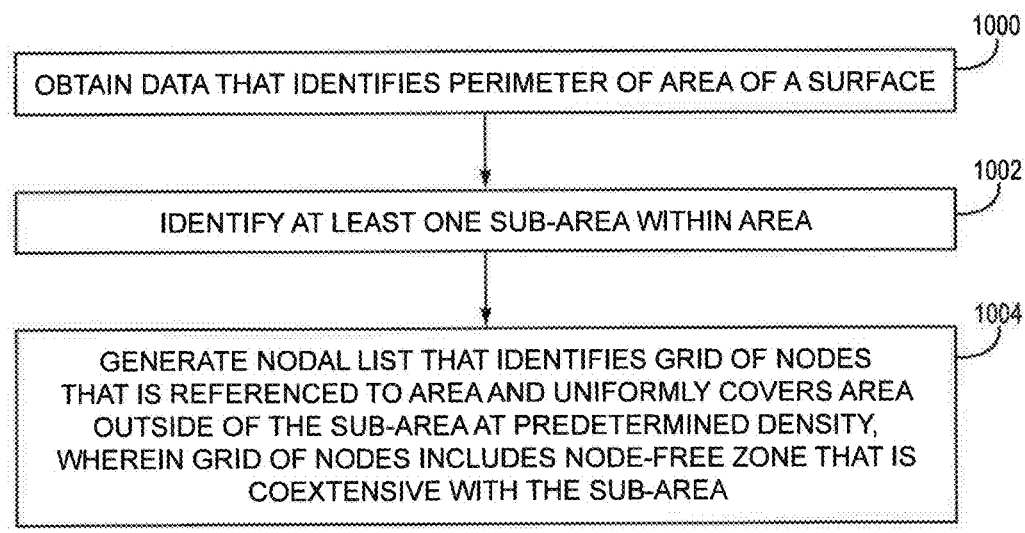
FIG. 7 is a flowchart of a method for generating a nodal list according to one embodiment.

FIG. 7 is a flowchart of a method for generating a nodal list according to one embodiment, and will be discussed in conjunction with FIG. 1. The computing device 12 receives the data 14 that identifies the perimeter 16 of the area 18 of the surface 20 of the item 22 (FIG. 7, block 1000). While for purposes of illustration, the perimeter 16 is illustrated as having a rectangular shape, the embodiments are not limited to any particular shapes, and can be utilized to generate nodal lists for any perimeter shape.

The computing device 12 identifies at least one sub-area 26 within the area 18 (FIG. 7, block 1002). As discussed above, the at least one sub-area 26 may be identified based on information contained in the data 14. The at least one sub-area 26 may correspond, for example, to a component on the surface 20 or a thermal hot-spot of the surface 20.

The computing device 12 generates a nodal list that identifies a grid of nodes that is referenced to the area 18 and that uniformly covers the area 18 outside of the at least one sub-area 26 at a predetermined density, such that the grid of nodes comprises a node-free zone that is coextensive with the at least one sub-area 26 (FIG. 7, block 1004). For each respective node, the nodal list identifies each neighbor node of the respective node.

Figure 8:
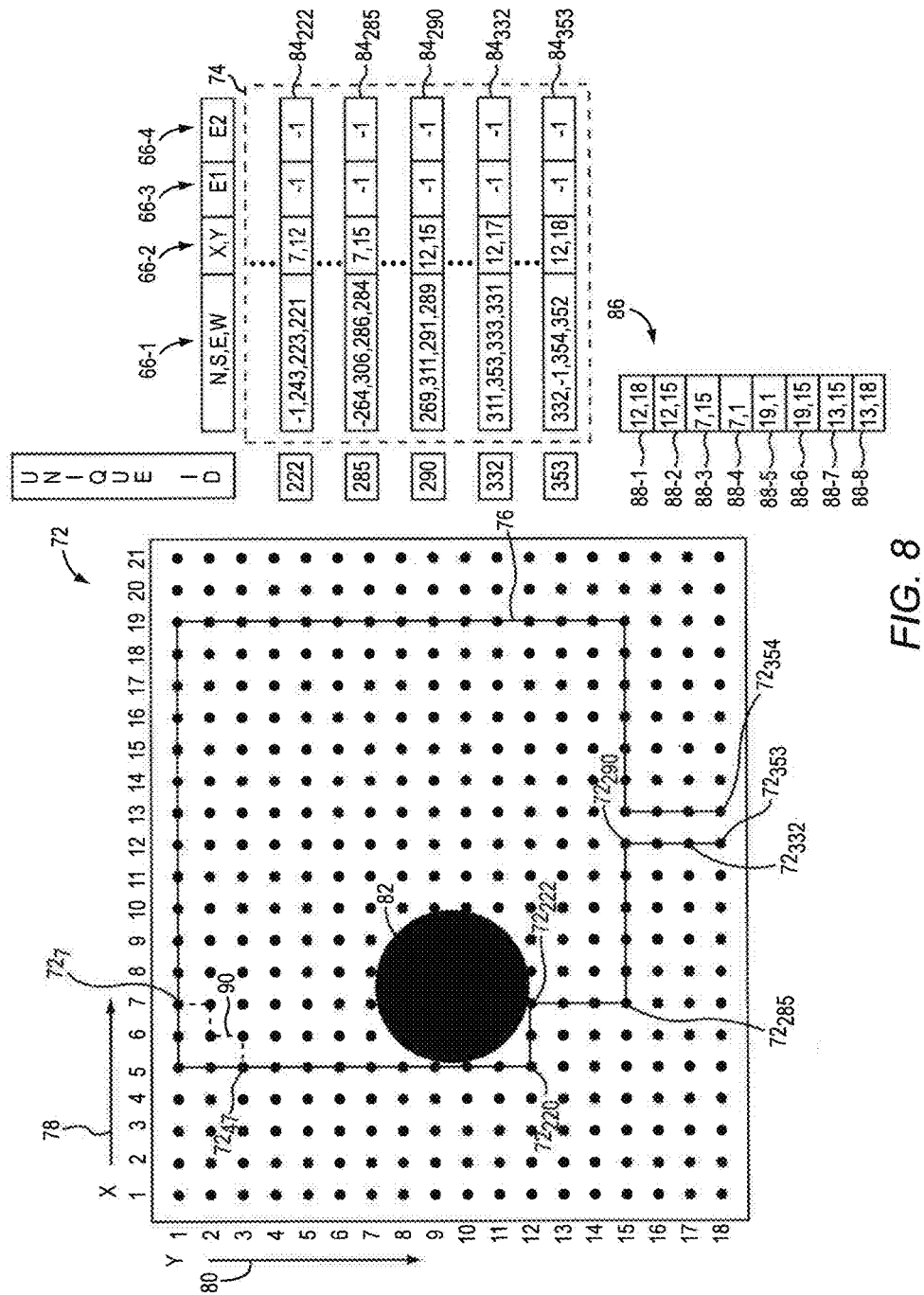
FIG. 8 is a block diagram of a representation of a grid of nodes identified in a nodal list that has the same, or substantially similar, data field layout to that discussed above with regard to the nodal list of FIG. 6.

FIG. 8 is a block diagram of a representation of a grid of nodes 72 identified in a nodal list 74 that has the same, or substantially similar, data field layout to that discussed above with regard to the nodal list 58 of FIG. 6. FIG. 8 will be discussed with reference to the modification of the nodal list 74 to identify a circuit path 76 through the grid of nodes 72. For purposes of illustration, the grid of nodes 72 has been labeled with an X-axis 78 and Y-axis 80 that have a 1,1 origin at the top left corner of the grid of nodes 72. A node-free zone 82 is identified in the nodal list 74 that encompasses the area of 16 nodes. The nodal list 74 thus has 362 entries (21 columns*18 rows−16 nodes in node-free zone 82) because the grid of nodes 72 contains 362 nodes 72, but for purposes of illustration, only entries $84_{222}$, $84_{285}$, $84_{290}$, and $84_{353}$ (generally, entries 84) are illustrated. For purposes of illustration, individual nodes 72 will be referenced herein with a subscript that corresponds to the UID of the respective node 72. Similarly, entries 84 include the subscript of the node 72 to which the entry 84 corresponds. Thus, entry $84_{222}$ corresponds to node $72_{222}$, entry $84_{285}$ corresponds to node $72_{285}$, entry $84_{290}$ corresponds to node $72_{290}$, and entry $84_{353}$ corresponds to node $72_{353}$.

The computing device 12 receives a waypoint list 86 that identifies a start node 72 through a succession of neighbor nodes 72 to an end node 72 through the grid of nodes 72 which the circuit path 76 is to traverse. In one embodiment, the waypoint list 86 comprises a plurality of entries 88-1-88-N (generally, entries 88), each entry 88 identifying a particular node 72. The start and end nodes 72 may be identified in any desired manner. In one embodiment, the first node 72 identified in the waypoint list 86 comprises the start node 72, and the last node 72 identified in the waypoint list 86 comprises the end node 72. Each successive node 72 identified in the waypoint list 86 after the start node 72 identifies nodes 72 that the circuit path 76 is to traverse, and identifies the particular order of traversal. While for purposes of illustration the entries 88 identify the nodes 72 by X,Y coordinates, it will be apparent that the entries 88 could identify the nodes 72 in any desired manner, such as by UIDs, or by locations on the surface 20 of the item 22. If the nodes 72 are identified by locations on the surface 20 of the item 22, the computing device 12 may determine the closest nodes 72 that correspond to the identified locations.

The first entry 88-1 of the waypoint list 86 identifies the node $72_{353}$ at location X=12 and Y=18 as the start node. The entry 88-2 identifies the node $72_{290}$ as the next node 72 on the waypoint list 86. The computing device 12 generates the circuit path 76 iteratively by altering the data fields 66-3, 66-4 of respective entries 84 of the waypoint list 86 to identify edges, or connections, between the respective nodes 72. The computing device 12 makes determinations with respect to a most recent node 72 made part of the circuit path 76 and the next node 72 that is identified on the waypoint list 86 but that is not yet part of the circuit path 76. At the beginning, the first node that will be entered on the circuit path 76 is the start node $72_{353}$, and the next node 72 that is identified on the waypoint list 86 but that is not yet part of the circuit path 76 is the node $72_{290}$. The computing device 12 makes a determination of a preferred direction and a secondary direction based on the X,Y coordinates of the nodes $72_{353}$ and $72_{290}$. In particular, computing device 12 determines the absolute (irrespective of a positive or negative value) distance between the nodes $72_{353}$ and $72_{290}$ in terms of the X direction and the Y direction. The longer distance is set as the preferred direction and the shorter distance as the secondary direction. In this example, the node $72_{290}$ has X,Y coordinates of 12, 15 and the node $72_{353}$ has X,Y coordinates of 12, 18. The calculation for the X direction is 12−12=0, and for the Y direction is 15−18=−3. Thus the Y direction is the preferred direction and the X direction is the secondary direction. Because the Y value is negative, the computing device 12 will attempt to build the circuit path 76 in a north (upward) direction.

The computing device 12 determines that the node $72_{332}$ at X,Y coordinates 12, 17 is unconnected to any other nodes 72, and thus makes the node $72_{332}$ the next node 72 in the circuit path 76. The computing device 12 makes this determination by analyzing the data fields 66-3, 66-4 of the corresponding entry $84_{332}$ of the node $72_{332}$ in the nodal list 74. Because the data fields 66-3, 66-4 of the entry $84_{332}$ have a value of −1, the node $72_{332}$ is not currently connected to any other node 72 and can be made part of the circuit path 76. The computing device 12 alters the data field 66-4 of the entry $84_{353}$ to have a value of 332 to show that the node $72_{353}$ is connected to the node $72_{332}$, and alters the data field 66-3 of the entry $84_{332}$ to have a value of 353. The computing device 12 then repeats the determination of a preferred direction and a secondary direction based on the X,Y coordinates of the node $72_{332}$ and the X,Y coordinates of the node $72_{290}$.

The computing device 12 iteratively continues this process and the circuit path 76 will grow as illustrated in FIG. 8. At node $72_{222}$, the next node 72 identified in the waypoint list 86 is the node $72_7$. The computing device 12 determines that the Y direction (north) is the preferred direction. However, the data field 66-1 of the entry $84_{222}$ indicates that the node $72_{222}$ has no north neighbor. This is due to the node-free zone 82. The computing device 12 then selects the secondary direction, east/west, and arbitrarily chooses west, since the node $72_{222}$ has the same X coordinate as the node $72_7$. The computing device 12 continues to add nodes 72 to the circuit path 76 until a node 72, in this example the node $72_{220}$, allows the circuit path 76 to continue in a north direction.

In one embodiment, it may be desirable to reduce or eliminate zig-zag path segments, such as is illustrated by the dashed line segments 90, which may otherwise happen when the X and Y distances between the current node 72 and the next node 72 in the waypoint list 86 fall within +1 or −1 of one another. In one embodiment, the computing device 12 maintains a previous direction indicator that indicates the last direction of the circuit path 76. After determination of the preferred direction and the secondary direction, and so long as neither distance is zero, the computing device 12 determines if the secondary direction is the same as the previous direction. If so, then the computing device 12 sets the secondary direction as the preferred direction and continues to build the circuit path 76 in the same direction as the previous direction. However, to prevent "overshooting" the next node 72 on the waypoint list 86, if either distance is zero, then the computing device chooses the preferred direction irrespective of the previous direction.

The computing device 12 continues this process until the circuit path 76 ends at the node $72_{354}$, the final node 72 identified in entry 88-8 of the waypoint list 86. The circuit path 76 is identified in the nodal list 74 via the data fields 66-3, 66-4.

Figure 9:
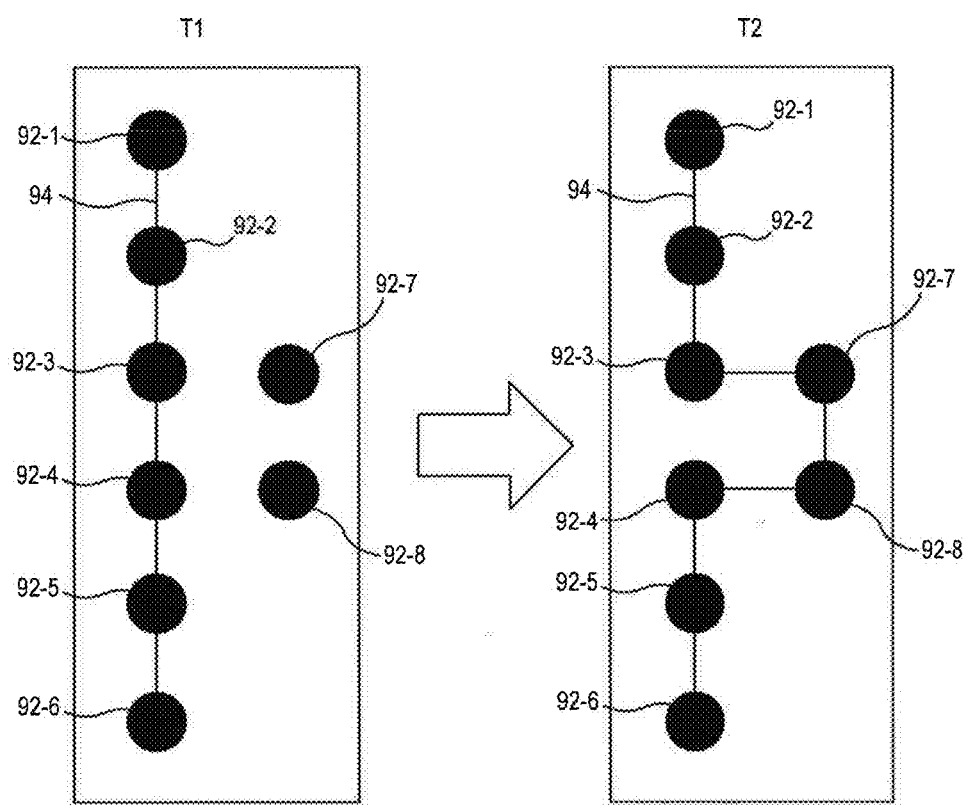
FIG. 9 is a block diagram of a subset of nodes through which a circuit path extends, and which will be used to explain a bubble operation according to one embodiment.

After the circuit path 76 is generated, the computing device 12, for a plurality of iterations, performs a bubble operation on the circuit path 76 to modify the circuit path 76 to encompass all, or substantially all, of the remaining nodes 72 in a pseudo-random, or random, manner. FIG. 9 is a block diagram of a subset of nodes 92 through which a circuit path 94 extends, and which will be used to explain the bubble operation. Assume that a nodal list (not illustrated) identifies the nodes 92-1-92-6 as part of the circuit path 94, and identifies nodes 92-7-92-8 as not being part of the circuit path 94. The computing device 12 examines the nodal list to identify a first pair of nodes 92 that are successive nodes in the circuit path 94 and that are adjacent to a second pair of nodes 92 that are out of the circuit path 94. Successive nodes 92 are nodes 92 that are immediately adjacent to one another in the circuit path 94, and may be determined by the computing device 12 by analyzing the data fields 66 (FIG. 8) of the nodal list.

In this example, the computing device 12 determines, at a time T1, that the nodes 92-3 and 92-4 are successive nodes in the circuit path 94 and are adjacent to a second pair of nodes 92-7 and 92-8 that are out of the circuit path 94. Again, the computing device 12 can determine that the nodes 92-7 and 92-8 are out of the circuit path 94 and are adjacent to the nodes 92-3 and 92-4 by analyzing the data fields 66 of the nodal list.

The computing device 12 then alters the circuit path 94, at a time T2, to make the second pair of nodes 92-7, 92-8 part of the circuit path 94, such that the first pair of nodes 92-3, 92-4 are no longer successive nodes 92 in the circuit path 94. This process may be iteratively repeated until no pairs of nodes 92 that are successive nodes 92 in the circuit path 94 are adjacent to a second pair of nodes 92 out of the circuit path 94.

Figure 10B:
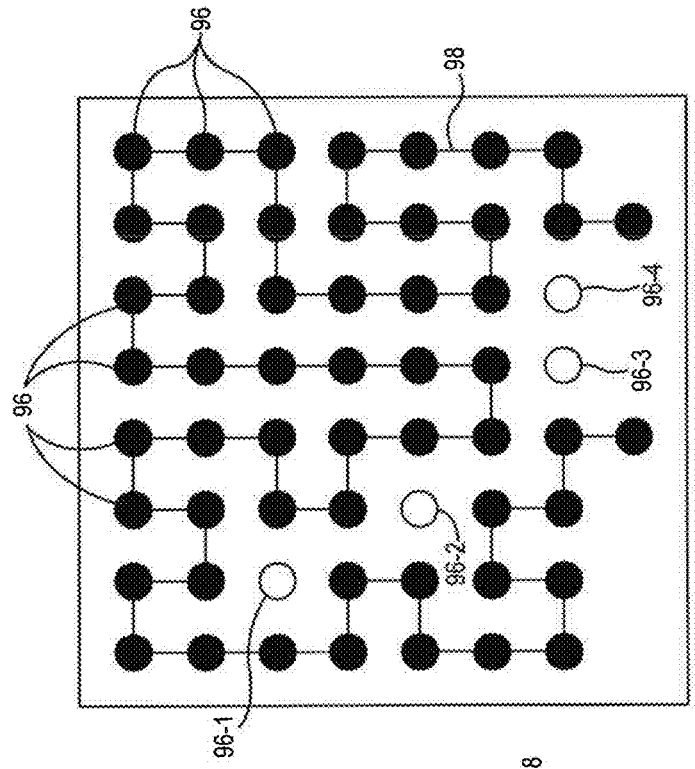
FIG. 10B is a block diagram of the circuit path illustrated in FIG. 10A at a subsequent point in time after a computing device has iteratively performed the bubble operation on the circuit path until no pairs of nodes that are successive nodes in the circuit path are adjacent to a second pair of nodes out of the circuit path.
Figure 10A:
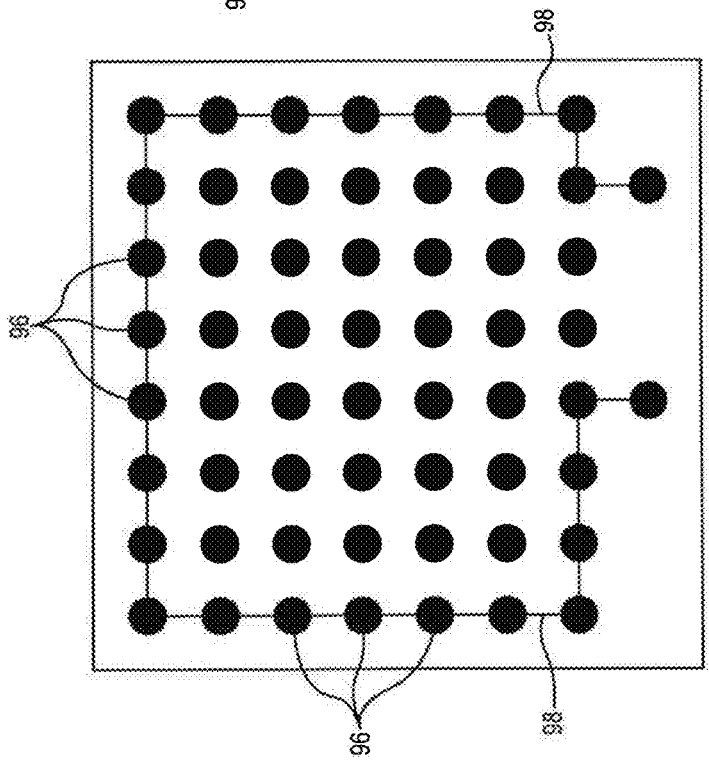
FIG. 10A is a block diagram of another grid of nodes through which an initial circuit path has been defined.

FIG. 10A is a block diagram of another grid of nodes 96 through which an initial circuit path 98 has been defined. FIG. 10B is a block diagram of the circuit path 98 at a subsequent point in time after the computing device 12 has iteratively performed the bubble operation on the circuit path 98 until no pairs of nodes 96 that are successive nodes 96 in the circuit path 98 are adjacent to a second pair of nodes 96 out of the circuit path 98.

Figure 11:
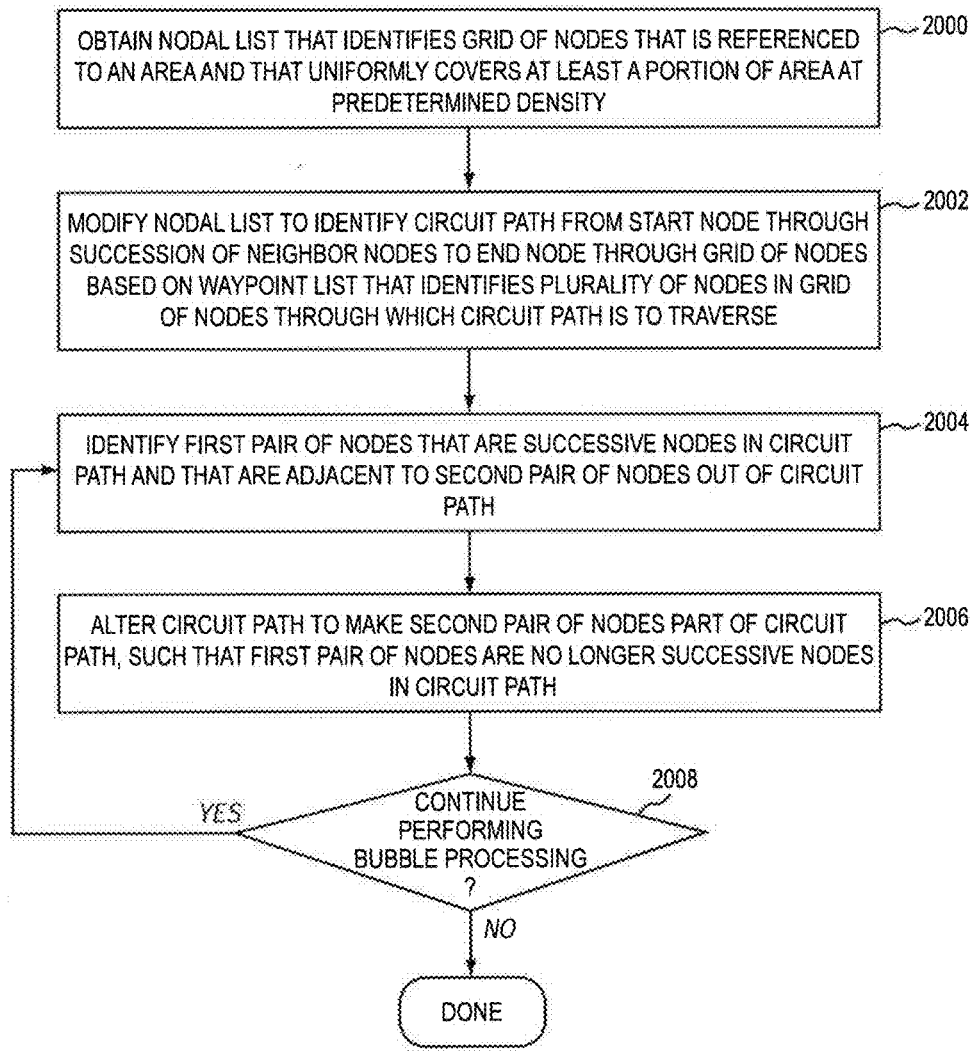
FIG. 11 is a flowchart of a method for making a circuit path according to one embodiment.

FIG. 11 is a flowchart of a method for making the circuit path 98 according to one embodiment. FIG. 11 will be discussed in conjunction with FIGS. 10A and 10B. The computing device 12 obtains a nodal list that identifies the grid of nodes 96 (FIG. 11, block 2000). The nodal list may be formatted substantially similarly, or identically, to the nodal list 74 discussed above with regard to FIG. 8, except that such nodal list would reflect the layout of the grid of nodes 96. The grid of nodes 96 is referenced to an area and uniformly covers at least a portion of the area at a predetermined density.

The computing device 12 modifies the nodal list to identify the circuit path 98 from a start node 96 through a succession of neighbor nodes 96 to an end node 96 based on a waypoint list that identifies a plurality of nodes 96 through which the circuit path 98 is to traverse (FIG. 11, block 2002). The waypoint list may have substantially similar, or identical, fields as the waypoint list 86 discussed above with regard to FIG. 8. The computing device 12 identifies a first pair of nodes 96 that are successive nodes 96 in the circuit path 98 and that are adjacent to a second pair of nodes 96 that are out of the circuit path 98 (FIG. 11, block 2004). The computing device 12 alters the circuit path 98 to make the second pair of nodes 96 pan of the circuit path 98, such that the first pair of nodes 96 are no longer successive nodes 96 in the circuit path 98 (FIG. 11, block 2006). The computing device 12 then determines if another iteration of the bubble operation should be performed, or whether bubble processing is complete (FIG. 11, block 2008). The computing device 12 may continue the bubble processing for a predetermined number of iterations, or until a condition in the circuit path 98 is met, such as until no pairs of nodes 96 that are successive nodes in the circuit path 98 are adjacent to a second pair of nodes 96 out of the circuit path 98. Note that even after bubble processing some nodes 96, such as the nodes 96-1-96-4, are unconnected to the circuit path 98. Such nodes may be referred to herein as "orphan" nodes.

Figures 12A, 12B:
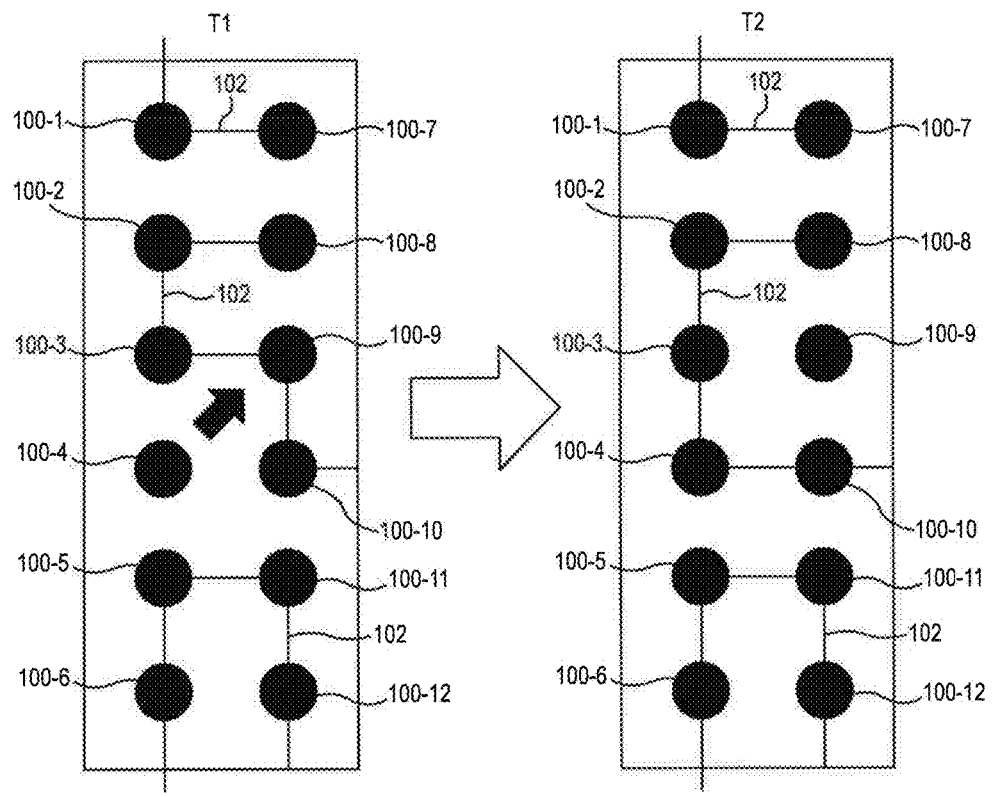
FIG. 12A is a block diagram of a subset of a grid of nodes through which an initial circuit path has been defined.
FIG. 12B is a block diagram of the subset of the grid of nodes illustrated in FIG. 12A at a subsequent point in time after the computing device has iteratively performed a nudge operation on the circuit path according to one embodiment.

FIG. 12A is a block diagram of a subset of a grid of nodes 100 through which an initial circuit path 102 has been defined. FIG. 12B is a block diagram of the subset of the grid of nodes 100 at a subsequent point in time after the computing device 12 has iteratively performed a nudge operation on the circuit path 102. A nudge operation replaces a first node 100 that is in the circuit path 102 with a second (orphan) node 100 that is not in the circuit path 102, such that the first node 100 is no longer in the circuit path 102 and becomes an orphan node.

Referring to FIG. 12A, note that the node 100-4 is an orphan node and is not part of the circuit path 102. At a time T1, the computing device 12 analyzes the nodal list that identifies the nodes 100 and the circuit path 102, and determines that a node 100-9 is cater-corner to the orphan node 100-4 (in a northeast direction), is in the circuit path 102, and is connected via the circuit path 102 to two neighbor nodes 100-3 and 100-10 of the orphan node 100-4. Such conditions mean that the orphan node 100-4 may be swapped with the node 100-9 in a nudge operation. At a time T2, the computing device 12 alters the circuit path 102 to remove the second node 100-9 from the circuit path 102 and to include the orphan node 100-4 in the circuit path 102.

The computing device 12 may perform the nudge operation iteratively, sometimes referred to herein as nudge processing. In some embodiments, the nudge operation may be performed iteratively in a certain direction, such as nudging in northwest, northeast, southwest, or southeast directions. Nudge processing may result in the circuit path 102 being rearranged sufficiently such that bubble processing may again be performed to add orphan nodes 100 to the circuit path 102. Thus, in some embodiments, bubble processing and nudge processing may be iteratively performed, one after the other, multiple times, to reduce or eliminate the number of orphan nodes 100 that are not part of the circuit path 102.

Figure 13A:
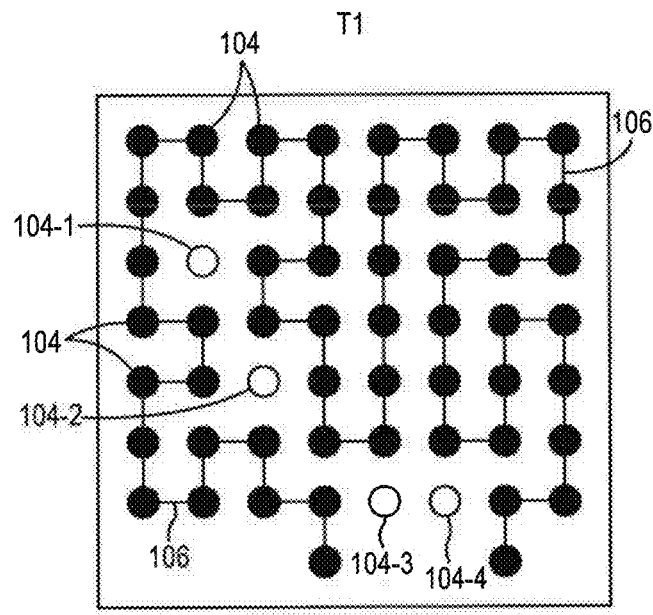
FIGS. 13A-13D are block diagrams that illustrate how iterations of nudge processing and bubble processing can reduce orphan nodes according to one embodiment.
Figure 13B:
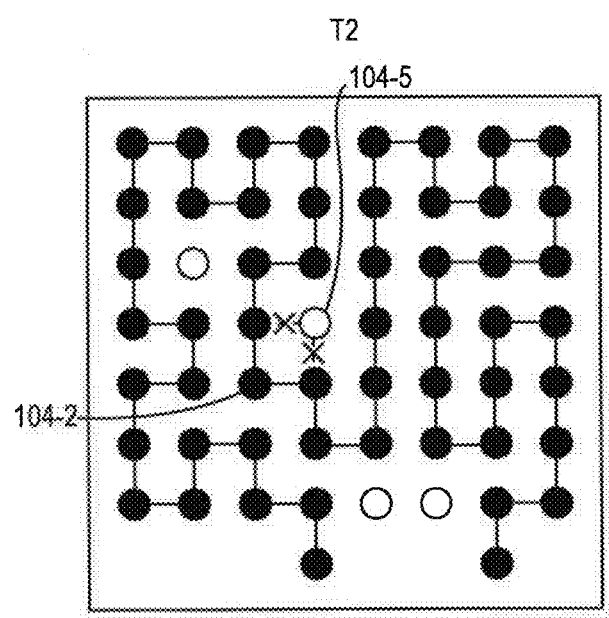
Figure 13C:
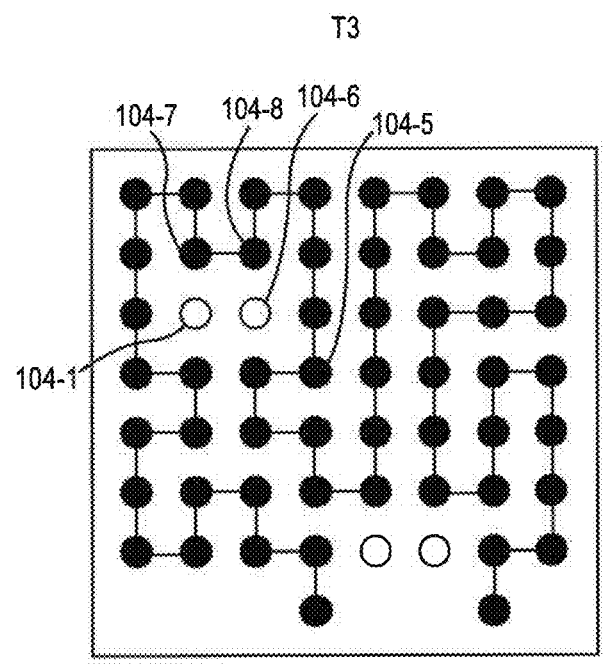
Figure 13D:
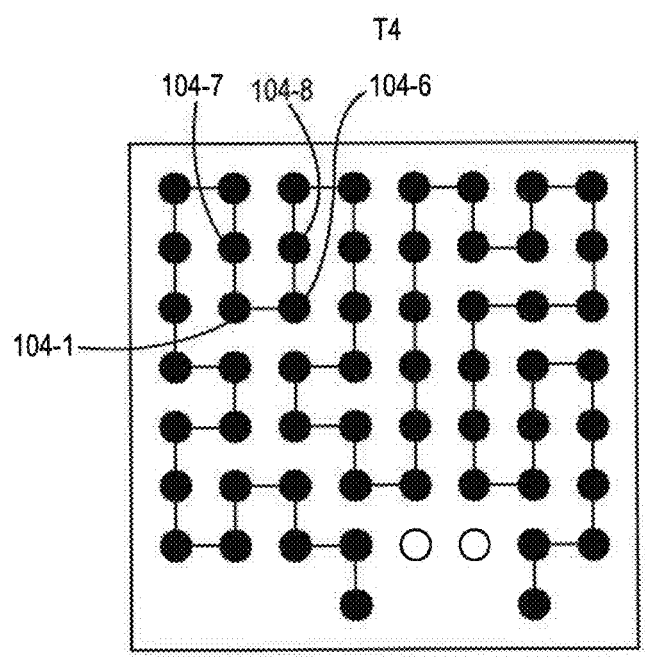

FIGS. 13A-13D are block diagrams that illustrate how iterations of nudge processing and bubble processing can reduce orphan nodes according to one embodiment. FIG. 13A illustrates a grid of nodes 104 at a time T1 after bubble processing has been completed on a circuit path 106. Note that nodes 104-1-104-4 are orphan nodes. FIG. 13B illustrates the grid of nodes 104 at a time T2 after nudge processing has swapped a node 104-5 with the node 104-2, such that the node 104-2 is no longer an orphan node, and the node 104-5 becomes an orphan node. FIG. 13C illustrates the grid of nodes 104 at a time T3 after nudge processing has swapped the node 104-5 with a node 104-6, such that the node 104-5 is no longer an orphan node, and the node 104-6 becomes an orphan node. Note that at time T3, the nodes 104-7 and 104-8 comprise a first pair of nodes 104 that are successive nodes in the circuit path 106, and that are adjacent to a second pair of nodes 104-1, 104-6 that are out of the circuit path 106, and are thus eligible for bubble processing. FIG. 131) illustrates the grid of nodes 104 at a time T4 after the computing device 12 has performed bubble processing to alter the circuit path 106 to make the second pair of nodes 104-1, 104-6 part of the circuit path 106, such that the first pair of nodes 104-7 and 104-8 are no longer successive nodes 104 in the circuit path 106.

While for purposes of illustration, the embodiments have been discussed in conjunction with generating a single circuit path through a grid of nodes, the embodiments are not limited to a single circuit path, and can be utilized to generate any number of intertwined circuit paths that substantially cover an area of an item.

In this regard, it may be desirable in certain embodiments to generate a plurality of separate electrically conductive circuit paths that are in close proximity to one another over substantial portions of the area of the item. Multiple proximal circuit paths spaced closely apart decreases the likelihood that the electrically conductive circuit paths could be circumvented because any attempts at altering a layer of such circuit paths may short, or open, multiple different circuit paths, increasing the likelihood of detection of such an attempted breach.

Figure 14:
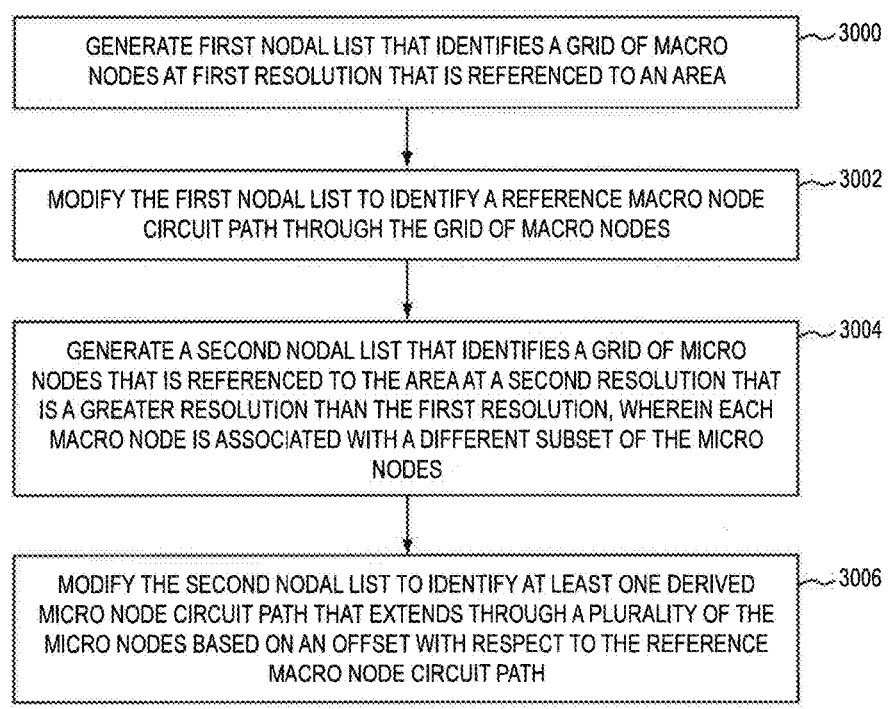
FIG. 14 is a flowchart of a method for generating a plurality of spaced apart circuit paths according to one embodiment.

FIG. 14 is a flowchart of a method for generating a plurality of uniformly spaced circuit paths according to one embodiment. FIG. 14 will be discussed in conjunction with FIG. 1. The computing device 12 (FIG. 1) receives the data 14 that identifies the perimeter 16 of the area 18 of the surface 20 of the item 22. The computing device 12 generates a first nodal list, which, for example, may comprise similar data fields and be formatted substantially similarly to the nodal lists 58, 74, discussed above, and which identifies a grid of macro nodes at a first resolution that is referenced to the area 18 (FIG. 14, block 3000). Each macro node is associated with a particular portion of the area 18. The computing device 12 modifies the first nodal list to identify a reference macro node circuit path through the grid of macro nodes (FIG. 14, block 3002). The computing device 12 generates a second nodal list that identifies a grid of micro nodes that is referenced to the area 18 at a second resolution that is a greater resolution than the first resolution. Each macro node is associated with a different subset of the micro nodes (FIG. 14, block 3004). For example, each macro node is associated with a same portion of the area 18 as the associated subset of micro nodes.

The computing device 12 modifies the second nodal list to identify at least one derived micro node circuit path that extends through a plurality of the micro nodes based on an offset with respect to the reference macro node circuit path (FIG. 14, block 3006). In one embodiment, the reference macro node circuit path may be mapped to micro nodes identified in the second nodal list, and the second nodal list may be modified to identify a micro node circuit path. In other embodiments, the computing device 12 modifies the second nodal list to identify a plurality of derived micro node circuit paths that extend through a plurality of the micro nodes based on an offset with respect to the reference macro node circuit path.

The multiple micro node circuit paths maintain a same respective distance from each other along the length of the micro node circuit paths. Because the respective inter-circuit path distance may be relatively small, such as 6 microns for example, the embodiments facilitate the placement of a plurality of electrically conductive circuit paths in close proximity to one another that interweaves across the area 18, and greatly decreases a likelihood of successfully bypassing the multiple circuit paths in order to access underlying circuit board components.

For purposes of illustration, the method illustrated in FIG. 14 has been discussed in a sequence wherein the first nodal list that identifies the grid of macro nodes at a first (lower) resolution is generated first, and then the second nodal list that identifies the micro nodes at a second (greater) resolution is generated second. However, the embodiments are not limited to that particular sequence, and the second nodal list that identifies the micro nodes at the second (greater) resolution may first be generated, followed by the generation of the first nodal list that identifies the grid of macro nodes at the first (lower) resolution. In one particular embodiment wherein the area 18 may include one or more openings, as discussed above, the second nodal list that identifies the micro nodes at the second (greater) resolution is generated first. The first nodal list is then generated second, but no macro nodes are identified in the first nodal list for any portion of the area 18 in which an opening, or a portion thereof, exists. Such portions of the area 18 thus may not initially be covered by the initial generation of circuit paths, but may ultimately be covered after subsequent bubble and/or nudge processing occurs.

Figure 15:
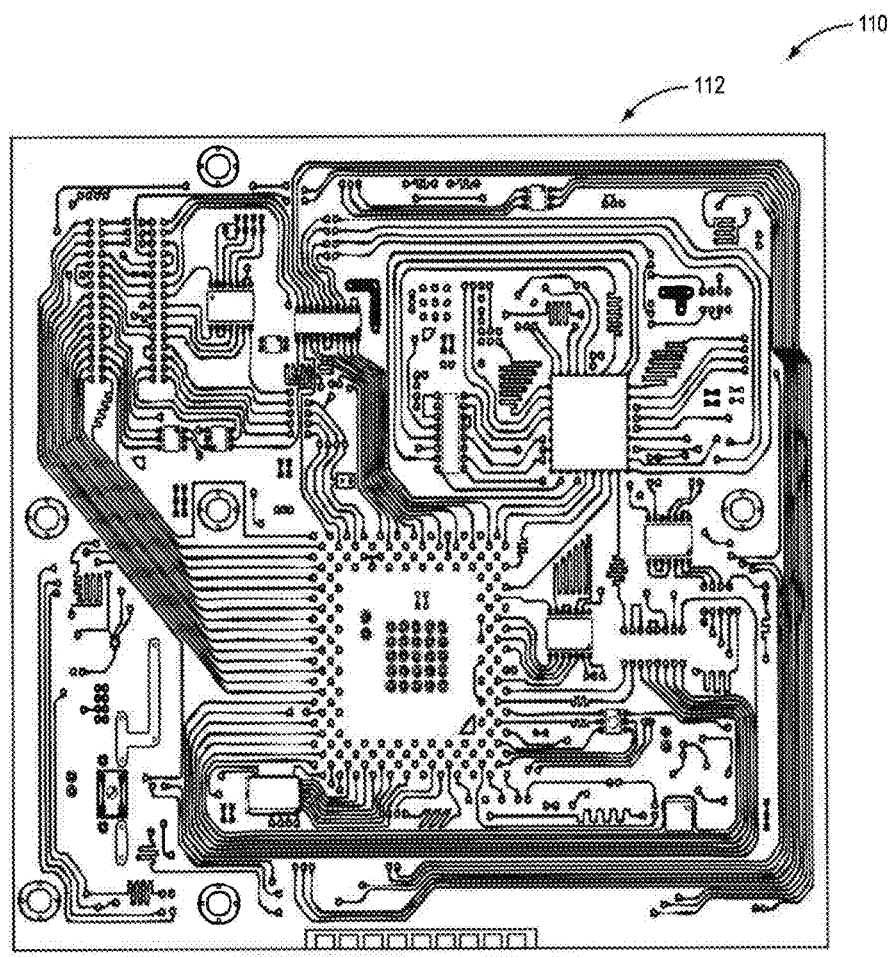
FIG. 15 is a diagram of an example item that comprises a printed circuit board.

FIG. 15 is a diagram of an example item 110 that comprises a printed circuit board. In this example, the data 14 may comprise information that identifies a perimeter of the item 110, or may comprise an image of the item 110, along with information suitable for determining an area 112 of the item 110. For example, the image may comprise a particular pixel resolution, with each pixel comprising a known height and width.

Figure 16:
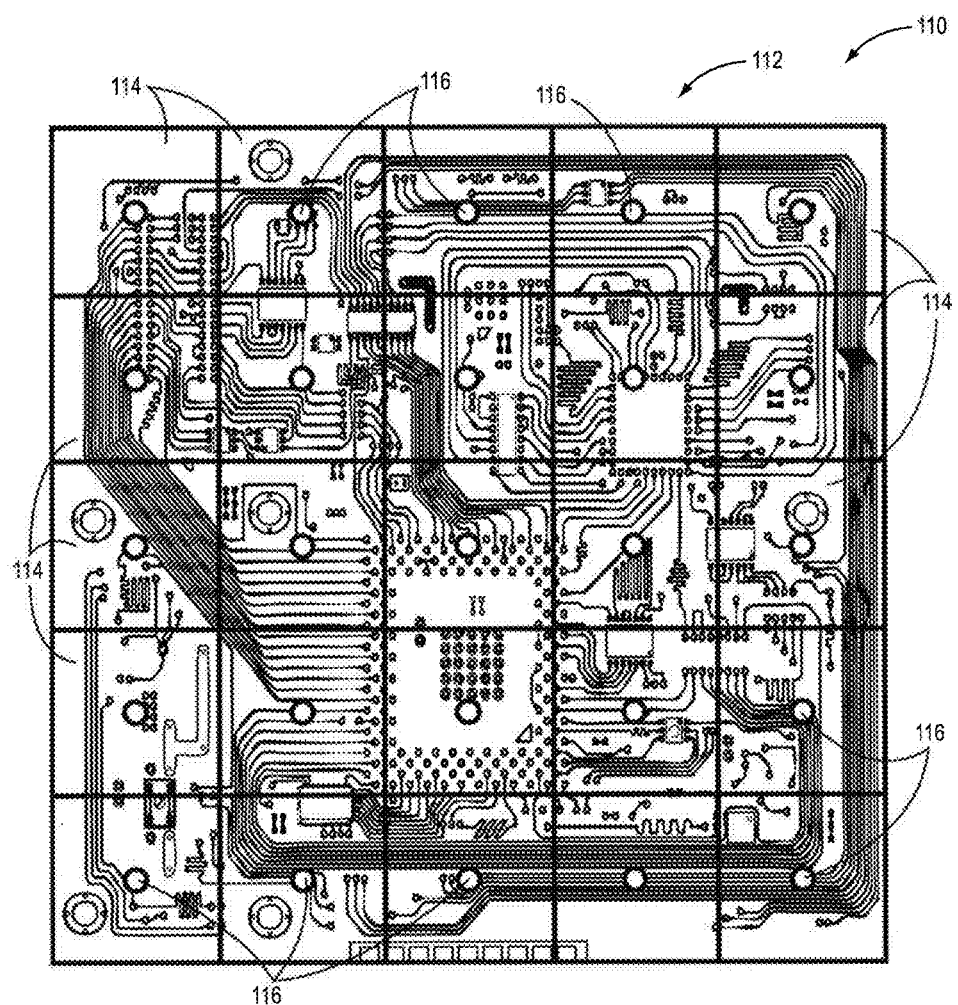
FIG. 16 is a block diagram illustrating a grid of macro nodes at a first resolution referenced to an area of the item illustrated in FIG. 14.

FIG. 16 is a block diagram illustrating a grid of macro nodes 114 at a first resolution referenced to the area 112. In this example, there are 25 macro nodes 114. Each macro node 114 is associated with a different portion of the area 112. The particular size of each macro node 114 may be application dependent, and may differ based on a desired number of derived micro node circuit paths, a width of such derived micro node circuit paths, and an inter-circuit path distance from one another. In some embodiments, each macro node 114 is sized such that the desired number of derived micro node circuit paths can pass through a single macro node 114, but each macro node 114 is no larger than the width and inter-path distance between such derived micro node circuit paths such that the first resolution is as great as possible. A greater resolution of macro nodes 114 may facilitate more complex circuit path patterns.

FIG. 16 also illustrates a plurality of reference locations 116 that are within respective macro nodes 114. In this example, the reference locations 116 are located at a center of the corresponding macro nodes 114, but the embodiments are not limited to reference locations that are located at the center of macro nodes. However, as will be discussed in greater detail below, locating the reference locations 116 at the center of the respective macro nodes 114 may facilitate the determination of a maximum number of derived micro node circuit paths.

Figure 17:
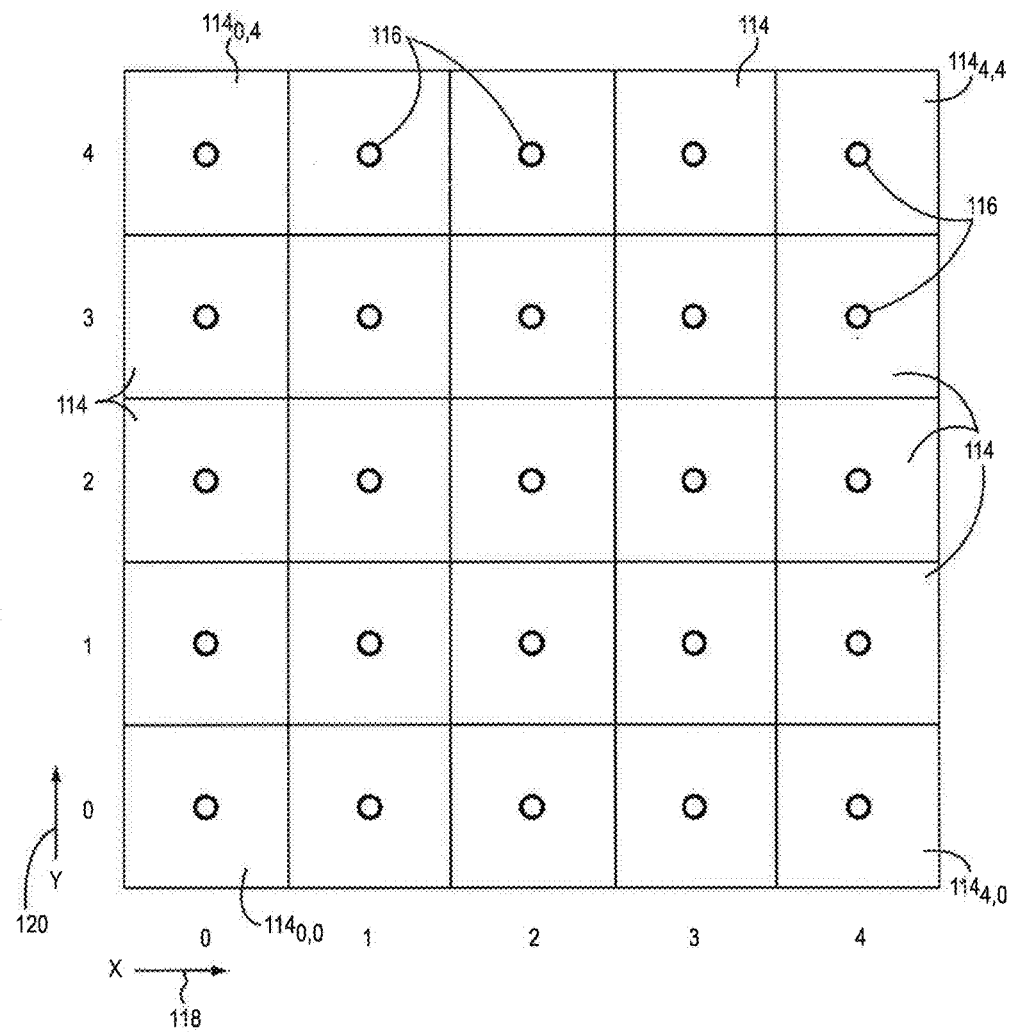
FIG. 17 is a block diagram illustrating the grid of macro nodes illustrated in FIG. 16, and reference locations within such macro nodes according to one embodiment.

FIG. 17 is a block diagram illustrating the grid of macro nodes 114 and reference locations 116. The macro nodes 114 may be identified based on respective locations along an X-axis 118 and a Y-axis 120. Solely for purposes of illustration and convenience, the X-axis 118 and Y-axis 120 are shown as having an origin at the bottom left corner of the grid of macro nodes 114, but, as illustrated above for example, the location of the origin is arbitrary and could be located at any corner of the grid of macro nodes 114. Particular macro nodes 114 will be identified hereinafter using the element reference numeral 114 and the subscript that identifies the particular X,Y location of the macro node 114 along the X-axis 118 and the Y-axis 120, respectively. For example, the macro node $114_{0,0}$ identifies the macro node 114 that is located at the bottom left corner of the grid of macro nodes 114.

Initially, a macro node waypoint list is generated that identifies a plurality of macro nodes 114 in the grid of macro nodes 114 through which the reference macro node circuit path is to traverse. The macro node waypoint list may be input by an operator, or may be determined by the computing device 12 without user input. In one embodiment, the computing device 12 may define the macro node waypoint list by identifying the four corner macro nodes $114_{0,0}$, $114_{0,4}$, $114_{4,4}$, and $114_{4,0}$, in order for the circuit generation process to initially identify a macro node circuit path that extends along a perimeter of the grid of macro nodes 114. For purposes of illustration, assume that the initial macro node waypoint list identifies a start macro node 114 as the macro node $114_{0,0}$, followed by macro nodes $114_{0,4}$, $114_{4,4}$, and ending with an end macro node $114_{4,0}$, such that the macro node waypoint list comprises the following entries: [$114_{0,0}$, $114_{0,4}$, $114_{4,4}$, $114_{4,0}$].

Figure 18:
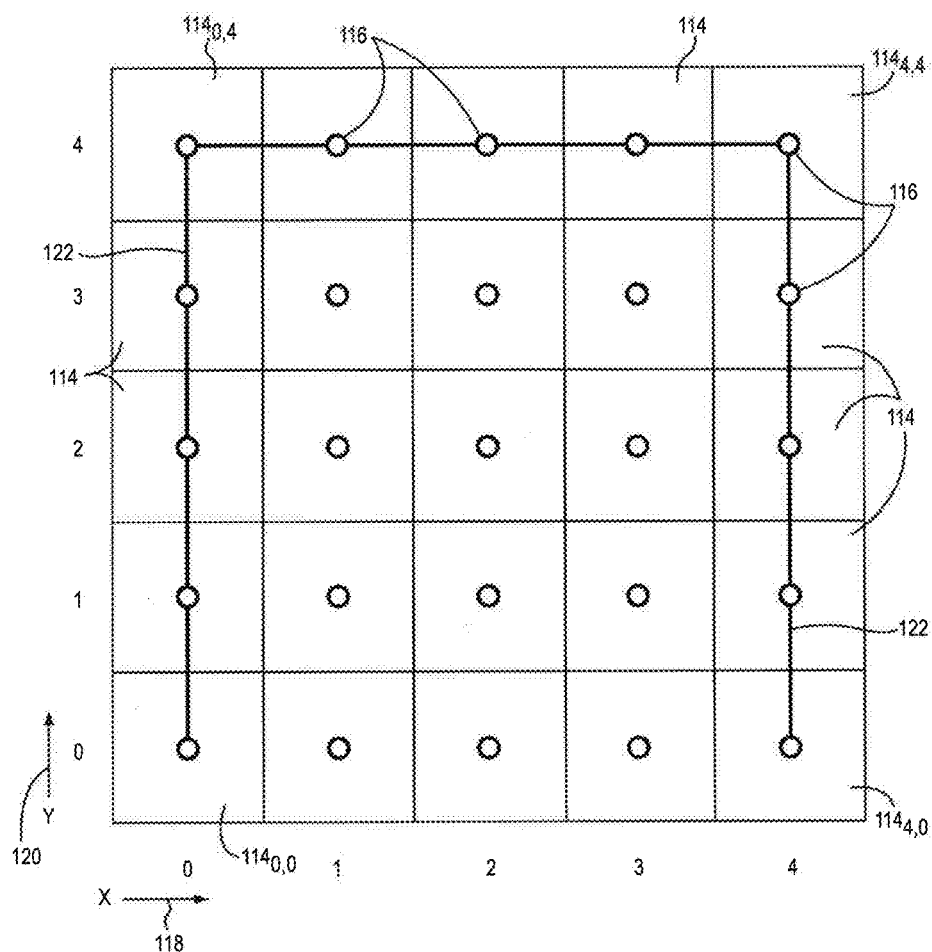
FIG. 18 is a block diagram illustrating the grid of macro nodes with a reference macro node circuit path that may be identified in a first nodal list based on a macro node waypoint list.

FIG. 18 is a block diagram illustrating the grid of macro nodes 114 with a reference macro node circuit path 122 that may be identified in the first nodal list based on the macro node waypoint list. The reference macro node circuit path 122 may be determined, for example, in the same or substantially the same manner as discussed above with regard to FIG. 8, for example. After the initial reference macro node circuit path 122 is determined, bubble processing, such as described above with reference to FIGS. 9, 10A, and 10B, may be iteratively performed on the reference macro node circuit path 122.

Figure 19:
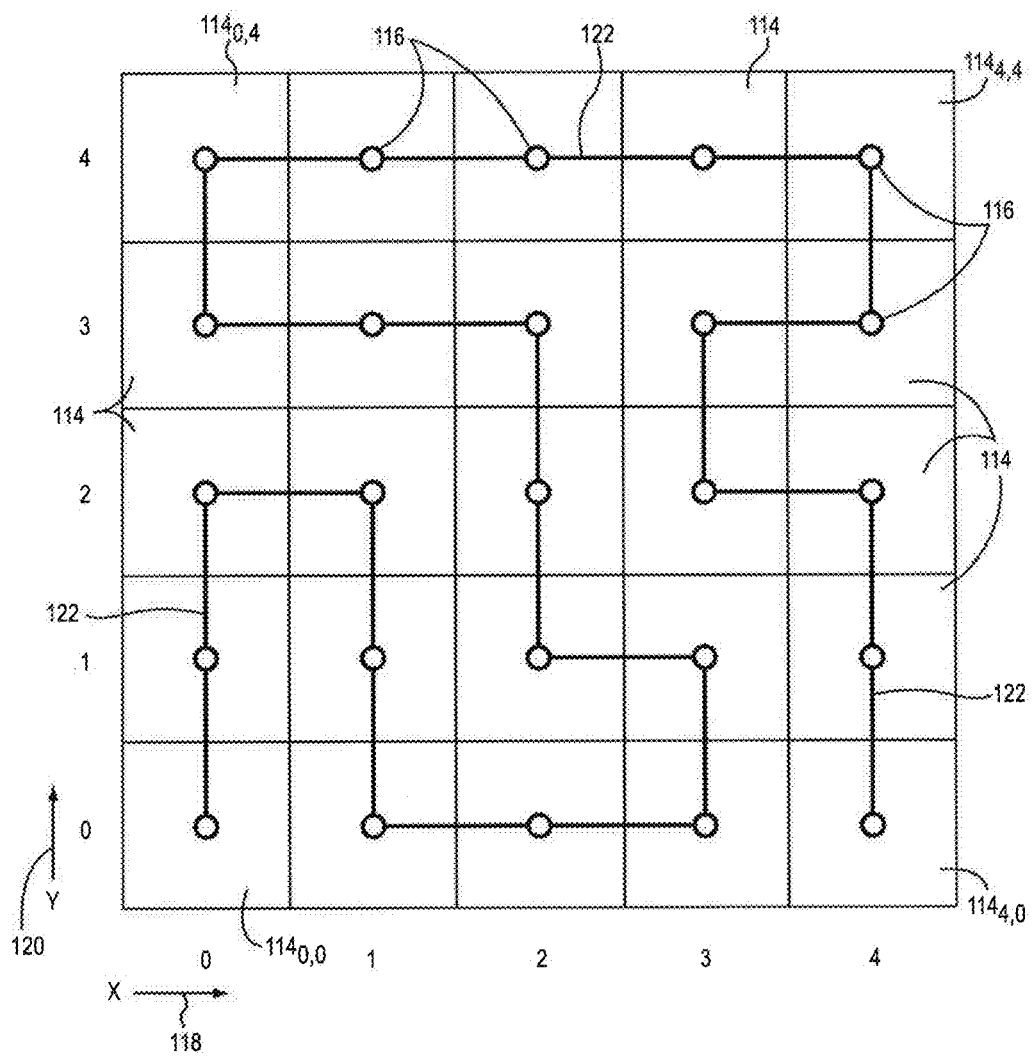
FIG. 19 is a block diagram illustrating the reference macro node circuit path a is identified in the first nodal list after bubble processing has been iteratively performed according to one embodiment.

FIG. 19 is a block diagram illustrating the reference macro node circuit path 122 that is identified in the first nodal list after bubble processing has been iteratively performed, according to one embodiment. In this example, all the macro nodes 114 in the grid of macro nodes 114 are in the reference macro node circuit path 122, but in other examples, it may also be desirable to perform nudge processing on the reference macro node circuit path 122, as discussed in FIGS. 13A-13D above.

Figure 20:
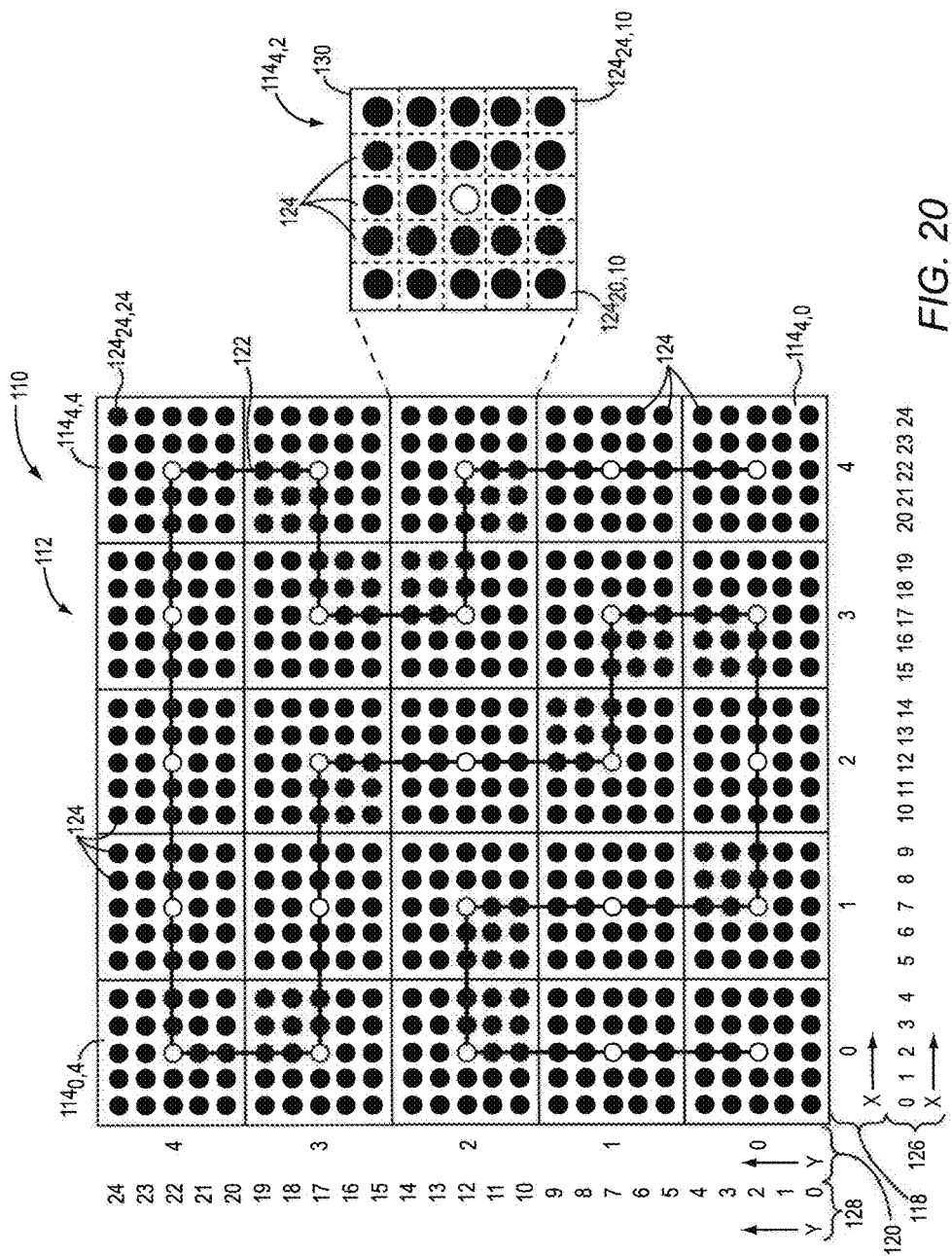
FIG. 20 is a block diagram illustrating a grid of micro nodes at a second resolution that is referenced to an area of an item according to one embodiment.

FIG. 20 is a block diagram illustrating a grid of micro nodes 124 at a second resolution that is referenced to the area 112 of the item 110. The micro nodes 124 are identified in a second nodal list (not illustrated), that may comprise similar data fields and be formatted substantially similarly to the nodal lists 58, 74, discussed above. In this example, the resolution of the grid of micro nodes 124 is 25 times greater than the resolution of the grid of macro nodes 114, but the particular resolution of the micro nodes 124 to the macro nodes 114 may be application specific, and, as discussed above, may be determined based at least in part on a desired number of derived micro node circuit paths, a width of such derived micro node circuit paths, and an inter-circuit path distance from one another. For purposes of discussion, two coordinate systems will be used to discuss particular macro nodes 114 and particular micro nodes 124. The X-axis 118 and Y-axis 120, discussed above, will be utilized to discuss the macro nodes 114, and are defined in units of macro nodes 114. An X-axis 126 and a Y-axis 128 will be utilized to discuss the micro nodes 124, and are defined in units of micro nodes 124. Thus, particular micro nodes 124 will be identified hereinafter using the element reference numeral 124 and the subscript that identifies the particular X,Y location (coordinate) of the micro node 124 along the X-axis 126 and the Y-axis 128, respectively. For example, the micro node $124_{24,24}$ identifies the micro node 124 that is located in the top right corner of the grid of micro nodes 124. The macro node $114_{0,0}$ identifies the macro node 114 that is located at the bottom left corner of the grid of micro nodes 114.

As illustrated, each macro node 114 is associated with a different subset of the micro nodes 124. For example, the macro node $114_{4,4}$ is associated with the 25 micro nodes 124 located in the upper most right corner of grid of micro nodes 124, bounded by the micro nodes $124_{20,20}$, $124_{20,24}$, $124_{24,24}$, and $124_{24,20}$. Thus the macro node $114_{4,4}$ and such 25 micro nodes 124 are referenced to the same portion of the area 112. For purposes of illustration, the micro nodes 124 are shown as circular shapes, but in other embodiments, as illustrated in inset 130, the micro nodes 124 may be considered to be rectangular, and be immediately adjacent one another. Thus, the circular shapes may be considered solely as illustrating a center location of such micro nodes 124. In some embodiments, the micro nodes 124 may be based on smaller elements, such as pixels, associated with an image of the item 110. Thus, while offset operations and calculations discussed below are discussed in terms of micro nodes 124, it will be apparent that all such operations and calculations could be scaled, based on a particular underlying pixel resolution associated with an image of the item 110. Moreover, the micro nodes 124 may be wider than the conductive circuit paths that are ultimately generated based on derived micro node circuit paths, such that even though the micro nodes 124 are adjacent to one another as illustrated in the inset 130, such conductive paths if placed down the center of the micro nodes 124 have a desired inter-path gap, such as 3-6 microns, in some embodiments.

The reference macro node circuit path 122 is illustrated as mapping to a plurality of micro nodes 124. While this will ease the subsequent discussion of determining derived circuit paths, in other embodiments the reference macro node circuit path 122 may not map precisely down the center of the micro nodes 124. In such embodiments, it will be appreciated that additional offsets may be determined to simplify the determination of derived micro circuit paths based on the reference macro node circuit path 122.

Figure 21:
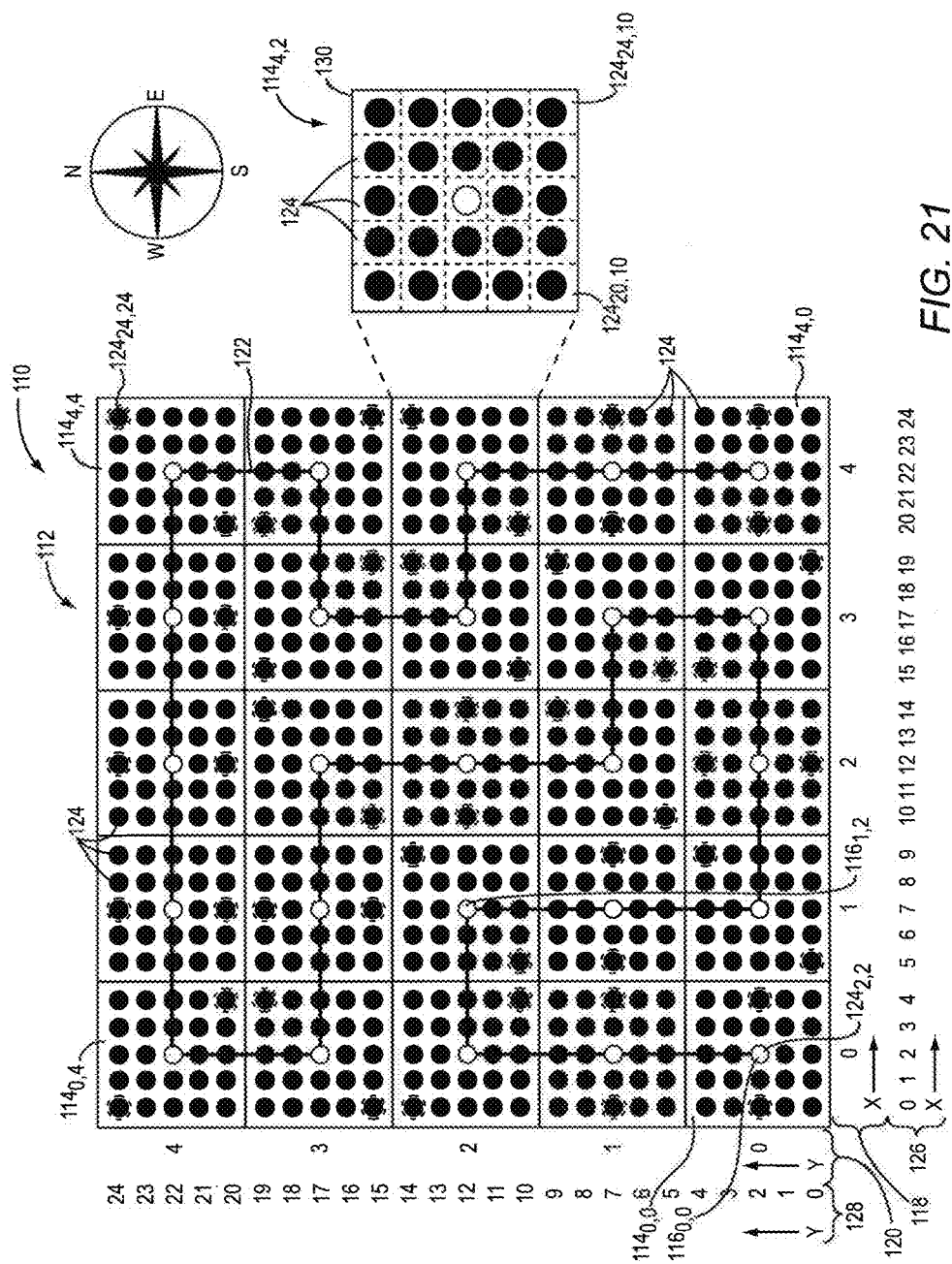
FIG. 21 is a block diagram of the micro nodes illustrated in FIG. 20 depicting micro nodes that may be identified in two micro node waypoint lists, according to one embodiment.

In some embodiments, one or more micro node waypoint lists are determined based on the reference macro node circuit path 122, and the second nodal list is modified to identify one or more derived micro node circuit paths based on the one or more micro node waypoint lists. In this regard, FIG. 21 is a block diagram of the micro nodes 124 that illustrates a plurality of micro nodes 124 that may be identified in two micro node waypoint lists suitable for generating derived micro node circuit paths that extend parallel to the reference macro node circuit path 122, that maintain a same distance from each other, and that are based on an offset with respect to the reference macro node circuit path 122.

In this embodiment, the reference macro node circuit path 122 itself may be mapped to respective micro nodes 124 to generate a micro node circuit path that may be utilized to generate a conductive circuit path. In this example, it will be assumed that three micro node circuit paths are desired, that the reference macro node circuit path 122 can be mapped to respective micro nodes 124 to identify one of such three micro node circuit paths, and thus that the reference macro node circuit path 122 will be used to derive two micro node circuit paths. However, the number of derived micro node circuit paths is not limited to two, and may comprise any number of micro node circuit paths.

Figure 22A:
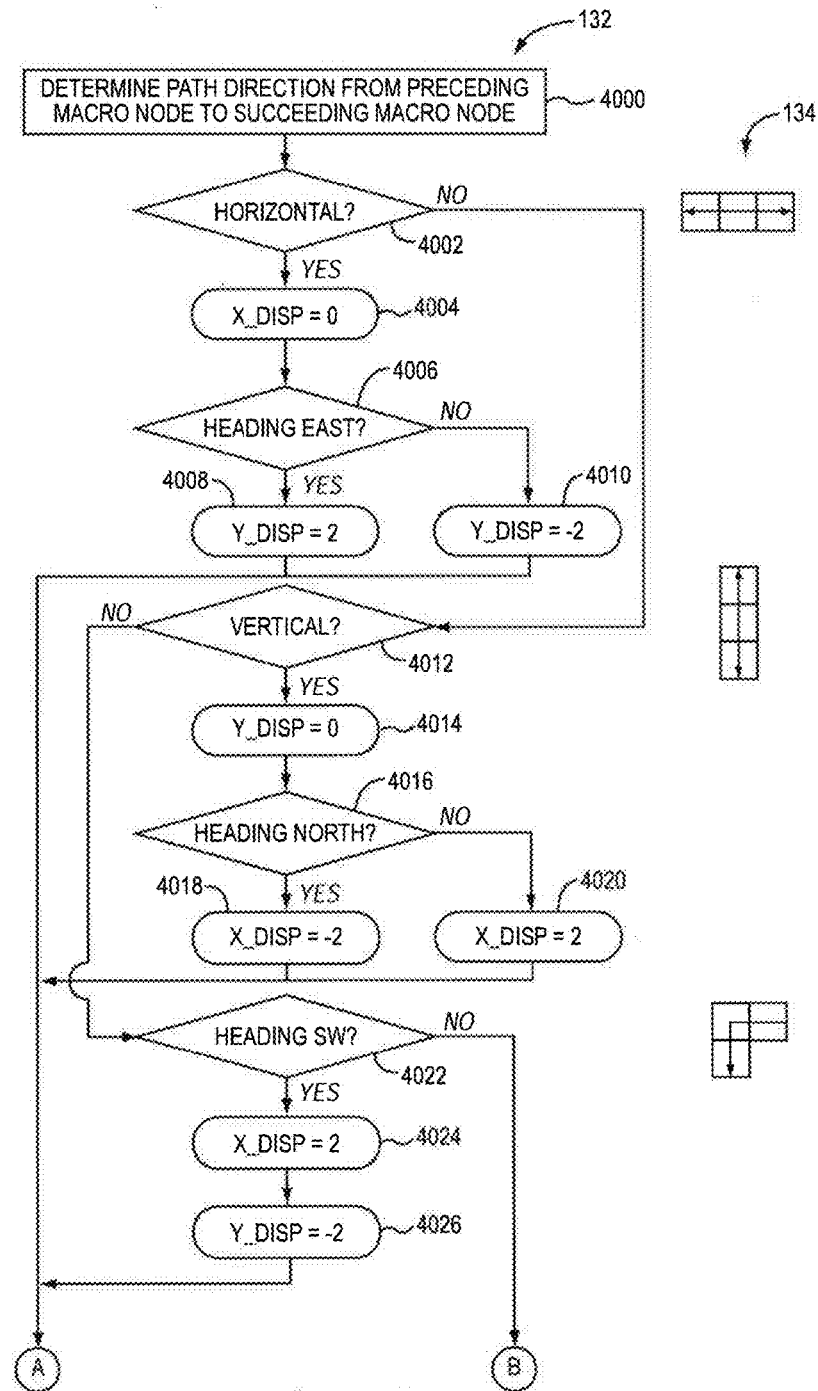
FIGS. 22A-22B illustrate a flowchart for generating waypoint lists according to one embodiment.
Figure 22B:
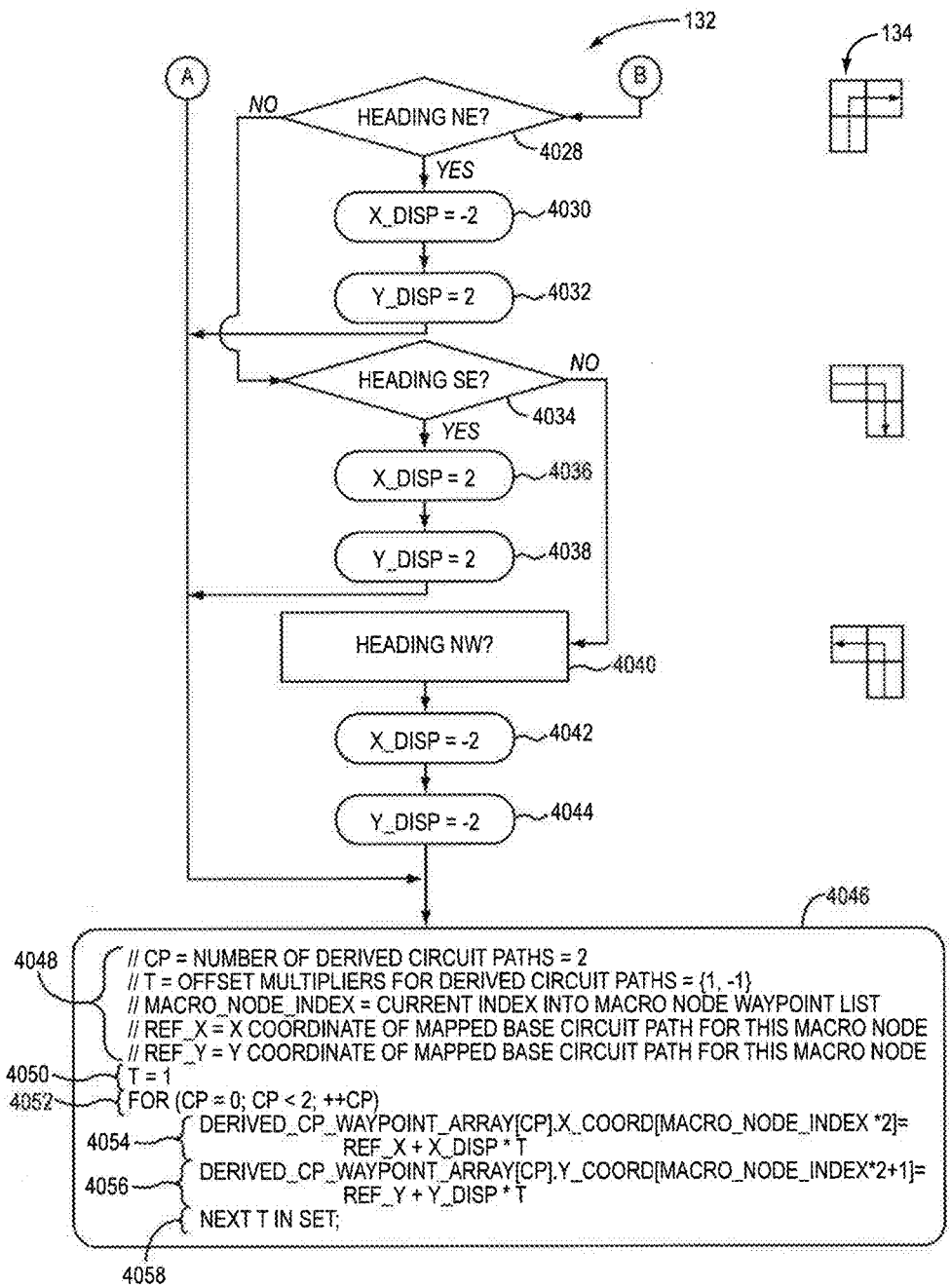

FIGS. 22A-22B illustrate a flowchart 132 for generating waypoint lists according to one embodiment. The waypoint lists may be used to derive micro node circuit paths that extend through a plurality of micro nodes 124 based on an offset with respect to the reference macro node circuit path 122, according to one embodiment. FIGS. 22A-22B will be discussed with reference to FIG. 21. The process described in the flowchart 132 is performed for each macro node 114 identified in the reference macro node circuit path 122. One goal of the process is to determine X and Y offsets with respect to a reference location of the respective macro node 114. In this example, the reference locations comprise the reference locations 116, which coincide with both the center of the respective macro node 114, as well as a particular micro node 124, due to the resolution of the micro nodes 124. The X and Y offsets are, in this embodiment, in terms of a number of micro nodes 124, in this example either 0, 2, or −2, as discussed in greater detail below. Particular reference locations 116 will be identified hereinafter using the element reference numeral 116 and the subscript that identifies the particular X,Y location (coordinates) of the macro node 114 with which the reference location 116 is associated. For example, the reference location $116_{0,0}$ is associated with the macro node $114_{0,0}$.

Each reference location 116 can be relatively easily mapped to a particular micro node 124 simply by multiplying the X and Y coordinates of the macro node 114 in which the reference location 116 is located by the number of micro nodes 124 per macro node 114 in the X and Y directions, and adding a constant offset. In the example illustrated in FIG. 21, this can be accomplished in the following manner:

mapped micro node $X$ coordinate=$X$ coordinate of macro node 114×5 (i.e., the number of micro nodes per macro node in the $X$ direction)+2; and mapped micro node $Y$ coordinate=$Y$ coordinate of macro node 114×5 (i.e., the number of micro nodes per macro node in the $Y$ direction)+2.

As an example, the reference location $116_{0,0}$ of the macro node $114_{0,0}$ maps to the micro node $124_{2,2}$, in the following manner:

mapped micro node $X$ coordinate=0*5+2=2; and mapped micro node $Y$ coordinate=0*5+2=2.

The process described in the flowchart 132 starts with the first macro node 114 identified in the reference macro node circuit path 122, which, in this example, is the macro node $114_{0,0}$. The process first determines a direction of the reference macro node circuit path 122 based on both a preceding macro node 114 to a succeeding macro node 114. Solely for purposes of illustration, each direction will be identified as either north (the direction toward the top of FIG. 21), south (the direction toward the bottom of FIG. 21), east (the direction toward the right of FIG. 21), west (the direction toward the left of FIG. 21), northeast (NE) (between north and east), northwest (NW) (between north and west), southeast (SE) (between south and east) or southwest (SW) (between south and west). The first macro node $114_{0,0}$ may be treated as an exception since there is no preceding macro node $114_{0,0}$. Assume for purposes of illustration that it is assumed that the reference macro node circuit path 122 initially starts in a vertical direction heading north. Thus, for the macro node $114_{0,0}$ it is determined that the reference macro node circuit path 122 is heading north (FIG. 22A, block 4000). For purposes of convenience, FIGS. 22A-22B contain a plurality of insets 134 that illustrate potential directions of the reference macro node circuit path 22 in proximity to blocks of the flowchart 132 that are performed for such directions.

Generally, blocks 4002-4010 are performed if the reference macro node circuit path 122 is heading in an east or west (horizontal) direction; blocks 4012-4020 are performed if the reference macro node circuit path 122 is heading in a north or south (vertical) direction; blocks 4022-4026 are performed if the reference macro node circuit path 122 is heading in a southwest direction; blocks 4028-4032 are performed if the reference macro node circuit path 122 is heading in a northeast direction; blocks 4034-4038 are performed if the reference macro node circuit path 122 is heading in a southeast direction; and blocks 4040-4044 are performed if the reference macro node circuit path 122 is heading in a northwest direction.

For the macro node $114_{0,0}$, blocks 4012-4020 are performed because it was determined that the reference macro node circuit path 122 was heading in a north (vertical) direction, as discussed above. The Y_DISP (i.e., Y coordinate offset) is set to a value of 0 (FIG. 22A, block 4014). It is then determined if the reference macro node circuit path 122 is heading north (FIG. 22A, block 4016). In this example, because the reference macro node circuit path 122 is heading north, the X_DISP (i.e., X coordinate offset) is set to a value of −2. Processing then branches to block 4046, which contains instructions that determine which particular micro nodes 124 should be added to the two waypoint lists from which the two derived micro node circuit paths will be generated.

Comment 4048 identifies variables utilized in the various calculations. The variable CP contains the number of derived micro node circuit paths, which is in this example is two. The variable T is a set of offset multipliers used to sweep across a macro node 114 to identify the appropriate micro nodes 124 for addition to the waypoint lists. In this example, the set contains the values 1 and −1, but the particular values may differ depending on the number of derived micro node circuit paths and the desired distances between such derived micro node circuit paths and the reference macro node circuit path 122. The variable MACRO_NODE_INDEX is a current index into the macro node waypoint list. The variable MACRO_NODE_INDEX starts at 0 and is incremented by a value of 1 each time the process in the flowchart 132 is processed. For the first iteration of the process, in this example, because the macro node waypoint list is 0 relative, the value of the variable MACRO_NODE_INDEX is 0. The variable REF_X is the X coordinate of the micro node 124 to which the reference location 116 of the current macro node 114 being processed is mapped. In this example, the reference location $116_{0,0}$ is mapped to the micro node $124_{2,2}$, as discussed above, and thus the variable REF_X has a value of 2. The variable REF_Y is the Y coordinate of the micro node 124 to which the reference location 116 of the current macro node 114 being processed is mapped. In this example, the reference location $116_{0,0}$ is mapped to the micro node $124_{2,2}$, and thus the variable REF_Y has a value of 2.

Instruction 4050 sets the variable T to the first value in the set, which, as discussed above, is a value of 1. Instruction 4052 is a loop instruction that starts a processing loop, and sets the variable CP to a value of 0 for the first iteration of the loop. Instruction 4054 indexes a two dimensional array referred to as DERIVED_CP_WAYPOINT_ARRAY with the variable CP. This identifies which of the two micro node waypoint lists is being altered. Each particular DERIVED_CP_WAYPOINT_ARRAY array comprises two arrays, an X_COORD array that stores the X coordinates of the micro nodes 124 identified to be added to the micro node waypoint list, and a Y_COORD array that stores the Y coordinates of the micro nodes 124 identified to be added to the micro node waypoint list. The X coordinate of the micro node 124 is identified via the following formula:

$$REF\_X + X\_DISP * T.$$

In this example, as discussed above, REF_X has a value of 2; X_DISP has a value of −2; and T has a value of 1. Thus, the X coordinate is identified as 2+−2*1=0.

Instruction 4056 sets the Y coordinate array in a similar fashion. The Y coordinate of the micro node 124 is identified via the following formula:

$$REF\_Y + Y\_DISP * T.$$

In this example, as discussed above, REF_Y has a value of 2; Y_DISP has a value of 0; and T has a value of 1. Thus, the Y coordinate is identified as 2+0*1=2. Thus, the micro node $124_{0,2}$ is identified as the first micro node 124 in the first waypoint list.

Instruction 4058 sets the variable T to the next value in the set, in this example, −1. Instruction 4052 increments the value of CP to a value of 1. Instruction 4054 now accesses the second micro node waypoint list by virtue of the variable CP being set to a value of 1, and identifies the X coordinate via the following formula:

$$REF\_X + X\_DISP * T.$$

In this example, as discussed above, REF_X has a value of 2; X_DISP has a value of −2; and T now has a value of −1. Thus, the X coordinate is identified as 2+−2*−1=4.

Instruction 4054 sets the Y coordinate array in a similar fashion. The Y coordinate of the micro node 124 is identified via the following formula:

$$REF\_Y + Y\_DISP * T.$$

In this example, as discussed above, REF_Y has a value of 2; Y_DISP has a value of 0; and T has a value of −1. Thus, the Y coordinate is identified as 2+0*−1=2. Thus, the micro node $124_{4,2}$ is identified as the first micro node 124 in the second waypoint list.

The MACRO_NODE_INDEX is then incremented by 1, and the process described in the flowchart. 132 is repeated. In this manner, for each macro node 114 in the reference macro node circuit path 122, one micro node 124 is added to each micro node waypoint list.

As another example, the flowchart 132 will be discussed in conjunction with the fourth macro node 114 in the reference macro node circuit path 122. The fourth macro node 114 is the macro node $114_{1,2}$. The MACRO_NO- DE_INDEX has a value of 3, and thus the process described by the flowchart 132 had previously been performed three times. The path direction of reference macro node circuit path 122 is determined based on the preceding macro node 114$_{0,2}$ and the succeeding macro node 114$_{1,2}$ (FIG. 22A, block 4000). In one embodiment, this can be determined by comparing the X and Y coordinates of the preceding macro node 114$_{0,2}$ to the X and Y coordinates of the succeeding macro node 114$_{1,2}$. In this example, the direction is determined to be southeast, and thus processing continues to blocks 4034-4038. The X_DISP variable is set to a value of 2 and the Y_DISP variable is set to a value of 2 (FIG. 22B, blocks 4036-4038). At block 4046, the value of MACRO_NODE_INDEX is 3. The value of REF_X is 7, and the value of REF_Y is 12, identifying the micro node 124$_{7,12}$ as the micro node 124 to which the reference location 116$_{1,2}$ maps.

Instruction 4054 sets the X coordinate of the next micro node 124 in the first waypoint list via the following formula;

$$REF\_X + X\_DISP * T$$

In this example, as discussed above, REF_X has a value of 7; X_DISP has a value of 2; and T has a value of 1. Thus, the X coordinate is identified as 7+2*1=9.

Instruction 4056 sets the Y coordinate array in a similar fashion. The Y coordinate of the micro node 124 is identified via the following formula:

$$REF\_Y + Y\_DISP * T.$$

In this example, as discussed above, RELY has a value of 12; Y_DISP has a value of 2; and T has a value of 1. Thus, the Y coordinate is identified as 12+2*1=14. Thus, the micro node 124$_{9,14}$ is identified as the fourth micro node 124 in the first waypoint list.

Instruction 4058 sets the variable T to the next value in the set, in this example, −1. Instruction 4052 increments the value of CP to a value of 1. Instruction 4054 now accesses the second micro node waypoint list by virtue of the variable CP being set to a value of 1, and identifies the X coordinate via the following formula:

$$REF\_X + X\_DISP * T.$$

In this example, as discussed above, REF_X has a value of 7; X_DISP has a value of 2; and T now has a value of −1. Thus, the X coordinate is identified as 7+2*−1=5.

Instruction 4054 sets the Y coordinate array in a similar fashion. The Y coordinate of the micro node 124 is identified via the following formula:

$$REF\_Y + Y\_DISP * T.$$

In this example, as discussed above, REF_Y has a value of 12; Y_DISP has a value of 2; and T has a value of −1. Thus, the Y coordinate is identified as 12+2*−1=10. Thus, the micro node 124$_{5,10}$ is identified as the fourth micro node 124 in the second waypoint list.

FIG. 21 identifies in dashed circular outline the micro nodes 124 that are ultimately identified on respective micro node waypoint lists based on the flowchart 132 for each macro node 114. Table 1, below, also identifies such micro nodes 124 (columns 3 and 4), corresponding macro nodes 114 (column 1), and the micro node 124 that corresponds to the reference location 116 associated with the respective macro node 114 (column 2).

TABLE 1

| (Column 1) MACRO NODE CP | (Column 2) REFERENCE MICRO NODE CP | (Column 3) FIRST MICRO NODE WAYPOINT LIST | (Column 4) SECOND MICRO NODE WAYPOINT LIST |
|---|---|---|---|
| 0.0 | 2.2 | 0.2 | 4.2 |
| 0.1 | 2.7 | 0.7 | 4.7 |
| 0.2 | 2.12 | 0.14 | 4.10 |
| 1.2 | 7.12 | 9.14 | 5.10 |
| 1.1 | 7.7 | 9.7 | 5.7 |
| 1.0 | 7.2 | 9.4 | 5.0 |
| 2.0 | 12.2 | 12.4 | 12.0 |
| 3.0 | 17.2 | 15.4 | 19.0 |
| 3.1 | 17.7 | 15.5 | 19.9 |
| 2.1 | 12.7 | 10.5 | 14.9 |
| 2.2 | 12.12 | 10.12 | 14.12 |
| 2.3 | 12.17 | 10.15 | 14.19 |
| 1.3 | 7.17 | 7.15 | 7.19 |
| 0.3 | 2.17 | 0.15 | 4.19 |
| 0.4 | 2.22 | 0.24 | 4.20 |
| 1.4 | 7.22 | 7.24 | 7.20 |
| 2.4 | 12.22 | 12.24 | 12.20 |
| 3.4 | 17.22 | 17.24 | 17.20 |
| 4.4 | 22.22 | 24.24 | 20.20 |
| 4.3 | 22.17 | 24.15 | 20.19 |
| 3.3 | 17.17 | 19.15 | 15.19 |
| 3.2 | 17.12 | 19.14 | 15.10 |
| 4.2 | 22.12 | 24.14 | 20.10 |
| 4.1 | 22.7 | 24.7 | 20.7 |
| 4.0 | 22.2 | 24.2 | 20.2 |

In the process described above, each micro node waypoint list includes one micro node 124 for each macro node 114. However, in some embodiments, such micro node waypoint lists can be reduced to include only the starting micro node 124, intermediate micro nodes 124 in which a change in direction occurs, and the ending micro node 124. In such embodiments, the micro node waypoint lists identified in Table 1 can be reduced in size as illustrated in Table 2, below.

TABLE 2

| FIRST MICRO NODE WAYPOINT LIST | SECOND MICRO NODE WAYPOINT LIST |
|---|---|
| 0.2 | 4.2 |
| 0.14 | 4.10 |
| 9.14 | 5.10 |
| 9.4 | 5.0 |
| 15.4 | 19.0 |
| 15.5 | 19.9 |
| 10.5 | 14.9 |
| 10.15 | 14.19 |
| 0.15 | 4.19 |
| 0.24 | 4.20 |
| 24.24 | 20.20 |
| 24.15 | 20.19 |
| 19.15 | 15.19 |
| 19.14 | 15.10 |
| 24.14 | 20.10 |
| 24.2 | 20.2 |

Figure 23:
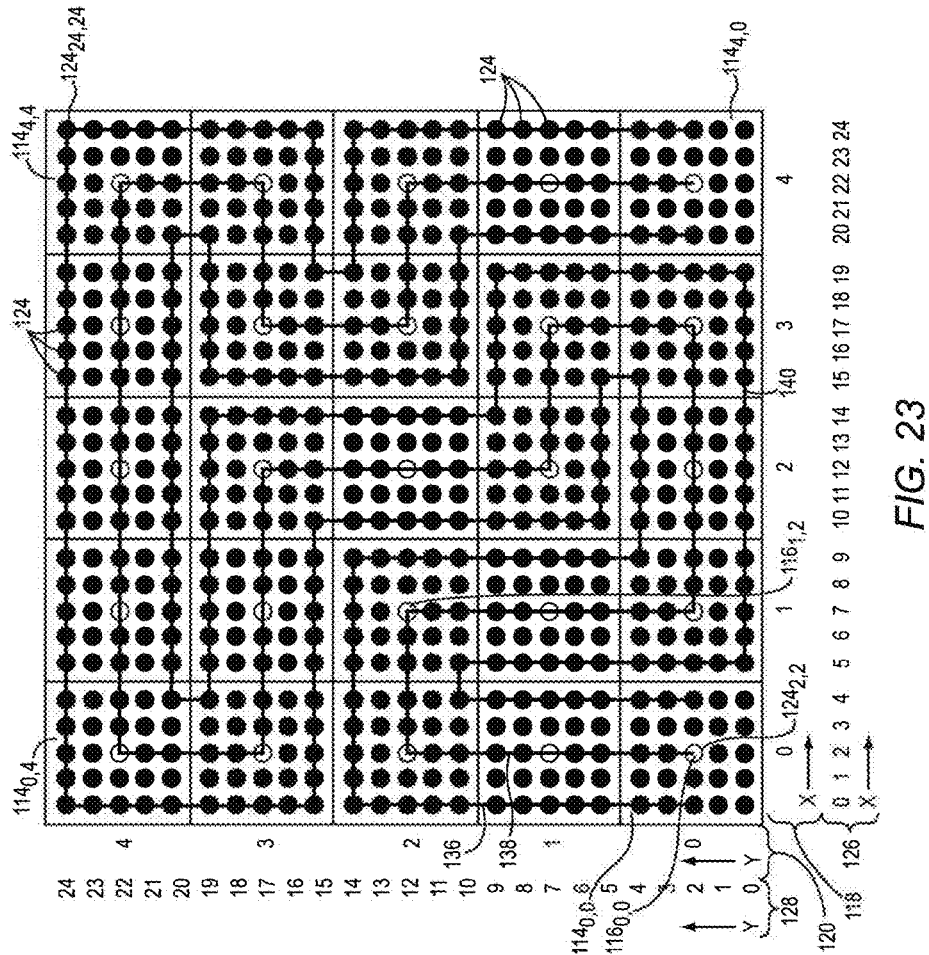
FIG. 23 is a block diagram of three micro node circuit paths according to one embodiment.

The first and second micro node waypoint lists can then be used to alter the second nodal list to define multiple micro node circuit paths, in accordance, for example, with the circuit generation processes described above with regard to FIG. 8. FIG. 23 is a block diagram of the micro nodes 124, and three micro node circuit paths 136, 138, and 140. The micro node circuit path 136 was derived from the first micro node waypoint list described above with regard to FIGS. 21 and 22A-B, the micro node circuit path 138 was generated by mapping the reference macro node circuit path 122 to corresponding micro nodes 124, and the micro node circuit path 140 was derived from the second micro node waypoint list described above. As illustrated, all three micro node circuit paths 136, 138, 140 extend along a parallel path, and remain a fixed nodal distance from one another. If desired, bubble processing may then be performed on each micro node circuit path 136, 138, 140. The three micro node circuit paths 136, 138, 140 may then be electrically coupled to edge connectors to facilitate connection to one or more electronic components. In some embodiments, during the initial generation of the micro nodes and the macro nodes, portions of the area 18 to which the micro nodes and the macro nodes are referenced that are near the ends of the micro node circuit paths 136, 138, 140 may be "blocked out" such that the micro node circuit paths 136, 138, 140 are not permitted to extend into such portions. This may be done to ensure that sufficient space is available for connecting the micro node circuit paths 136, 138, 140 to edge connectors and/or electronic components. In one embodiment, such portions are merely not identified in the first and second nodal lists.

Figure 24:
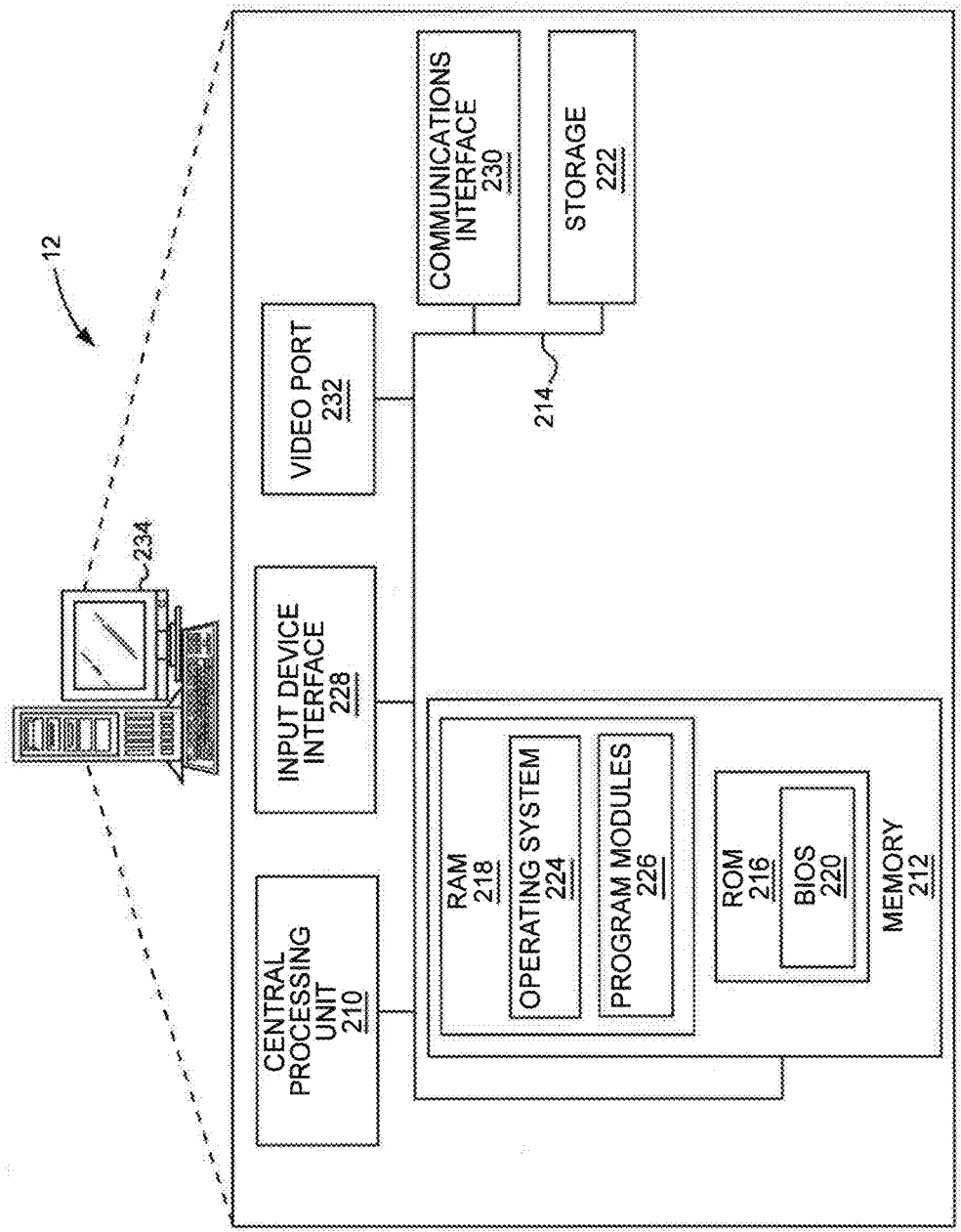
FIG. 24 is a block diagram of the computing device according to one embodiment.

FIG. 24 is a block diagram of the computing device 12 according to one embodiment. The computing device 12 may comprise any computing or processing device capable of including firmware, hardware, and/or executing software instructions to implement the functionality described herein, such as a laptop or desktop computer, or a special purpose computing device having primary functionality for implementing the embodiments described herein. The computing device 12 includes a central processing unit 210, a system memory 212, and a system bus 214. The system bus 214 provides an interface for system components including, but not limited to, the system memory 212 and the central processing unit 210. The central processing unit 210 can be any commercially available or proprietary processor.

The system bus 214 may be any of several types of bus structures that may further interconnect to a memory bus (with or without a memory controller), a peripheral bus, and/or a local bus using any of a variety of commercially available bus architectures. The system memory 212 may include non-volatile memory 216 (e.g., read only memory (ROM), erasable programmable read only memory (EPROM), electrically erasable programmable read only memory (EEPROM), etc.) and/or volatile memory 218 (e.g., random access memory (RAM)). A basic input/output system (BIOS) 220 may be stored in the non-volatile memory 216, and can include the basic routines that help to transfer information between elements within the computing device 12. The volatile memory 218 may also include a high-speed RAM, such as static RAM for caching data.

The computing device 12 may further include or be coupled to a computer-readable storage 222, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 222 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the embodiments.

A number of modules can be stored in the computer-readable storage 222 and in the volatile memory 218, including an operating system 224 and one or more program modules 226, which may implement the functionality described herein in whole or in part, including, for example, initial nodal list generation, circuit path generation, bubble processing, nudge processing, and any other functionality described herein.

All or a portion of the embodiments may be implemented as a computer program product stored on a transitory or tangible, non-transitory computer-usable or computer-readable storage medium, such as the computer-readable storage 222, which includes complex programming instructions, such as complex computer-readable program code, configured to cause the central processing unit 210 to carry out the steps described herein. Thus, the computer-readable program code can comprise software instructions for implementing the functionality of the embodiments described herein when executed on the central processing unit 210. The central processing unit 210, in conjunction with the program modules 226 in the volatile memory 218, may serve as a controller for the computing device 12 that is configured to, or adapted to, implement the functionality described herein. The central processing unit 210 may include at least one processor.

An operator may be able to enter one or more configuration commands through a keyboard (not illustrated), a pointing device such as a mouse (not illustrated), or a touch-sensitive surface (not illustrated). Such input devices may be connected to the central processing unit 210 through an input device interface 228 that is coupled to the system bus 214, but can be connected by other interfaces such as a parallel port, an Institute of Electrical and Electronic Engineers (IEEE) 1394 serial port, a Universal Serial Bus (USB) port, an infrared (IR) interface, and the like.

The computing device 12 may also include a communications interface 230, suitable for communicating with a network as appropriate or desired. The communications interface 230 may also be configured to communicate with a circuit generation apparatus which, given a circuit path identified in a nodal list, may be configured to generate a conductive circuit that corresponds to the identified circuit path. The computing device 12 may also include a video port 232 configured to interface with a display 234.

Figure 25:
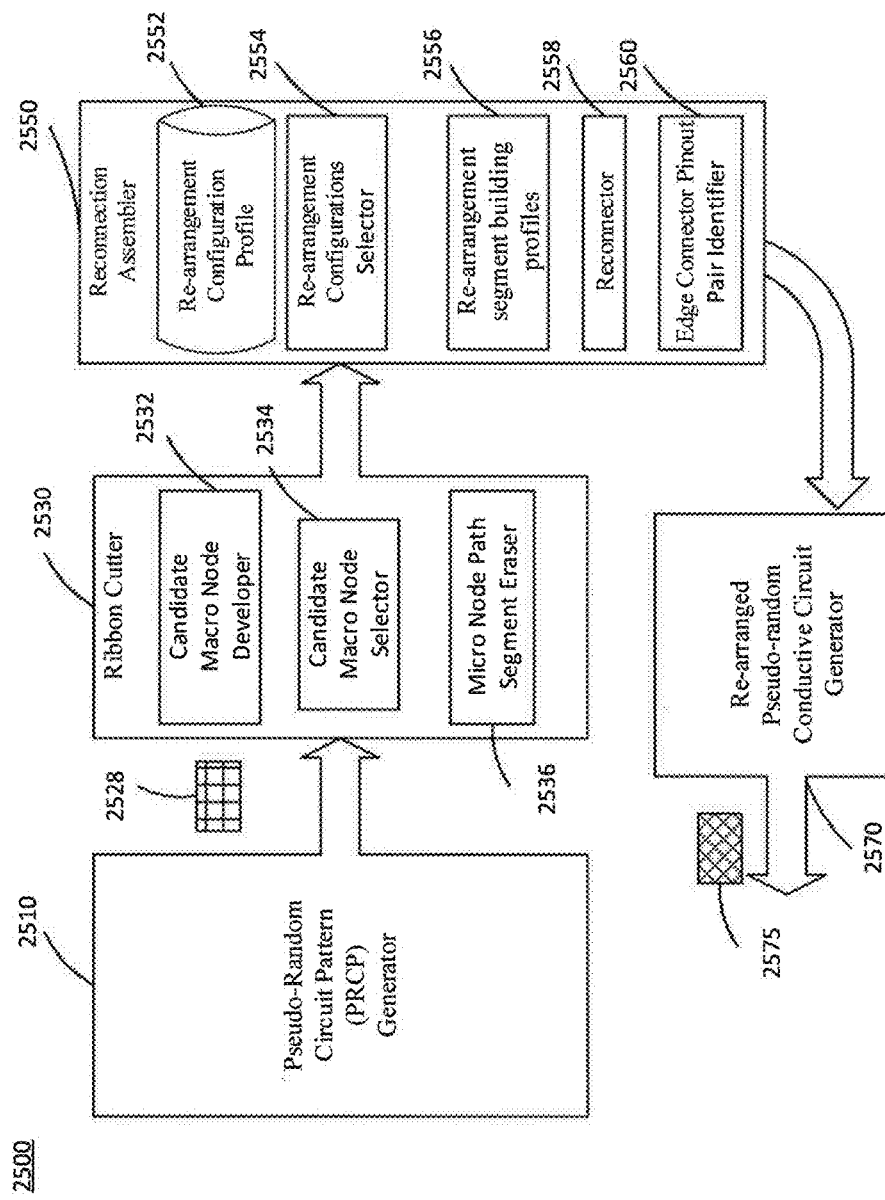
FIG. 25 is a block diagram of a pseudo-random circuit re-arranger system.

FIG. 25 is a block diagram of a pseudo-random circuit re-arranger (PRCRA) system 2500. The PRCRA system 2500 includes a pseudo-random circuit pattern (PRCP) generator 2510. In some embodiments, the operation of the PRCP generator 2510 is described also in U.S. Pat. No. 9,449,135, titled "GENERATING PSEUDO-RANDOM CIRCUITS," issued on Sep. 20, 2016 and assigned to Lockheed Martin Corporation. The operation of the PRCP generator 2510 produces via computing device 12, data representative of a schematic of a conductive circuit 2528 (i.e., conductive circuit 28) to be made in a manner as described above in relation to FIGS. 1-23, by electrically conductive material. The conductive circuit 2528 is in data form is a schematic when it is sent to the ribbon cutter 2530. The ribbon cutter 2530 develops a list of possible candidate macro nodes in the candidate macro node developer 2532. The ribbon cutter 2530 selects a candidate macro node from the list of possible candidate macro nodes by the candidate macro node selector 2534. The ribbon cutter 2530 may include a micro node path segment eraser 2536 wherein each micro node segment in the candidate macro node is erased so that it can be re-arranged or re-configured. Reconfiguring a macro node changes the original meandering design of the conductive paths. The meandering path may sometimes be called a "ribbon."

The system 2500 may include a reconnection assembler 2550. The reconnection assembler 2550 may include a manual reconnection mode, an automated reconnection mode or semi-automated reconnection mode. The reconnection assembler 2550 may include re-arrangement configuration profiles 2552 which may store one, more or all possible re-arrangement configurations for the candidate macro node based on the number of circuit path segments and micro nodes of the macro node. The configuration profiles 2552 may be stored in a database which is accessible by a user. By way of example, re-arrangement configuration profiles 2552 are shown in FIGS. 29A-29K. The reconnection assembler 2550 may include a re-arrangement configurations selector 2554. The selector 2554 may be used in the manual reconnection mode, the automated reconnection mode, or the semi-automated reconnection mode to select either a macro node configuration already stored or various building profiles 2556.

In some embodiments, the reconnection assembler 2550 may include re-arrangement segment building profiles 2556 as will be discussed later to allow a user to manually re-arrange the circuit path segments in the erased (candidate) macro node through a user interface. The user would select building profile options available for the macro node. As the macro node is re-arranged, some building profiles become unavailable for selection.

The reconnection assembler 2550 may include a reconnector 2558 which allows in the automated mode, reconnection of the ingress micro nodes to the egress micro nodes in accordance with a respective one selected re-arrangement configuration profile 2552. In the manual mode, the reconnector 2558 allows the user to manually electrically reconnect the ingress micro nodes to the egress micro nodes of the erased (candidate) macro node using the building profiles. When manually reconnecting, all previous ingress micro nodes and all previous egress nodes are reconfigured to be part of a re-arranged electrically conductive path. However, during the reconnection assembling, certain configuration profiles or re-arranged macro nodes may not electrically connect or link to all previously electrically connected micro nodes, as will be described in FIG. 30B.

After the reconnection is complete, the edge connector pinout configuration pair is identified by the edge connector pinout identifier 2560. The conductive circuit 2528 output from the pseudo-random circuit pattern generator 2510 has a first edge connector pinout configuration pair as the start macro node and the end macro node has a set arrangement or configuration. The reconnection assembling by the reconnector 2556 causes the original edge connector pullout configuration pair of conducive circuit 2528 to be identified by the edge connector pinout identifier. The re-arranged pseudo-random conductive circuit generator 2570 produces and creates a re-arranged conductive circuit 2575 which may produce an electrically conductive pattern with electrically conductive material to form the re-arranged grid.

By injecting a modification into the circuits paths at most any point along the path, the topology of the circuit paths can be changed, generating a wide variety of new permutations with all different topologies and electrical characteristics.

For example, the same conductive circuit 2528 design or schematic may be used. However, the actual manufactured conductive circuit (i.e., re-arranged pseudo-random conductive circuit) can be varied based on the re-arranged macro node which changes the edge connector pinout pair. Hence, in some embodiments, a one-of-a-kind re-arranged pseudo-random conductive circuit with a unique edge connector pinout pair linked together may be assigned to a particular electronic circuit. Groups of electronic circuits may be linked by virtue of the original conductive circuit 2528 but each electronic circuit would have a dedicated one-of-a-kind re-arranged pseudo-random conductive circuit with a unique edge connector pinout pair, such as shown in FIGS. 29A-29K.

In some embodiments, the one-of-a-kind re-arranged pseudo-random conductive circuit with a unique edge connector pinout pair linked together based on the conductive circuit may be duplicated for a particular manufacture, vendor, retailer, and customer, groups of electronic devices or for other purposes.

Figure 26A:
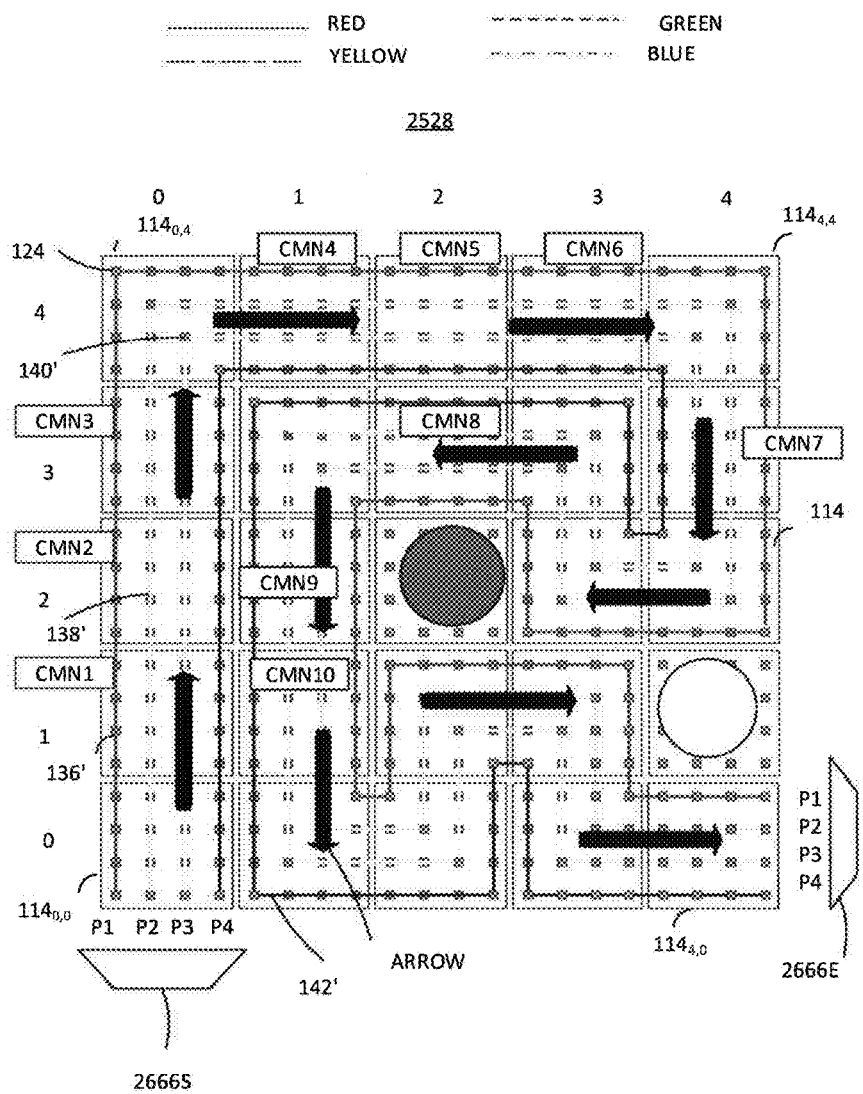
FIG. 26A is a block diagram of a conductive circuit having pseudo-random circuit pattern.

FIG. 26A is a block diagram of data representative of a conductive circuit 2528 having pseudo-random circuit pattern to be made into conductive circuit 28 (FIG. 1). The conductive circuit 2528 is formed in a grid of micro nodes 124, divided into macro nodes 114 and a plurality of micro node circuit paths 136', 138', 140' and 142' meandering through the macro nodes 114. The methods described above are used to develop the conductive circuit 2528 having a pseudo-random circuit pattern illustrated, for example.

Assume for the purposes of discussion that for this pseudo-random circuit pattern, the first or start macro node 114 identified is the macro node $114_{0,0}$. The first macro node $114_{0,0}$ may be treated as an exception since there is no preceding macro node $114_{0,0}$. Assume for purposes of illustration that it is assumed that the circuit paths 136', 138', 140' and 142' initially start in a vertical direction heading north. Thus, for the macro node $114_{0,0}$ it is determined that the circuit paths 136', 138', 140' and 142' head north.

Assume for the purposes of discussion that for this pseudo-random circuit pattern, the ending macro node 114 corresponds to macro node $114_{4,0}$. Macro nodes $114_{4,0}$ and $114_{4,4}$ are corner macro nodes.

The micro node circuit paths 136', 138', 140' and 142' are arranged according to an edge connector pair arranged for the pin arrangement for circuit paths 136', 138', 140' and 142', each having a continuous meandering circuit path from the start macro node to the end macro node. The edge connector pair 2666S and 2666E is confirmed for the micro node circuit's paths. By way of non-limiting example, the conductive circuit 2528 includes a macro node configuration with 4×4 micro node configuration. Thus, the edge connector pair 2666S and 2666E would be configured to electrically monitor the conductive paths according to the configuration of the circuit paths 136', 138', 140' and 142' in the start macro node $114_{0,0}$ and ending macro node $114_{4,0}$, as will be described in more detail herein.

The edge connector pair 2666S and 2666E may be electrically coupled to facilitate connection to one or more electronic components or monitors. In some embodiments, during the initial generation of the micro nodes and the macro nodes, portions of the area 18 (FIG. 1) to which the micro nodes and the macro nodes are referenced that are near the ends of the micro node circuit paths 136', 138', 140' and 142' may be "blocked out" such that the micro node circuit paths 136', 138', 140' and 142' are not permitted to extend into such portions. This may be done to ensure that sufficient space is available for connecting the micro node circuit paths 136', 138', 140' and 142' to edge connectors and/or electronic components.

In the grid, there is shown a plurality of arrows labeled ARROW. Each arrow ARROW indicates the direction of ingress flow of electricity through the micro nodes of a macro node. Assume that macro nodes labeled CMN1, CMN2, CMN3, CMN4, CMN5, CMN6, CMN7, CMN8, CMN9 and CMN10 are possible candidate macro nodes for using a ribbon cutting by the ribbon cutter 2530. This list may not be exclusive.

In this example, macro node CMN2 may be a candidate macro node with an ingress direction. However, the immediately adjacent macro node has a different direction of electricity. Thus, when re-arranging the micro node segments 136', 138', 140' and 142', the ingress micro nodes and egress micro nodes need to be identified so that the pinout configuration of the edge connector pair 2666S and 2666E can be determined for the re-arranged conduit circuit 2575. Each of the connector of the connector pair has a pinout configuration for pins P1, P2, P3, and P4. In this instance, the number of pins corresponds to the number of electrically conductive ingress micro nodes in the start macro node $114_{0,0}$. A macro node may have rows of micro nodes which are not electrically connected or linked in the circuit paths.

Figure 26B:
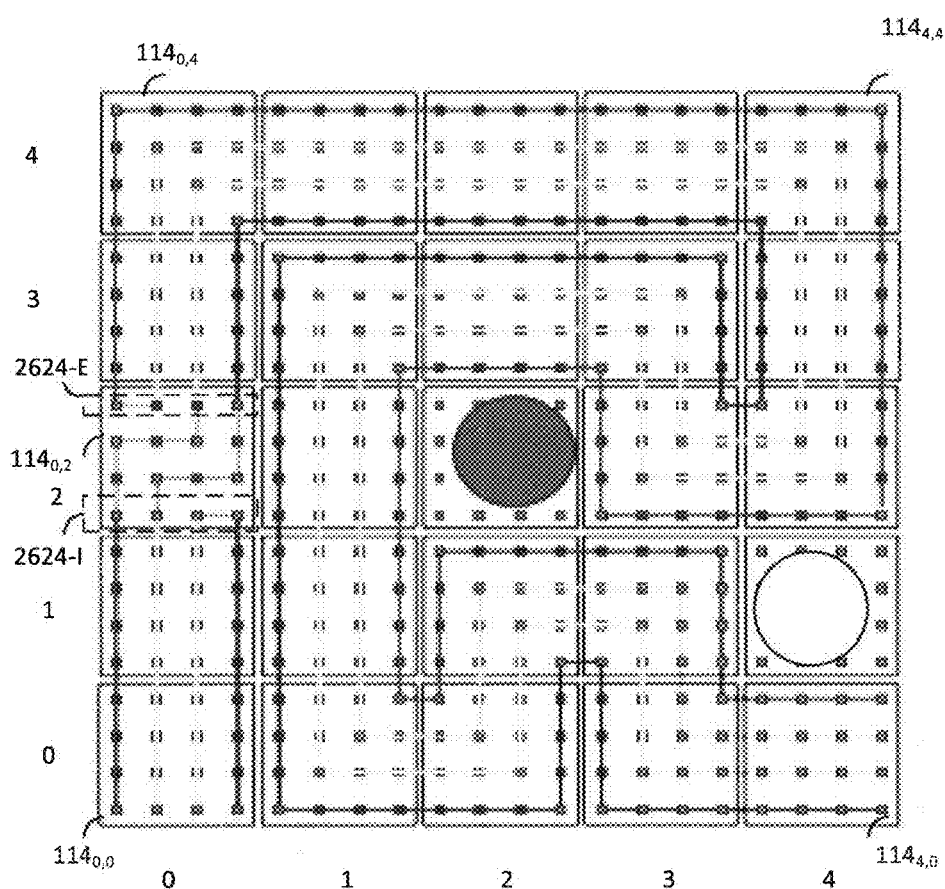
FIG. 26B is a block diagram of a conductive circuit having a re-arranged pseudo-random circuit pattern.

FIG. 26B is a block diagram of a conductive circuit 2575 having a re-arranged pseudo-random circuit pattern. The conductive circuit 2575 may be formed from electrically conductive material to form the re-arranged pseudo-random circuit pattern. In an embodiment, the conductive circuit 2575 may form a printed circuit board or layer. In some embodiments, the created conductive circuit 2575 made of the electrically conductive material used in electronic component may be flexible. Assume, the ribbon cutter 2530 identifies macro node $114_{2,0}$ as a candidate macro node and selects or receives selection of the macro node $114_{2,0}$ by the candidate macro node selector 2532. The ribbon cutter 2530 may erase the micro node circuit segments by the micro node path segment eraser 2534 wherein each micro node segment in the candidate macro node is erased.

When identifying a candidate macro node in the grid, those macro nodes which include only parallel micro node segments of the plurality of micro node circuit paths 136', 138', 140' and 142' are possible candidates. Each parallel micro node segment extends parallel from the ingress micro node to the egress micro node. The selected candidate macro node should be a certain distance within the conductive circuit 2528. For example, at least the start macro node and the end macro node should not be re-arranged in some embodiments. The candidate macro node should not include any segments which include 90 degree turns or forms corners. By definition, a segment includes the path from the ingress micro node to an egress micro node and any intermediate micro nodes in the path therebetween. Such path may be linear along a horizontal line or a vertical line. However, some segments may include right angle, other angles, or paths such that the path does not follow a straight line with the ingress micro node and the egress micro node being in the same row or column.

Micro nodes 2624-1 are the ingress micro nodes of candidate macro node $114_{2,0}$. Micro nodes 2624-E are egress micro nodes based on the flow of the paths beginning from the start macro node $114_{0,0}$ and moving in the direction of the end macro node $114_{4,0}$. The ingress micro nodes and egress modes are arranged in columns (i.e., columns 0, 1, 2, 3 and 4). However, in the candidate macro node CMN5, the ingress micro nodes and egress modes are arranged in rows (i.e., rows 0, 1, 2, 3 and 4). Specifically, for the direction and orientation of the ingress micro nodes and egress micro nodes needs to be tracked for reconnection and pinout identification. The re-arrangement configuration profiles 2552 may include the configurations in FIGS. 29A-K.

Figure 27:
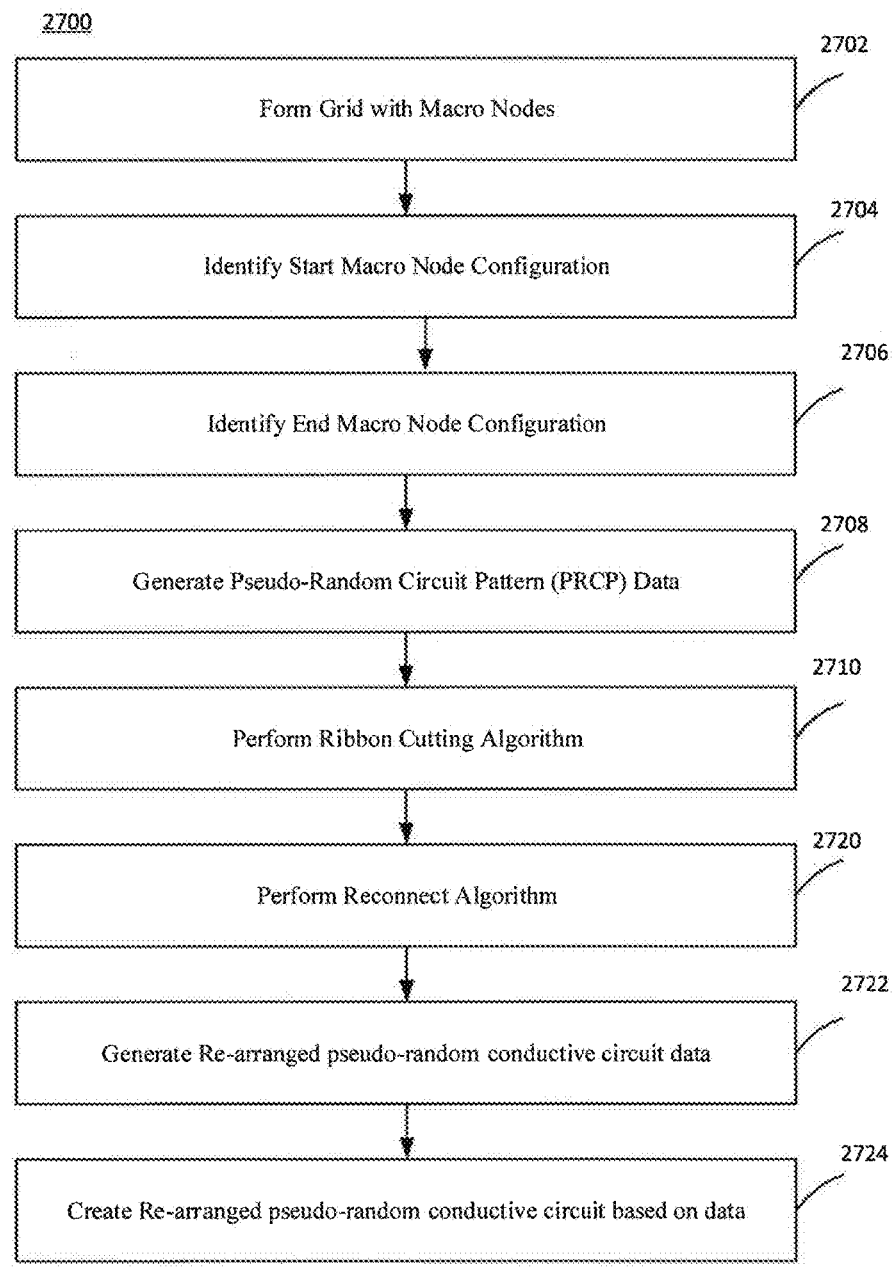
FIG. 27 is a flowchart diagram of a method for creating a re-arranged pseudo-random circuit.

FIG. 27 is a flowchart diagram of a method 2700 for creating a re-arranged pseudo-random circuit 2575. The method blocks described herein may be performed in the order shown or a different order. One or more blocks may be omitted or added. One or more blocks may be performed contemporaneously.

The method 2700 comprises, at block 2702, forming a grid with macro nodes as shown in FIG. 26A. The grid may also include micro node arrangement as well. At block 2704, the start macro node configuration may be identified. At block 2706, the end macro node configuration may be identified. At block 2708, the pseudo-random or random circuit pattern (PRCP) data is generated. At block 2710, a ribbon cutting algorithm is performed using the PRCP data. At block 2720, a reconnect algorithm is performed. At block 2722, a re-arranged pseudo-random conductive circuit data of the schematic is generated. At block 2724, a re-arranged pseudo-random conductive circuit is created using electrically conductive materials for the electrically conductive circuit pattern.

Figure 31:
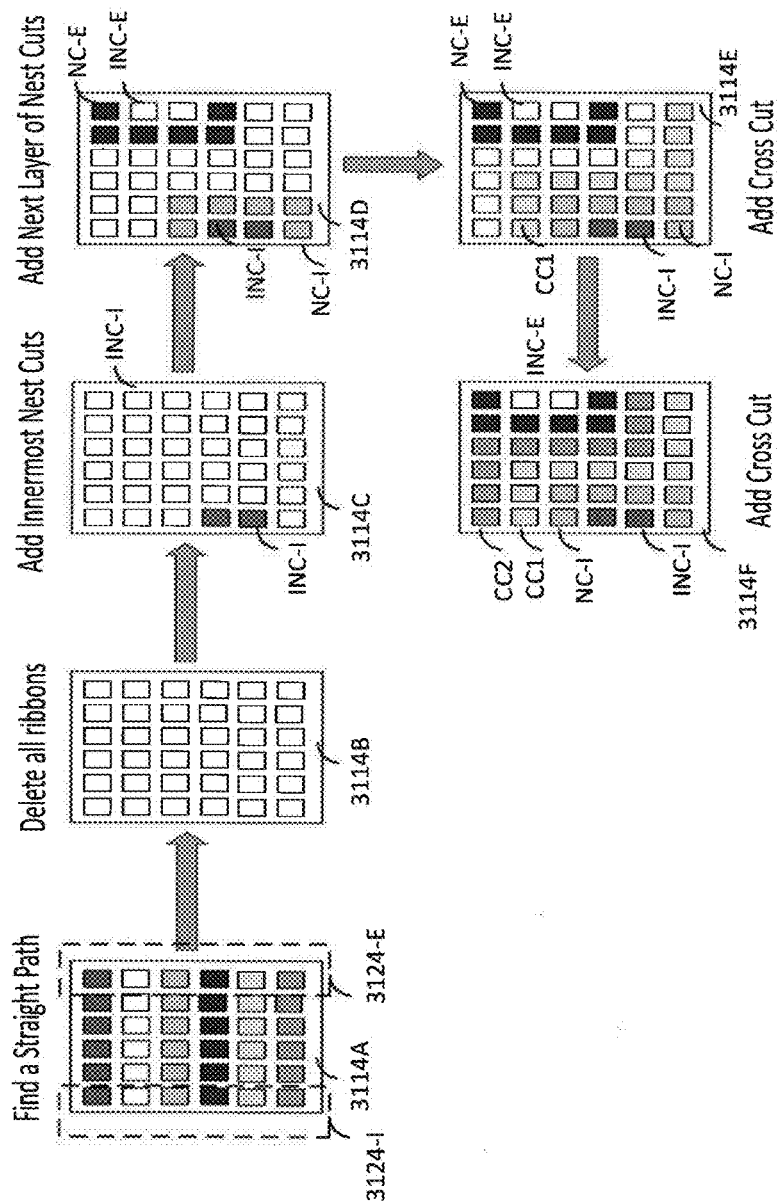
FIG. 31 is another flow diagram of the reconnection algorithm.

The reconnect algorithm performed at block 2720 includes an order of steps to reconnect disconnected circuit paths do not block ingress and egress micro nodes in the iterations to reconnect the ingress and egress micro nodes. This order is best shown in FIGS. 30B and 31. The reconnect algorithm may vary based on the user's configuration preferences. In some configuration options, the straight segment may be formed first. In some configurations, the innermost nest cuts are formed before the outermost nest cuts which surround the inner most cuts. In some macro nodes, there may be more than two layers of nested cuts. In other configuration options, the cross cuts CC may be formed with the straight column/row paths.

When adding cross cuts CC the path is created by moving sideways towards the egress connection micro node followed by a 90 degree angle in the direction of the egress micro node row and move up or down the available column of open micro nodes in the candidate macro node. Then, when the row of the egress micro node is reach, turn to make another 90 degree angle and move straight towards the egress micro node on its row of available open micro nodes.

The explanation uses as a frame of reference rows and columns. However, depending on the selected candidate micro node, the rows may be columns and the columns may be rows as the re-arranged macro node is re-inserted into the grid schematic.

Figure 28:
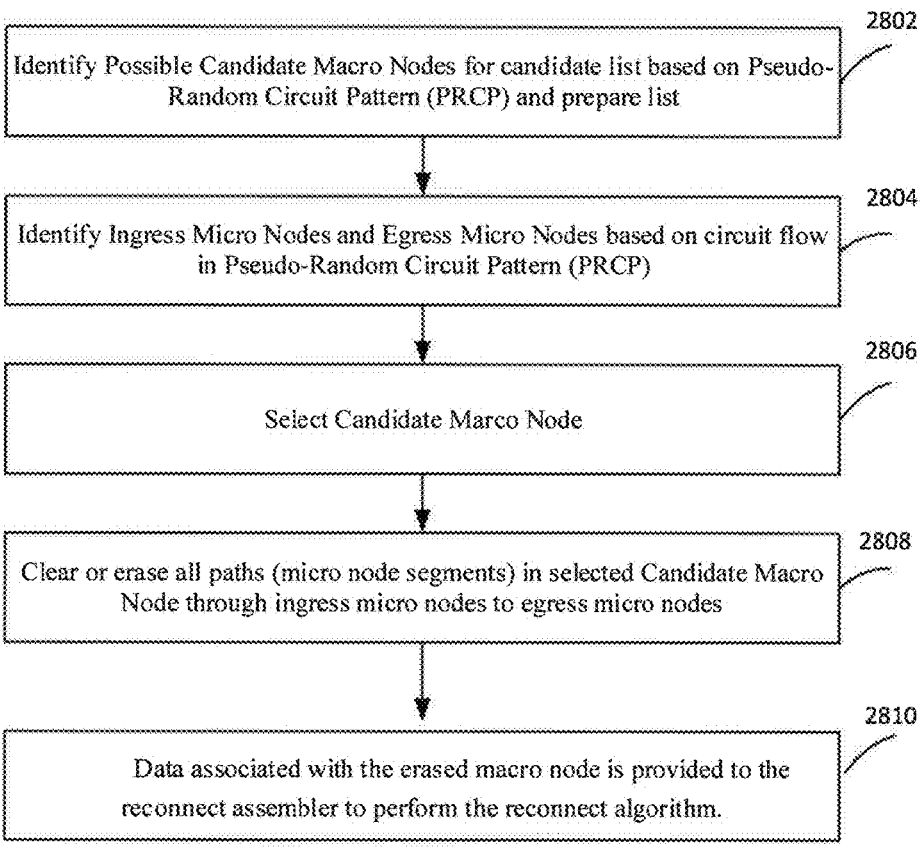
FIG. 28 is a flowchart diagram of a method for performing ribbon cutting.

FIG. 28 is a flowchart diagram of a method 2710 for performing ribbon cutting. The method includes, at block 2802, identifying possible candidate macro nodes based on the PRCP data and prepare a list. At block 2804, the ingress micro nodes and egress micro nodes based on the circuit flow (represented in FIG. 26A) in the PRCP data are identified. At block 2806, a candidate macro node is selected. At block 2808, all path in the macro node selected are erased. The paths are erased from ingress micro node to egress micro node and any intermediary connects through the micro nodes. At block 2810, data associated with the erased macro node is provided to the reconnect assembler 2550 to perform the reconnect algorithm.

The re-arrangement configuration profiles will now be described in detail. In FIGS. 29A-K, the re-arrangement configurations profiles such as shown for a 4×4 macro node for the number of micro nodes is stored in memory and accessible from the database. The re-arrangement building profiles 2556, discussed later, allow a user to manually re-arrange the circuit path segments in the erased (candidate)

macro node such that a macro node can be re-arranged to include a profile such as shown in FIGS. 29A-K.

The re-arrangement building profiles can be seen in the individual re-arrangement configuration profiles in FIGS. 29A-29K. The re-arrangement building profiles include a Z-shaped segment connecting an ingress micro node to a different egress micro node wherein the Z-shaped segment follows a Z-path through the intermediate micro nodes in the candidate macro node to the different egress micro node. The Z-shaped segment may sometimes be called a cross-cut. When using building profiles, no two reconnect segments cross over each other. Therefore, when manually re-arranging the macro node, some building profiles can be made unavailable to the user if no possible set of micro nodes can be used to connect an available or open ingress node with an available ingress node without crossing over another segment.

The re-arrangement building profiles 2556 include an ingress bridge segment connecting two immediately adjacent micro nodes. The re-arrangement building profiles may include an ingress innermost nest cut segment electrically connecting two immediately adjacent micro nodes; an egress innermost nest cut segment electrically connecting two immediately adjacent micro nodes; an ingress nest cut segment electrically connecting an ingress micro node to a different non-adjacent ingress micro node by surrounding an ingress innermost nest cut segment; and an egress nest cut segment electrically connecting an egress micro node to a different non-adjacent egress micro node by surrounding an egress innermost nest cut segment.

The embodiments herein vary the pseudo-random circuit pattern of the conductive circuit 2528 by modifying the micro node circuit paths so that a plurality of the continuous paths of the micro node circuit paths from the start macro node to the end macro node are rearranged according to a respective one rearrangement configuration of a plurality of possible rearrangement configurations. The respective one predetermined rearrangement configuration corresponds to a modification in the edge connector pinout for the start macro node and the edge connector pinout for the end macro node which together for an edge connector pinout pair. The rearranging is performed according to a ribbon cutting process.

Ribbon cutting process allows new input/output configurations from a single board design. The number of configurations f(n) where n is the number of circuits is defined by the following formula $$f(n)=\Sigma_{i=0}^{n-1} f(i)f(n-1-i).$$

The ribbon cutting process may allow specific circuit paths to be nested within each other or seclude circuits to different areas of a circuit board. The ribbon cutting process happens at one location (macro node) on the board after the micro node circuits paths are set for the pseudo-random circuit pattern. Randomization of a ribbon configurations is heightened as the possible configurations grow exponentially with the number of circuits as shown in Table 3.

TABLE 3

| f(n) n = circuits | Number of Possible Configuration Profiles |
|---|---|
| f(1) | 1 |
| f(2) | 2 |
| f(3) | 5 |
| f(4) | 14 |
| f(5) | 42 |

TABLE 3-continued

| f(n) n = circuits | Number of Possible Configuration Profiles |
|---|---|
| f(6) | 132 |
| f(7) | 429 |
| f(8) | 1,430 |
| f(9) | 4,862 |
| f(10) | 16,796 |
| f(11) | 58,786 |
| f(12) | 208,012 |
| f(13) | 742,900 |
| f(14) | 2,784,440 |
| f(15) | 9,694,845 |
| f(16) | 35,357,670 |
| f(17) | 129,644,790 |
| f(18) | 477,638,700 |
| f(19) | 1,767,263,190 |
| f(20) | 6,564,120,420 |

The ribbon cutting configurations may allow input (ingress) and output (egress) connector micro nodes of a macro node to be rearranged. Configurations can be user-specified or generated through automation using the building profiles such as shown and described herein. However, other building profiles may be contemplated. The re-arrangement configuration profiles may drastically alter the layout of the circuit paths along a board. The numbering of locations allows configurations to be specified by connection points.

FIGS. 29A-29K illustrate re-arrangement configuration profiles for a 4×4 macro node. Thus, as will be seen from the description below, there is 14 possible re-arrangement configuration profiles which are configuration options individually selectable by the user. In FIG. 29A, the re-arrangement configuration profile 2900A includes a first Z-shaped segment following a Z-path from the ingress micro node 1 to the egress micro node 3. The actually movement through micro nodes is best seen in FIG. 30B. The re-arrangement configuration profile 2900A also includes an ingress innermost nest cut segment (bridge) from ingress micro node 2 to immediately adjacent ingress micro node 3. The re-arrangement configuration profile 2900A also includes an egress innermost nest cut segment (bridge) from egress micro node 1 to egress micro node 2. The ingress micro node 4 is directly coupled to egress micro node 4 in a straight path. The straight path is reformed.

The pinout configuration will be described. As can be appreciated, the pin arrangement and number may be changed from the nomenclature used here. On the ingress side, pin P1 is set to ingress node 1. Pins P2 and P3 are tied to the same potential so the same number is used. Here, the number 2 may be used for both pins P2 and P3 since there is a bridge from pins P2 to P3. Pin P4 has now been changed to be the next path, number 3. On the output side, pin P4 is tied to number 3 which corresponds to the straight line as the ingress micro node is set to the number 3, for example. Since, the P3 is tied to the ingress node 1; P3 is denoted as number 1. The pin P1 and P2 are bridged so they have the same potential denoted as number 4. Hence, the circuit paths are continuous but instead of having a one to one correspondence between the start macro node and the end macro node, some circuits are looped to create a continuous path back to the start macro node or some circuits loop to create a continuous path beginning and ending at the end macro node.

In FIG. 29B, the re-arrangement configuration profile 2900B includes a first Z-shaped segment following a Z-path from the ingress micro node 1 to the egress micro node 3 and a second Z-shaped segment following a Z-path from ingress micro node 2 to the egress micro node 4. The re-arrangement configuration profile 2900A also includes an ingress innermost nest cut segment (bridge) from ingress micro node 3 to ingress micro node 4. The re-arrangement configuration profile 2900A also includes an egress innermost nest cut segment (bridge) from egress micro node 1 to egress micro node 2. In some embodiments, the first Z-shaped segment and the second Z-shaped segment are immediately adjacent to each other.

In FIG. 29C, the re-arrangement configuration profile 2900C is the original macro node configuration wherein the ingress micro node 1 is directly coupled to egress micro node 1 in a straight path; the ingress micro node 2 is directly coupled to egress micro node 2 in a straight path; the ingress micro node 3 is directly coupled to egress micro node 3 in a straight path; and the ingress micro node 4 is directly coupled to egress micro node 4 in a straight path.

In FIG. 29D, the re-arrangement configuration profile 2900D includes a first straight path segment from ingress micro node 1 directly coupled to egress micro node 1; and a second straight path from ingress micro node 2 directly coupled to egress micro node 2. The re-arrangement configuration profile 2900D also includes an ingress innermost nest cut segment (bridge) from ingress micro node 3 to ingress micro node 4. The re-arrangement configuration profile 2900D also includes an egress innermost nest cut segment (bridge) from egress micro node 3 to egress micro node 4.

In FIG. 29E, the re-arrangement configuration profile 2900E includes a first Z-shaped segment following a Z-path from the ingress micro node 2 to the egress micro node 4. The re-arrangement configuration profile 2900E also includes an ingress innermost nest cut segment (bridge) from ingress micro node 3 to ingress micro node 4. The re-arrangement configuration profile 2900E also includes an egress innermost nest cut segment (bridge) from egress micro node 2 to egress micro node 3. The ingress micro node 1 is directly coupled to egress micro node 1 in a straight path.

In FIG. 29F, the re-arrangement configuration profile 2900F includes a Z-shaped segment following a Z-path from the ingress micro node 4 to the egress micro node 2. The ingress micro node 1 is directly coupled to egress micro node 1 in a straight path. The re-arrangement configuration profile 2900F also includes an ingress innermost nest cut segment (bridge) from ingress micro node 2 to ingress micro node 3. The re-arrangement configuration profile 2900F also includes an egress innermost nest cut segment (bridge) from egress micro node 3 to ingress micro node 4.

In FIG. 29G, the re-arrangement configuration profile 2900G includes a first straight segment from ingress micro node 1 to the egress micro node 1; and a second straight segment from ingress micro node 4 to the egress micro node 4. The re-arrangement configuration profile 2900G also includes an ingress innermost nest cut segment (bridge) from ingress micro node 2 to ingress micro node 3. The re-arrangement configuration profile 2900G also includes an egress innermost nest cut segment (bridge) from egress micro node 2 to egress micro node 3.

In FIG. 29H, the re-arrangement configuration profile 2900H includes, in the denoted box, a first ingress innermost nest cut segment (bridge) from ingress micro node 2 to ingress micro node 3; and an ingress nested cut from ingress micro node 1 to non-adjacent ingress micro node 4 which surround the first ingress cut segment. The re-arrangement configuration profile 2900H includes a first egress innermost nest cut segment (bridge) from egress micro node 2 to egress micro node 3; and an egress nested cut from egress micro node 1 to non-adjacent egress micro node 4 surrounding the first ingress innermost nest cut segment.

In FIG. 29I, the re-arrangement configuration profile 2900I includes a first ingress innermost nest cut segment (bridge) from ingress micro node 2 to ingress micro node 3; and an ingress nested cut from ingress micro node 1 to non-adjacent ingress micro node 4 which surrounds the first innermost nest cut segment. The re-arrangement configuration profile 2900I includes a first egress bridge from egress micro node 1 to egress micro node and a second egress bridge from egress micro node 3 to egress micro node 4.

In FIG. 29J, the re-arrangement configuration profile 2900J includes a first ingress innermost nest cut segment (bridge) from ingress micro node 1 to ingress micro node 2; and a second ingress innermost nest cut segment (bridge) from ingress micro node 3 to ingress micro node 4. The re-arrangement configuration profile 2900J includes a first egress innermost nest cut segment (bridge) from egress micro node 1 to egress micro node 2; and a second egress innermost nest cut segment (bridge) from egress micro node 3 to egress micro node 4.

In FIG. 29K, the re-arrangement configuration profile 2900K includes a first Z-shaped segment following a Z-path from the ingress micro node 3 to the egress micro node 1 and a second Z-shaped segment following a Z-path from ingress micro node 4 to the egress micro node 3. The re-arrangement configuration profile 2900K also includes an ingress innermost nest cut segment (bridge) from ingress micro node 1 to ingress micro node 2. The re-arrangement configuration profile 2900K also includes an egress innermost nest cut from egress micro node 3 to ingress micro node 3. In some embodiments, the first Z-shaped segment and the second Z-shaped segment are immediately adjacent to each other.

All 14 configuration profiles are not shown. As can be seen from the description below, the configuration profile 2900I can be reversed such that the nested cut segment and innermost nest cut segment on the ingress side may be created on the egress side. Likewise, the two egress innermost nest cut segments can be formed on the ingress side. Additionally, the configuration profile of FIG. 29D may be reversed. For example, the two straight lines may be moved to ingress micro nodes 3 and 4, the innermost nest cut segment on the ingress side may be moved to ingress micro nodes 1 and 2. Furthermore, the innermost nest cut segment on the egress side may be moved to ingress micro nodes 1 and 2. The arrangement of FIG. 29E may be transposed so that the straight line is formed between ingress micro node and egress micro node 4. The cross cut would be formed from egress micro node 3 to egress micro node 1. The ingress innermost nest cut segment would be moved to ingress micro nodes 1 and 2. The egress innermost nest cut segment would remain unchanged at egress micro nodes 2 and 3. These additional configuration profiles complete the 14 configuration profiles for four circuit path segments in the candidate macro node. As can be appreciated describing all possible combination for macro nodes with more circuit path segments becomes prohibitive.

FIG. 30A is a macro node 3014 layout for a 6×6 micro node configuration with ingress micro node and egress micro node numbered for discussion purposes. The ingress nodes are N0-N5. The egress nodes are labeled N6-N11. The node N0 is on the same row as node N11. Node N1 is on the same row as N10. Node N2 is on the same row as N9. Node N3 is on the same row as N8. Node N4 is on the same row as N7. Node N5 is on the same row as N6.

FIG. 30B is a flow diagram of the reconnection algorithm used by the reconnection assembler 2550. Candidate macro node 3014A is represented as a 6×6 micro node configuration. The ingress micro nodes in dashed area 3024-1 are on the leading side of the candidate macro node 3014A and are numbered for illustrative purposes N0-N5. The egress micro nodes in dashed area 3024-E are on the trailing side or column of the candidate macro node 3014A and are numbered N6-N11. As seen, all micro node segments are parallel (arranged in a straight path or line). The candidate macro node 3014A denotes a selected candidate macro node. After the candidate macro node is selected, the segments (circuit path linking micro nodes) from ingress micro node to egress micro node are erased, deleted, or omitted, while leaving the micro nodes in original position of a 6×6 macro array. This forms macro node 3014B. The order of the ingress micro nodes is determined and the order of the egress micro nodes is determined for re-arrangement and pinout re-arranging.

In the example, such as for manually generating a re-arranged pseudo-random conductive circuit, a re-arranged macro node 3014F is generated. By way of non-limiting example, there is a plurality of re-arrangement segment building profiles 2556 used to form the re-arrange macro node 3014F. Intermediate macro node states (being re-arranged) are represented at nodes 3014C, 3014D, and 3014E. The re-arranged macro node 3014F being the final re-arranged macro node which may be produced using electrically conductive material to form a re-arranged pseudo-random conductive circuit 2575.

In macro node 3014C, a first straight segment S is formed from ingress micro node N0 to the egress micro node N11 connecting each intermediary micro nodes on this row. Thus, the first straight segment S maintains a continuous conductive circuit ribbon from the start macro node (i.e., start macro node $114_{0,0}$ of FIG. 26A) to the end macro node (i.e., end macro node $114_{4,0}$ of FIG. 26A) for this ribbon wherein each parallel segment is a part of a single conductive circuit ribbon from the start node to the end node.

In the reconnection algorithm, any straight segment building profiles may be first populated in the candidate macro node being re-arranged. Depending on placement of the straight segments, other building profiles may become unavailable for use by the user.

The user many manually create an ingress bridge segment sometimes referred to as ingress innermost nest cut denoted as INC-I. Here, the ingress innermost nest cut bridges together to form a segment connecting adjacent ingress nodes N2 and N3 directly together. The ingress innermost nest cut INC-I includes two immediately adjacent ingress micro nodes (i.e., nodes N2 and N3) in the same column. Thus, the conductive circuit ribbon from the start macro node (i.e., start micro node $114_{0,0}$ of FIG. 26A) to the end macro node (i.e., end micro node $114_{4,0}$ of FIG. 26A) is cut. The conductive ribbon at node N2 is bridged to loop back to the start macro node by the ingress innermost nest cut INC-I to node N3 which corresponds to node N3 in the start macro node. However, electrically, node N3 will have the same potential ad node N2. This is tracked for the edge connector pinout configuration.

In this example, the user may also create an egress bridge segment sometimes referred to as egress innermost nest cut denoted as INC-E. The egress innermost nest cut INC-E bridges together to form a segment connecting egress nodes N7 and N8 directly together. The egress innermost nest cut INC-E includes two immediately adjacent egress micro nodes (i.e., nodes N7 and N8). Thus, the conductive circuit ribbon from the start macro node (i.e., start micro node $114_{0,0}$ of FIG. 26A) to the end macro node (i.e., end micro node $114_{4,0}$ of FIG. 26A) is cut. The conductive ribbon at node N7 is bridged to loop back to the end macro node by the bridge segment to node N7 which corresponds to node N8 in the end macro node.

The user many manually create a second layer ingress bridge segment sometimes referred to as ingress nest cut denoted as NC-I. Here, the ingress nest cut NC-I bridges together to form a segment between non-adjacent ingress nodes N1 and N4. The ingress nest cut NC-I includes a backward C-shaped or U-shaped segment which surrounds innermost nest cut nodes N2 and N3 and intermediate micro nodes in the immediately adjacent column to the ingress micro node column of the candidate macro node. In the ingress nest cut, a segment links the ingress nodes N1 and N4 and the intermediate nodes by forming a backward C-shaped segment. Here, the C-shaped segment will electrically connect or link the circuit paths of micro nodes N1 and N4 through the C-shaped segment.

Thus, the conductive circuit from the start macro node (i.e., start micro node $114_{0,0}$ of FIG. 26A) to the end macro node (i.e., end micro node $114_{4,0}$ of FIG. 26A) is cut. The ingress nest cut NC-I electrically links the conductive circuit from ingress node N1 to ingress node N4 of the start macro node. The conductive ribbon at node N2 remains bridged to loop back to the start macro node by the bridge segment to node N3 to corresponding node N3 in the start macro node.

In the reconnection algorithm, the user may be prompted to form any ingress innermost nest cuts INC-I or egress innermost nest cuts INC-E before providing the option to form the ingress nest cut NC-I or the egress nest cut NC-E.

In this example, the user many manually create a second layer egress bridge segment sometimes referred to as ingress nest cut denoted as NC-E. Here, the egress nest cut NC-E bridges together to form a segment between non-adjacent ingress nodes N6 and N9. The egress nest cut NC-E includes a C-shaped or U-shaped segment which surrounds innermost nest cut nodes N7 and N8 and intermediate micro nodes in the immediately adjacent column to the egress micro node column of the candidate macro node. In the egress nest cut, a segment links the egress nodes N6 and N9 and the intermediate nodes by forming a C-shaped segment. Here, the C-shaped segment will electrically connect or link the circuit paths of micro nodes N6 and N9 through the C-shaped segment.

The remaining micro node N5 can be used to create a Z-shaped segment from micro node N5 to micro node N10 which links intermediate nodes along a path in the candidate micro node using a straight column of micro nodes to micro node N5 to micro node N10 without crossing over any other segments. The Z-shaped segment links micro nodes from micro node N5 along the row 5 in the direction of the egress micro nodes until, for example, the nest available micro node in an adjacent row of the micro node is open for connection to the corresponding column, and then the segment path turns 90 degrees. Here, the Z-shaped segment forms a straight line parallel with the vertical leg of the ingress nest cut NC-I until the row for the egress micro nodes is reach, then the path turns 90 degrees again to link all remaining micro nodes in the row of the egress micro node N10.

In this example, all ingress micro nodes are re-arranged and all egress micro nodes are re-arranged. In the candidate macro node 3014A, the parallel segments created straight paths through all micro nodes of the parallel rows from ingress micro node to egress micro node. However, in this example, as a result of the re-arrangement operations, some of the micro nodes in box 3024-O in a respective one column are un-linked or open. However, all ingress micro nodes and conductive paths are bridged to main a conductive path either between two end micro nodes, two end micro nodes or a start micro node and a different end micro node.

FIG. 31 is another flow diagram of the reconnection algorithm. However as shown in FIG. 31, all micro nodes previously electrically connected in the schematic are re-linked electrically. In this configuration, candidate macro node 3114A is represented as a 6×6 micro node configuration. The ingress micro nodes in dashed area 3124-I are on the leading side of the candidate macro node 3114A and are numbered for illustrative purposes uses the same number of FIG. 30A. The egress micro nodes in dashed area 3124-E are on the trailing side or column of the candidate macro node 3114A and are numbered N6-N11. As seen, all micro node segments are parallel (arranged in a straight path or line). The candidate macro node 3114A denotes a selected candidate macro node. After the candidate macro node is selected, the segments (circuit path linking micro nodes) from ingress micro node to egress micro node are erased, deleted, or omitted, while leaving the micro nodes in original position of a 6×6 macro array. The erased macro node is represented at 3114B. The order of the ingress micro nodes is determined and the order of the egress micro nodes is determined for re-arrangement and pinout re-arranging.

In the example, such as for manually generating a re-arranged pseudo-random conductive circuit, a re-arranged macro node 3114E is generated. By way of non-limiting example, there is a plurality of re-arrangement segment building profiles 2556 used to form the re-arrange macro node 3114F. Intermediate macro node states (being re-arranged) are represented at nodes 3114C, 3114D, and 3114E. The re-arranged macro node 3114F being the final re-arranged macro node which may be produced using electrically conductive material to form a re-arranged pseudo-random conductive circuit 2575.

In macro node 3114C, a first straight segment S is not formed. Instead, in the reconnection algorithm, the user many manually create an ingress bridge segment sometimes referred to as ingress innermost nest cut denoted as INC-I. Here, the egress innermost nest cut INC-I bridges together to form a segment connecting adjacent ingress nodes N3 and N4 directly together. Also, the egress innermost nest cut INC-I bridges together to form a segment connecting adjacent ingress nodes N9 and N10 directly together.

In macro node 3114D, a second layer ingress bridge segment sometimes referred to as ingress nest cut denoted as NC-I may be formed. Here, the ingress nest cut NC-I bridges together to form a segment between non-adjacent ingress nodes N2 and N5. A second layer egress bridge segment sometimes referred to as ingress nest cut denoted as NC-E may be formed. Here, the egress nest cut NC-E bridges together to form a segment between non-adjacent ingress nodes N8 and N11.

In macro node 3114E, a cross cut CC1 having a Z-shaped segment is formed from ingress micro node N1 to egress micro node N6. In macro node 3114E, another cross cut CC2 having a Z-shape segment from ingress micro node N1 to egress micro node N7. Each segment represents a schematic of an electrically conductive path which is to be created or formed using electrically conductive material.

Figure 32B:
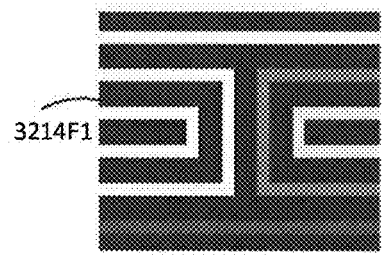
FIG. 32B-32C are a few re-arrangement configuration profiles for a 6×6 candidate macro node.
Figure 32A:
FIG. 32A is a candidate macro node.

FIG. 32A is a candidate macro node 3214A. The candidate macro node 3214A includes six parallel micro node segments which extend from ingress micro nodes through to the egress macro nodes. The first line denoted as a straight line. The second line below the first line denoted as long dashes. The third line denoted as long dash, dot, long dash. The fourth line denoted as long dash, short dash, long dash. The fifth line denoted as short dashes. The sixth line being a short dash, dot, dot, short dash pattern. Accordingly, the macro node 3214A includes six ingress micro nodes and six egress micro nodes. The macro nodes have a 6×6 arrangement of micro nodes.

Figure 32C:
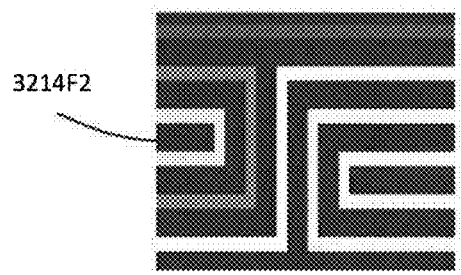

FIGS. 32B-32C are a few re-arrangement configuration profiles for a 6×6 candidate macro node. In FIG. 32B, the first and second ingress micro nodes are connected by an ingress bridge segment.

This invention adds additional variability and complexity to the Generating Intertwined Pseudo-Random Circuits (PRC). The embodiments herein may supports a wide variety of edge connector options. Circuits can now have wildly different electrical characteristics. Furthermore, the circuits may selectively cover different board regions.

The embodiments herein operate on the results of the ribbon generated by the pseudo-random circuit generator. The ribbon produced will adhere to a U-shaped configuration where we assume an edge connector pinout of "1, 2, 3, . . . , (N−1), N, N', (N−1)', . . . , 3', 2', 1'". The operator must then describe the configuration change so that the alternative pinout is known or can be requested by a vendor or electric circuit tester. For example, the operator might seek to produce an alternative pinout configuration.

In this case, the embodiments would select an appropriate point within the original ribbon (circuit paths) or arbitrary locations anywhere within the ribbon, which would make finding the re-arrangement (conductive path cuts) very difficult to find.

Figure 33:
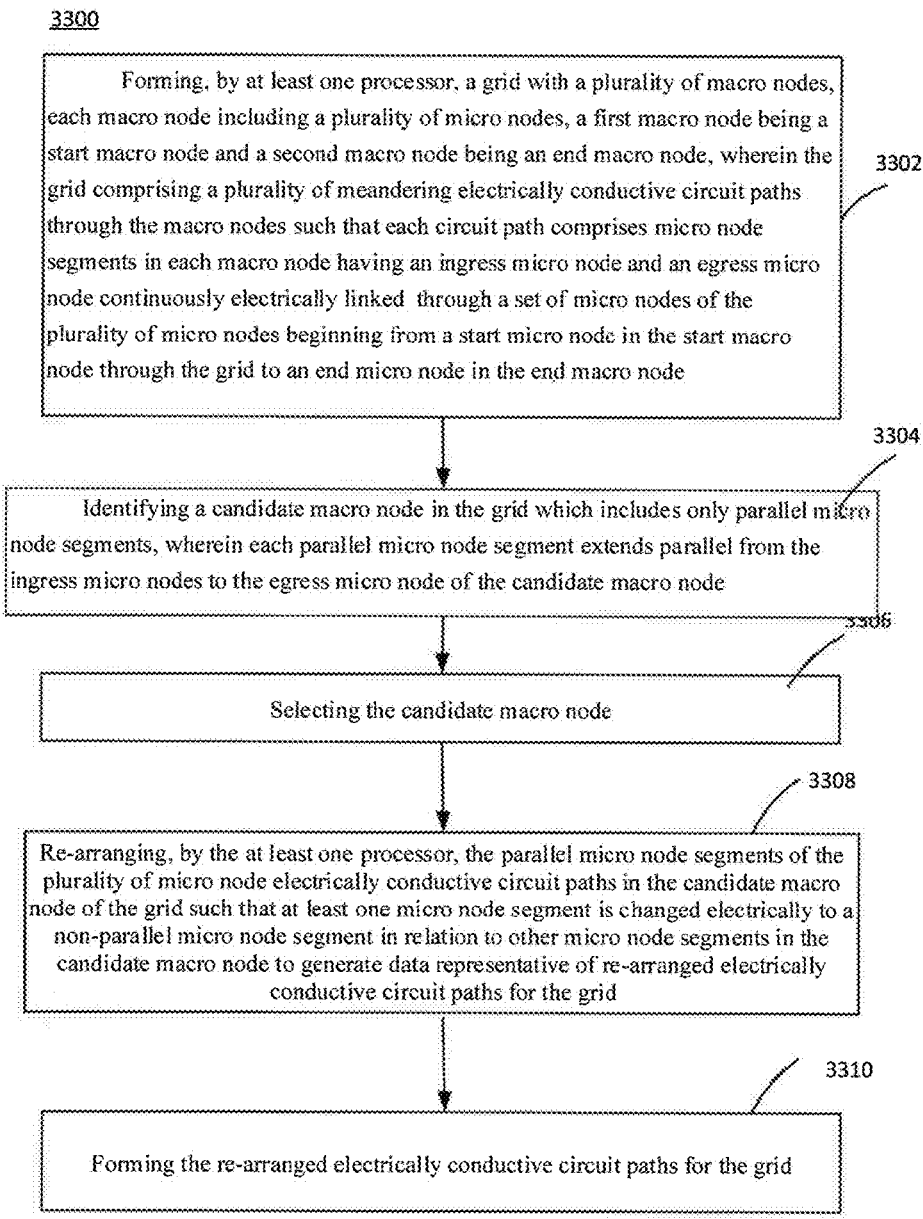
FIG. 33 is a flowchart of a method for pseudo-random circuit re-arranging.

FIG. 33 is a flowchart of the method 3300 for pseudo-random circuit re-arranging. The method blocks described herein may be performed in the order shown or a different order. One or more blocks may be omitted or added. One or more blocks may be performed contemporaneously.

The method 3300 comprises, at block 3302, forming, such as by at least one processor, a grid with a plurality of macro nodes, each macro node including a plurality of micro nodes, a first macro node being a start macro node and a second macro node being an end macro node, wherein the grid comprising a plurality of meandering electrically conductive circuit paths through the macro nodes such that each circuit path comprising circuit path micro node segments in each macro node having an ingress micro node and an egress micro node continuously electrically linked through a set of micro nodes of the plurality of micro nodes beginning from a start micro node in the start macro node through the grid to end at an end micro node in the end macro node.

The method 3300 comprises, at block 3304, identifying a candidate macro node in the grid which includes only parallel circuit path micro node segments, wherein each parallel circuit path micro node segment extends parallel from the ingress micro nodes to the egress micro node of the candidate macro node and, at block 3306, selecting the candidate macro node.

The method 3300 comprises, at block 3308, re-arranging, such as by at least one processor, the parallel circuit path micro node segments of the plurality of micro node electrically conductive circuit paths in the candidate macro node of the grid such that at least one micro node circuit path segment is changed electrically to a non-parallel circuit path micro node segment in relation to other circuit path micro node segments in the candidate macro node to generate data representative of re-arranged electrically conductive circuit paths for the grid.

The method 3300 comprises, at block 3310, forming the re-arranged electrically conductive circuit paths for the grid. The forming includes forming the conductive paths with electrically conductive material such as used in electronic devices.

A tangible, non-transitory computer readable medium having program instructions executed by at least one processor may be used to perform a method of FIG. 33. The method may be embodied by programming instructions executed by at least one processor in a computing device.

Those skilled in the art will recognize improvements and modifications to the preferred embodiments of the disclosure. All such improvements and modifications are considered within the scope of the concepts disclosed herein and the claims that follow.

What is claimed:

1. A method comprising:
   forming, by at least one processor, a grid with a plurality of macro nodes, each macro node including a plurality of micro nodes, a first macro node being a start macro node and a second macro node being an end macro node, wherein the grid comprising a plurality of meandering electrically conductive circuit paths through the plurality of macro nodes such that each circuit path comprises circuit path micro node segments in each macro node having an ingress micro node and an egress micro node continuously electrically linked through a set of micro nodes of the plurality of micro nodes beginning from a start micro node in the start macro node through the grid to an end micro node in the end macro node;
   identifying a candidate macro node in the grid which includes only parallel circuit path micro node segments, wherein each parallel circuit path micro node segment extends parallel from the ingress micro node to the egress micro node of the candidate macro node;
   selecting the candidate macro node;
   re-arranging, by the at least one processor, the parallel micro node segments of the plurality of micro node meandering electrically conductive circuit paths in the candidate macro node of the grid such that at least one micro node segment is changed electrically to a non-parallel circuit path micro node segment in relation to other circuit path micro node segments in the candidate macro node to generate data representative of the re-arranged meandering electrically conductive circuit paths for the grid; and
   forming the re-arranged electrically conductive circuit paths for the grid.

2. The method of claim 1, wherein the re-arranging comprises: connecting two immediately adjacent ingress micro nodes directly together by a first bridge segment to form a first non-parallel circuit path micro node segment; and connecting two immediately adjacent egress micro nodes directly together by a second bridge segment to from a second non-parallel circuit path micro node segment.

3. The method of claim 1, wherein the non-parallel circuit path micro node segment comprises one of:
   a Z-shaped segment electrically connecting an ingress micro node of the candidate macro node (CMN) to a different egress micro node of the CMN wherein the Z-shaped segment follows a Z-path through intermediary micro nodes of the CMN;
   an ingress innermost nest cut segment electrically connecting directly two immediately adjacent micro nodes directly;
   an egress innermost nest cut segment electrically connecting directly two immediately adjacent micro nodes;
   an ingress nest cut segment electrically connecting a first non-adjacent ingress micro node to a different second non-adjacent ingress micro node by surrounding an ingress innermost nest cut segment; and
   an egress nest cut segment electrically connecting a first non-adjacent egress micro node to a different second non-adjacent egress micro node by surrounding an egress innermost nest cut segment.

4. The method of claim 1, wherein the plurality of meandering electrically conductive circuit paths have a first connector pinout configuration for the micro nodes in the start macro node and a second connector pinout configuration for the micro nodes in the end macro node, and further comprising:
   re-defining the first connector pinout configuration and the second connector pinout configuration, based on the re-arranged electrically conductive circuit paths for the grid.

5. The method of claim 1, further comprising storing in a memory device, for the candidate macro node, a plurality of re-arranged macro node candidate options, each re-arranged macro node candidate option having at least one non-parallel circuit path micro node segment for the selected candidate macro node.

6. The method of claim 5, further comprising selecting a respective one re-arranged macro node candidate option from the memory device; and the re-arranging of the parallel circuit path micro node segments of the plurality of micro node electrically conductive circuit paths includes replacing the candidate macro node of the grid with the selected re-arranged macro node candidate option.

7. The method of claim 1, further comprising storing in a memory device a plurality of non-parallel circuit path micro node segment building profiles wherein the re-arranging of the parallel circuit path micro node segments of the plurality of micro node meandering electrically conductive circuit paths includes:
   erasing all circuit path micro node segments of the candidate macro node;
   selecting a building profile to form the non-parallel circuit path micro node segment;
   inserting in the candidate macro node the selected building profile to re-link a selected ingress micro node to a preceding macro node and a selected egress micro node to a succeeding macro node; and
   repeating the selecting and the inserting to re-arrange all electrically re-linked ingress nodes of the candidate macro node and all electrically linked egress nodes of the candidate macro node.

8. A computing device comprising:
   a memory device; and
   a computing device comprising at least one processor and coupled to the memory device, the at least one processor configured to:
      form a grid with a plurality of macro nodes, each macro node including a plurality of micro nodes, a first macro node being a start macro node and a second macro node being an end macro node, wherein the grid comprising a plurality of meandering electrically conductive circuit paths through the plurality of macro nodes such that each circuit path comprises circuit path micro node segments in each macro node having an ingress micro node and an egress micro node continuously electrically linked through a set of micro nodes of the plurality of micro nodes beginning from a start micro node in the start macro node through the grid to an end micro node in the end macro node;

identify a candidate macro node in the grid which includes only parallel circuit path micro node segments, wherein each parallel circuit path micro node segment extends parallel from the ingress micro nodes to the egress micro node of the candidate macro node;

receive a selection of the candidate macro node; and re-arrange the parallel circuit path micro node segments of the plurality of micro node meandering electrically conductive circuit paths in the candidate macro node of the grid such that at least one circuit path micro node segment is changed electrically to a non-parallel circuit path micro node segment in relation to other circuit path micro node segments in the candidate macro node to generate data representative of re-arranged electrically conductive circuit paths for the grid.

9. The computing device of claim 8, wherein the at least one processor configured to: when re-arranging, connect two immediately adjacent ingress micro nodes directly together by a first bridge segment to form a first non-parallel circuit path micro node segment; and connect two immediately adjacent egress micro nodes directly together by a second bridge segment to from a second non-parallel circuit path micro node segment.

10. The computing device of claim 8, wherein the non-parallel circuit path micro node segment comprises one of:

a Z-shaped segment electrically connecting an ingress micro node of the candidate macro node (CMN) to a different egress micro node of the CMN wherein the Z-shaped segment follows a Z-path through intermediary micro nodes of the CMN;

an ingress innermost nest cut segment electrically connecting two immediately adjacent micro nodes directly;

an egress innermost nest cut segment electrically connecting two immediately adjacent micro nodes directly;

an ingress nest cut segment electrically connecting a first non-adjacent ingress micro node to a different second non-adjacent ingress micro node by surrounding an ingress innermost nest cut segment; and an egress nest cut segment electrically connecting a first non-adjacent egress micro node to a different second non-adjacent egress micro node by surrounding an egress innermost nest cut segment.

11. The computing device of claim 8, wherein the plurality of meandering electrically conductive circuit paths have a first connector pinout configuration for the micro nodes in the start macro node and a second connector pinout configuration for the micro nodes in the end macro node, and the at least one processor further configured to:

re-define the first connector pinout configuration and the second connector pinout configuration, based on the re-arranged meandering electrically conductive circuit paths for the grid.

12. The computing device of claim 8, wherein the at least one processor configured to:

store in the memory device, for the candidate macro node, a plurality of re-arranged macro node candidate options, each re-arranged macro node candidate option having at least one non-parallel circuit path micro node segment for a selected candidate macro node.

13. The computing device of claim 8, wherein the at least one processor configured to:

select a respective one re-arranged macro node candidate option from the memory device; and when re-arranging the parallel circuit path micro node segments of the plurality of micro node meandering electrically conductive circuit paths, replace the candidate macro node of the grid with the selected re-arranged macro node candidate option.

14. The computing device of claim 8, wherein the memory device stores a plurality of non-parallel circuit path micro node segment building profiles wherein the at least one processor configured to:

when re-arranging of the parallel circuit path micro node segments of the plurality of micro node meandering electrically conductive circuit paths, erase all circuit path micro node segments of the candidate macro node;

perform selecting of a building profile to form the non-parallel circuit path micro node segment;

perform inserting in the candidate macro node the selected building profile to re-link an ingress micro node to a preceding macro node and an egress micro node to a succeeding macro node; and repeat the selecting and the inserting to re-arrange all electrically linked ingress nodes of the candidate macro node and all electrically linked egress nodes of the candidate macro node.

15. A tangible, non-transitory computer readable medium having program instructions executed by at least one processor to perform a method comprising:

forming, by at least one processor, a grid with a plurality of macro nodes, each macro node including a plurality of micro nodes, a first macro node being a start macro node and a second macro node being an end macro node, wherein the grid comprising a plurality of meandering electrically conductive circuit paths through the plurality of macro nodes such that each circuit path comprises circuit path micro node segments in each macro node having an ingress micro node and an egress micro node continuously electrically linked through a set of micro nodes of the plurality of micro nodes beginning from a start micro node in the start macro node through the grid to an end micro node in the end macro node;

identifying a candidate macro node in the grid which includes only parallel circuit path micro node segments, wherein each parallel circuit path micro node segment extends parallel from the ingress micro node to the egress micro node of the candidate macro node;

selecting the candidate macro node; and re-arranging, by the at least one processor, the parallel circuit path micro node segments of the plurality of micro node meandering electrically conductive circuit paths in the candidate macro node of the grid such that at least one circuit path micro node segment is changed electrically to a non-parallel circuit path micro node segment in relation to other circuit path micro node segments in the candidate macro node to generate data representative of re-arranged electrically conductive circuit paths for the grid.

16. The tangible, non-transitory computer readable medium of claim 15, wherein the re-arranging comprises: connecting two immediately adjacent ingress micro nodes directly together by a first bridge segment to form a first non-parallel circuit path micro node segment; and connecting two immediately adjacent egress micro nodes directly together by a second bridge segment to from a second non-parallel circuit path micro node segment.

17. The tangible, non-transitory computer readable medium of claim 15, wherein the non-parallel circuit path micro node segment comprises one of:
- a Z-shaped segment electrically connecting an ingress micro node of the candidate macro node (CMN) to a different egress micro node of the CMN wherein the Z-shaped segment follows a Z-path through intermediary micro nodes of the CMN;
- an ingress innermost nest cut segment electrically connecting two immediately adjacent micro nodes directly;
- an egress innermost nest cut segment electrically connecting two immediately adjacent micro nodes directly;
- an ingress nest cut segment electrically connecting a first non-adjacent ingress micro node to a different second non-adjacent ingress micro node by surrounding an ingress innermost nest cut segment; and
- an egress nest cut segment electrically connecting a first non-adjacent egress micro node to a different second non-adjacent egress micro node by surrounding an egress innermost nest cut segment.

18. The tangible, non-transitory computer readable medium of claim 15, wherein the plurality of meandering electrically conductive circuit paths have a first connector pinout configuration for the micro nodes in the start macro node and a second connector pinout configuration for the micro nodes in the end macro node, and further comprising:
- re-defining the first connector pinout configuration and the second connector pinout configuration, based on the re-arranged electrically conductive circuit paths for the grid.

19. The tangible, non-transitory computer readable medium of claim 15, further comprising storing in a memory device, for the candidate macro node, a plurality of re-arranged macro node candidate options, each re-arranged macro node candidate option having at least one non-parallel circuit path micro node segment for the selected candidate macro node.

20. The tangible, non-transitory computer readable medium of claim 15, further comprising selecting a respective one re-arranged macro node candidate option from the memory device; and the re-arranging of the parallel circuit path micro node segments of the plurality of micro node electrically conductive circuit paths includes replacing the candidate macro node of the grid with the selected re-arranged macro node candidate option.

\* \* \* \* \*